United States Patent
Fan et al.

(10) Patent No.: US 6,646,088 B2
(45) Date of Patent: Nov. 11, 2003

(54) URETHANE-BASED STAIN-RELEASE COATINGS

(75) Inventors: Wayne W. Fan, Cottage Grove, MN (US); Steven J. Martin, Shoreview, MN (US); Zai-Ming Qiu, Woodbury, MN (US); Michael S. Terrazas, Prescott, WI (US); Linda G. Coté, Woodbury, MN (US); Mitchell T. Johnson, St. Paul, MN (US); Larry A. Lien, Forest Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/106,616

(22) Filed: Mar. 26, 2002

(65) Prior Publication Data

US 2003/0105263 A1 Jun. 5, 2003

Related U.S. Application Data

(63) Continuation-in-part of application No. 09/804,447, filed on Mar. 12, 2001, now abandoned.
(60) Provisional application No. 60/226,049, filed on Aug. 16, 2000.

(51) Int. Cl.$^7$ .............................................. C08G 18/30
(52) U.S. Cl. .......................... 528/30; 528/49; 528/70; 556/414; 556/417; 556/420; 556/421; 554/106; 428/425.6; 428/425.1; 427/387; 252/389.32; 252/8.62; 252/182.15
(58) Field of Search ................. 528/30, 49, 70; 556/420, 414, 421, 417; 554/106; 428/425.6, 425.1; 427/387; 252/389.32, 8.62, 182.15

(56) References Cited

U.S. PATENT DOCUMENTS

| | | | |
|---|---|---|---|
| 2,803,615 A | 8/1957 | Ahlbrecht | |
| 3,068,187 A | 12/1962 | Ahlbrecht | |
| 3,094,547 A | 6/1963 | Heine | |
| 3,102,103 A | 8/1963 | Ahlbrecht | |
| 3,341,497 A | 9/1967 | Sherman et al. | |
| 3,574,791 A | 4/1971 | Sherman et al. | |
| 3,916,053 A | 10/1975 | Sherman et al. | |
| 3,987,182 A | 10/1976 | Gold | |
| 3,987,227 A | 10/1976 | Schultz et al. | |
| 4,215,205 A | 7/1980 | Landucci | |
| 4,426,466 A | 1/1984 | Schwartz | |
| 4,468,527 A | 8/1984 | Patel | |
| 4,504,401 A | 3/1985 | Matsuo et al. | |
| 4,529,658 A | 7/1985 | Schwartz et al. | |
| 4,540,497 A | 9/1985 | Chang et al. | |
| 4,566,981 A | 1/1986 | Howells | |
| 4,606,737 A | 8/1986 | Stern | |
| 4,668,406 A | 5/1987 | Chang | |
| 4,958,039 A | 9/1990 | Pechhold | |
| 5,025,052 A | 6/1991 | Crater et al. | |
| 5,216,097 A | 6/1993 | Allewaert et al. | |
| 5,231,126 A | 7/1993 | Shi et al. | |
| 5,276,175 A | 1/1994 | Dams et al. | |
| 5,414,102 A | 5/1995 | Pohmer et al. | |
| 5,424,474 A | 6/1995 | Pohmer et al. | |
| 5,451,622 A | 9/1995 | Boardman et al. | |
| 5,621,042 A | * 4/1997 | Hanada et al. | |
| 5,688,884 A | 11/1997 | Baker et al. | |
| 5,725,789 A | 3/1998 | Huber et al. | |
| 5,756,633 A | * 5/1998 | Larson | |
| 6,037,429 A | 3/2000 | Linert et al. | |
| 6,313,335 B1 | * 11/2001 | Roberts et al. | |

FOREIGN PATENT DOCUMENTS

JP        2-286761     * 11/1990

* cited by examiner

*Primary Examiner*—Rachel Gorr

(57) ABSTRACT

This invention relates to chemical compositions comprising one or more urethane oligomers of at least two repeating units selected from the group consisting of fluorine-containing urethane oligomers and long-chain hydrocarbon-containing urethane oligomers. These urethane oligomers comprise the reaction product of (a) one or, more polyfunctional isocyanate compounds; (b) one or more polyols; (c) one or more monoalcohols selected from the group consisting of fluorochemical monoalcohols, optionally substituted long-chain hydrocarbon monoalcohols, and mixtures thereof; (d) one or more silanes; and optionally (e) one or more water-solubilizing compounds comprising one or more water-solubilizing groups and at least one isocyanate-reactive hydrogen containing group. The chemical compositions of the present invention can be applied as coatings and these coatings can impart stain-release characteristics and resist being worn-off due to wear and abrasion.

38 Claims, No Drawings

URETHANE-BASED STAIN-RELEASE COATINGS

CROSS-REFERENCE TO RELATED APPLICATIONS

This application is a continuation-in-part of U.S. application Ser. No. 09/804,447, filed Mar. 12, 2001, now abandoned, which claimed priority to U.S. Provisional Pat. Application No. 60/226,049, filed Aug. 16, 2000.

FIELD OF THE INVENTION

This invention relates to chemical compositions comprising one or more urethane oligomers and coating compositions comprising at least one solvent and the chemical compositions of the present invention. When applied as a coating, these urethane-based chemical compositions impart durable stain-release characteristics. This invention also relates to articles comprising a substrate and on this substrate is a cured coating derived from the coating compositions of the present invention. The cured coating can impart stain-release characteristics to the substrate and resist being worn-off due to wear and abrasion. In another aspect, this invention relates to a process for imparting stain-release characteristics to substrates.

BACKGROUND OF THE INVENTION

The use of certain fluorochemical compositions on fibers and fibrous substrates, such as textiles, paper, and leather, to impart oil- and water-repellency and soil- and stain-resistance is well known in the art. See, for example, Banks, Ed., Organofluorine Chemicals and Their Industrial Applications, Ellis Horwood Ltd., Chichester, England, 1979, pp. 226–234. Such fluorochemical compositions include, for example, fluorochemical guanidines (U.S. Pat. No. 4,540,497 (Chang et al.)), compositions of cationic and non-cationic fluorochemicals (U.S. Pat. No. 4,566,981 (Howells)), compositions containing fluorochemical carboxylic acid and epoxidic cationic resin (U.S. Pat. No. 4,426,466 (Schwartz)), fluoroaliphatic carbodiimides (U.S. Pat. No. 4,215,205 (Landucci)), fluoroaliphatic alcohols (U.S. Pat. No. 4,468,527 (Patel)), fluorine-containing addition polymers, copolymers, and macromers (U.S. Pat. No. 2,803,615 (Ahlbrecht et al.); U.S. Pat. No. 3,068,187 (Bolstad et al.); U.S. Pat. No. 3,102,103 (Albrecht et al.); 3,341,497 (Sherman et al.); U.S. Pat. No. 3,574,791 (Sherman et al.); U.S. Pat. No. 3,916,053 (Sherman et al.); U.S. Pat. No. 4,529,658 (Schwartz et al.); U.S. Pat. No. 5,216,097 (Allewnert et al.); U.S. Pat No. 5,276,175 (Dams et al.); U.S. Pat. No. 5,725,789 (Huber et al.); U.S. Pat. No. 6,037,429 (Linert et al.)), fluorine-containing phosphate esters (U.S. Pat. Nos. 3,094,547 (Heine et al.); U.S. Pat. No. 5,414,102 (Pohmer et al.); U.S. Pat. No. 5,424,474 (Pohmer et al.)), fluorine-containing urethanes (U.S. Pat. No. 3,987,182 (Gold); U.S. Pat. No. 3,987,227 (Schultz et al.); U.S. Pat. No. 4,504,401 (Matsuo et al.); U.S. Pat. No. 4,958,039 (Pechhold)), fluorochemical allophanates (U.S. Pat. No. 4,606,737 (Stem)) fluorochemical biurets (U.S. Pat. No. 4,668,406 (Chang)), fluorochemical oxazolidinones (U.S. Pat. No. 5,025,052 (Crater et al.)), and fluorochemical piperazines (U.S. Pat. No. 5,451,622 (Boardman)).

Certain of these fluorochemical compositions, such as the fluorine-containing addition copolymers of U.S. Pat. No. 6,037,429 (Linert et al.), may be used on hard surfaces, including for example, ceramics, stone, masonry, wood. U.S. Pat. No. 5,414,102 (Pohmer et al.) and U.S. Pat. No. 5,424,474 (Pohmer et al.) suggest that certain fluorine-containing phosphate esters can be used on hard surfaces, such as, ceramics, stone, masonry, wood, and plastics to repel water, grease, oil, and dirt. These previously known fluorochemical compositions typically have been coated on hard substrates by means of aqueous emulsions.

In coating on hard surfaces, durability of the coating of fluorochemical compositions is a concern. In many cases the fluorochemical compositions exhibit poor durability because the majority of the coated hard surface area is exposed to wear and abrasion from use, cleaning, and the elements. Due to this exposure, the coated composition can be worn-off leaving the hard surface unprotected. Certain fluorine-containing urethanes have been found to provide superior abrasion durability and especially good water- and oil-repellency and stainproofing properties (U.S. Pat. No. 4,504,401 (Matsuo et al.)). These previously known fluorine-containing urethane compositions can be solvent- or water-based. In practice, all of the previously known fluorine-containing urethanes rely on perfluoroalkyl groups having an average of eight carbon atoms to achieve the desired repellency and stainproofing properties.

Although urethanes have been found to be especially durable, improved long-term durability is still needed for many hard surface applications. In particular in the widely used siliceous surfaces, such as ceramic and masonry, a coating composition is needed that imparts longer lasting repellency and stain-proofing and is capable of withstanding repeated abrading and washing.

As indicated above, both solvent- and water-based fluorine-containing urethane compositions have been used to provide water- and oil-repellency to hard surfaces. Since organic solvents pose health, safety, and environmental concerns, the water-based compositions are particularly desirable. However, the previously known compositions are typically aqueous dispersions or emulsions, not solutions; therefore, they require a high temperature cure to impart good repellency properties. In many cases, for example in floors and walls, high temperature curing is not practical or possible. For this reason there is a continuing need for urethanes that do not require costly and energy consuming high temperature cure conditions to impart good repellency properties. Therefore, urethane compositions, including those containing fluorine, that display increased water solubility are needed to eliminate the need for high temperature cure conditions, as well as to increase the ease of preparation and to provide more stable aqueous solutions.

SUMMARY OF THE INVENTION

The inventors recognized the need for shelf-stable chemical compositions, including those containing fluorine, that can successfully impart long-term durability, uniform oil- and water-repellency and soil- and stain-resistance. These chemical compositions should be water and organic solvent soluble and should not require high temperatures for curing.

In one aspect, this invention relates to chemical compositions comprising one or more urethane oligomers of at least two repeating units selected from the group consisting of fluorine-containing urethane oligomers and long-chain hydrocarbon-containing urethane oligomers. These urethane oligomers comprise the reaction product of (a) one or more polyfunctional isocyanate compounds; (b) one or more polyols; (c) one or more monoalcohols selected from the group consisting of fluorochemical monoalcohols, optionally substituted long-chain hydrocarbon monoalcohols, and mixtures thereof; (d) one or more silanes; and optionally (e) one or more water-solubilizing compounds comprising one or more water-solubilizing groups and at least one isocyanate-reactive hydrogen containing group.

The silanes are of the following formula (I):

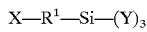    formula (I)

wherein:
- X is —$NH_2$; —SH; —OH; —N=C=O; or —NRH where R is a phenyl, straight or branched aliphatic, alicyclic, or aliphatic ester group;
- $R^1$ is an alkylene, heteroalkylene, aralkylene, or heteroaralkylene bridging group; and
- each Y is independently a hydroxyl; a hydrolyzable moiety selected from the group consisting of alkoxy, acyloxy, heteroalkyoxy, heteroacyloxy, halo, and oxime; or a non-hydrolyzable moiety selected from the group consisting of phenyl, alicyclic, straight-chain aliphatic, and branched-chain aliphatic, wherein at least one Y is a hydrolyzable moiety.

As used herein, the term "oligomer" means a polymer molecule that consists of at least two repeating (polymerized) units, but up to only a few (for example, from 2 to about 20) repeating units. Each repeating unit comprises a urethane group that is derived or derivable from the reaction of at least one polyfunctional isocyanate compound and at least one polyol. The oligomer is terminated with (i) one or more perfluoroalkyl groups, one or more perfluoroheteroalkyl groups, or one or more long-chain hydrocarbyl groups; and (ii) one or more silyl groups.

The chemical compositions of the present invention, comprising one or more urethane oligomers, impart stain-release characteristics and exhibit durability (i.e. they resist being worn-off) when exposed to wear and abrasion from use, cleaning, and the elements. Therefore, these compositions can be applied as coatings to a wide variety of substrates, for example, by topical application, to impart durable stain-release properties to the substrates. When applied as a coating, the chemical compositions of the present invention can provide a uniform film. Applied as a coating, the chemical compositions of the present invention do not change the appearance of the substrate to which they are applied. Even though the urethane oligomers are of relatively high molecular weight, the chemical compositions of the present invention provide durable stain-release properties comparable to or better than those imparted by the corresponding lower molecular weight compositions containing only the fluorine-containing or long-chain hydrocarbon urethane compound with no repeating unit. In addition, with the chemical compositions of the present invention, there is no need for high temperature curing; they can be cured (i.e., dried) at ambient temperature.

Certain preferred embodiments of the chemical compositions of the present invention include chemical compositions derived from one or more water-solubilizing compounds comprising one more water-solubilizing groups and at least one isocyanate-reactive hydrogen containing group. These preferred embodiments exhibit water solubility, while at the same time providing surprisingly good stain-release properties. These embodiments include, for example, those chemical compositions comprising a urethane oligomer containing one or more solubilizing groups. The solubilizing groups include carboxylate, sulfate, sulfonate, phosphate, phosphonate, ammonium, quaternary ammonium, and the like. These embodiments are particularly well suited for uniform and continuous topical treatments on a variety of substrates, without the need for high temperature curing. This benefit is of particular importance for protecting very large and high mass substrates which are very difficult to heat, such as stone and masonry, and in situations where devices for high temperature cure are not available.

Certain other preferred embodiments of the chemical compositions of the present invention include those compositions comprising terminal $R_f$ groups having from two to six carbons, preferably from three to five carbons, and more preferably four carbons. Even with $R_f$ groups that are relatively short (i.e. less than eight carbons), these chemical compositions, surprisingly, exhibit excellent stain-release. Although compositions comprising lower fluorine content are less expensive, $R_f$ groups shorter than eight carbons typically have been overlooked by those of skill in the art because they have been known to impart inferior oil- and water-repellency and stain-resistance.

Many previously known polymeric, fluorochemical surfactants contain perfluorooctyl moieties. These surfactants ultimately degrade to perfluorooctyl-containing compounds. It has been reported that certain perfluorooctyl-containing compounds may tend to bio-accumulate in living organisms; this tendency has been cited as a potential concern regarding some fluorochemical compounds. For example, see U.S. Pat. No. 5,688,884 (Baker et al.). As a result, there is a desire for fluorine-containing compositions which are effective in providing desired surfactant properties, and which eliminate more effectively from the body (including the tendency of the composition and its degradation products).

It is expected that the oligomeric, fluorochemical compositions of the present invention, which contain perfluorobutyl moieties, when exposed to biologic, thermal, oxidative, hydrolytic, and photolytic conditions found in the environment, will break down to various degradation products. For example, compositions comprising perfluorobutylsulfonamido moieties are expected to degrade, at least to some extent, ultimately to perfluorobutylsulfonate salts. It has been surprisingly found that perfluorobutylsulfonate, tested in the form of its potassium salt, eliminates from the body much more effectively than perfluorohexylsulfonate and even more effectively than perfluorooctylsulfonate. Accordingly, it is believed that such surprising effective elimination from the body will be found with perfluorobutylcarbonate, which is expected to be the ultimate degradation product of compositions comprised of perfluorobutylcarbonyl and perfluorobutyoalkyl moieties.

Other preferred embodiments of the chemical composition of the present invention include those compositions comprising terminal long-chain hydrocarbon groups having 10 to 18 carbons. Long-chain hydrocarbon groups typically have been known to impart poor oil-repellency; however, the chemical compositions of the present invention comprising terminal long-chain hydrocarbon groups having 10 to 18 carbons impart good stain-release properties. For water solubility and performance, long-chain hydrocarbon groups having chain lengths of 12 to 16 carbons are preferred, 12 to 14 carbons being more preferred, and 12 carbons being most preferred.

Another embodiment of the present invention relates to a coating composition comprising a solution comprising the chemical composition of the present invention and a solvent. In this embodiment, it is important that the chemical composition be dissolved in the solvent. When applied to a substrate, this coating composition provides a uniform distribution of the chemical composition on the substrate without altering the appearance of the substrate. A high temperature cure is not required to provide this coating; the coating composition can, be cured (i.e. dried) at ambient temperatures.

This invention also relates to an article comprising a substrate having one or more surfaces and on one or more surfaces of this substrate is a cured coating derived from at least one solvent and a chemical composition of the present invention. After application and curing of the chemical composition, the substrate displays durable stain-release properties.

This invention further relates to a method for imparting stain-release characteristics to a substrate, having one or more surfaces, comprising the steps of:

(a) applying the coating composition of the present invention onto one or more surfaces of the substrate; and (b) allowing the coating composition to cure (i.e. dry).

Definitions

Unless otherwise stated, the following terms used in the specification and claims have the meanings given below:

"Acyloxy" means a radical —OC(O)R where R is, alkyl, alkenyl, and cycloalkyl, e.g., acetoxy, 3,3,3-trifluoroacetoxy, propionyloxy, and the like.

"Alkoxy" means a radical —OR where R is an alkyl group as defined below, e.g., methoxy, ethoxy, propoxy, butoxy, and the like.

"Alkyl" means a linear saturated monovalent hydrocarbon radical having from one to about twelve carbon atoms or a branched saturated monovalent hydrocarbon radical having from three to about twelve carbon atoms, e.g., methyl, ethyl, 1-propyl, 2-propyl, pentyl, and the like.

"Alkylene" means a linear saturated divalent hydrocarbon radical having from one to about twelve carbon atoms or a branched saturated divalent hydrocarbon radical having from three to about twelve carbon atoms, e.g., methylene, ethylene, propylene, 2-methylpropylene, pentylene, hexylene, and the like.

"Aralkylene" means an alkylene radical defined above with an aromatic group attached to the alkylene radical, e.g., benzyl, pyridylmethyl, 1-naphthylethyl, and the like.

"Cured chemical composition" means that the chemical composition is dried or solvent has evaporated from the chemical composition at approximately ambient temperature (15–35° C.) until dryness, up to approximately 24 hours.

"Fibrous substrate" means a material comprised of synthetic fibers such as wovens, knits, nonwovens, carpets, and other textiles; and a material comprised of natural fibers such as cotton, paper, and leather.

"Fluorocarbon monoalcohol" means a compound having one hydroxyl group and a perfluoroalkyl or a perfluoroheteralkyl group, e.g., $C_4F_9SO_2N(CH_3)CH_2CH_2OH$, $C_4F_9CH_2CH_2OH$, $C_2F_5O(C_2F_4O)_3CF_2CONHC_2H_4OH$, $c\text{-}C_6F_{11}CH_2OH$, and the like.

"Halo" means fluoro, chloro, bromo, or iodo, preferably fluoro and chloro.

"Hard substrate" means any rigid material that maintains its shape, e.g., glass, ceramic, concrete, natural stone, wood, metals, plastics, and the like.

"Heteroacyloxy" has essentially the meaning given above for acyloxy except that one or more heteroatoms (i.e. oxygen, sulfur, and/or nitrogen) may be present in the R group and the total number of carbon atoms present may be up to 50, e.g., $CH_3CH_2OCH_2CH_2C(O)O$—, $C_4H_9OCH_2CH_2OCH_2CH_2C(O)O$—, $CH_3O(CH_2CH_2O)_nCH_2CH_2C(O)O$—, and the like.

"Heteroalkoxy" has essentially the meaning given above for alkoxy except that one or more heteroatoms (i.e. oxygen, sulfur, and/or nitrogen) may be present in the alkyl chain and the total number of carbon atoms present may be up to 50, e.g., $CH_3CH_2OCH_2CH_2O$—, $C_4H_9OCH_2CH_2OCH_2CH_2O$—, $CH_3O(CH_2CH_2O)_nH$, and the like.

"Heteroalkyl" has essentially the meaning given above for alkyl except that one or more heteroatoms (i.e. oxygen, sulfur, and/or nitrogen) may be present in the alkyl chain, these heteroatoms being separated from each other by at least one carbon, e.g., $CH_3CH_2OCH_2CH_2$—, $CH_3CH_2OCH_2CH_2OCH(CH_3)CH_2$—, $C_4F_9CH_2CH_2SCH_2CH_2$—, and the like.

"Heteroalkylene" has essentially the meaning given above for alkylene except that one or more heteroatoms (i.e. oxygen, sulfur, and/or nitrogen) may be present in the alkylene chain, these heteroatoms being separated from each other by at least one carbon, e.g, —$CH_2OCH_2O$—, —$CH_2CH_2OCH_2CH_2$—, —$CH_2CH_2N(CH_3)CH_2CH_2$—, —$CH_2CH_2SCH_2CH_2$—, and the like.

"Heteroaralkylene" means an aralkylene radical defined above except that catenated oxygen, sulfur, and/or nitrogen atoms may be present, e.g., phenyleneoxymethyl, phenyleneoxyethyl, benzyleneoxymethyl, and the like.

"Long-chain hydrocarbon monoalcohol" means a compound having one hydroxyl group and a long chain hydrocarbon group having 10 to 18 carbons which may be saturated, unsaturated, or aromatic, and may optionally be substituted with one or more chlorine, bromine, trifluoromethyl, or phenyl groups, e.g., $CH_3(CH_2)_{10}CH_2OH$, $CH_3(CH_2)_{14}CH_2OH$, and the like.

"Oligomer" means a polymer molecule consisting of only a few (for example, from 2 to about 20) repeat (polymerized) units.

"Perfluoroalkyl" has essentially the meaning given above for "alkyl" except that all or essentially all of the hydrogen atoms of the alkyl radical are replaced by fluorine atoms and the number of carbon atoms is from 3 to about 8, e.g., perfluoropropyl, perfluorobutyl, perfluorooctyl, and the like.

"Perfluoroalkylene" has essentially the meaning given above for "alkylene" except that all or essentially all of the hydrogen atoms of the alkylene radical are replaced by fluorine atoms, e.g., perfluoropropylene, perfluorobutylene, perfluorooctylene, and the like.

"Perfluoroheteroalkyl" has essentially the meaning given above for "heteroalkyl" except that all or essentially all of the hydrogen atoms of the heteroalkyl radical are replaced by fluorine atoms and the number of carbon atoms is from 3 to about 100, e.g., $CF_3CF_2OCF_2CF_2$—, $CF_3CF_2O(CF_2CF_2O)_3CF_2CF_2$—, $C_3F_7O(CF(CF_3)CF_2O)_mCF(CF_3)CF_2$— where m is from about 10 to about 30, and the like.

"Perfluoroheteroalkylene" has essentially the meaning given above for "heteroalkylene" except that all or essentially all of the hydrogen atoms of the heteroalkylene radical are replaced by fluorine atoms, and the number of carbon atoms is from 3 to about 100, e.g., —$CF_2OCF_2$—, —$CF_2O(CF_2O)_n(CF_2CF_2O)_mCF_2$—, and the like.

"Perfluorinated group" means an organic group wherein all or essentially all of the carbon bonded hydrogen atoms are replaced with fluorine atoms, e.g., perfluoroalkyl, perfluoroheteroalkyl, and the like.

"Polyfunctional isocyanate compound" means a compound containing two or more isocyanate radicals, —NCO, attached to a multi-valent organic group, e.g., hexamethylene diisocyanate, the biuret and iscyanurate of hexamethylene diisocyanate, and the like.

"Polyol" means an organic compound or polymer with an average of at least about 2 primary or secondary hydroxyl groups per molecule, e.g., ethylene glycol, propylene glycol, 1,6-hexanediol, and the like.

"Porous" means capable of imbibing a liquid.

"Polyalkylsiloxane diol" means a molecule having two hydroxyl groups and a repeating unit with the structure, —(Si(R)$_2$O)—, e.g., HOR[Si(CH$_3$)$_2$O]$_n$SiROH, wherein each R is independently straight- or branched-chain alkyl.

"Polyarylsiloxane diol" means a molecule having two hydroxyl groups and a repeating unit with the structure, —(Si(Ar)$_2$O)—, e.g., HOR[Si(C$_6$H$_5$)$_2$O]SiROH, wherein each R is independently straight- or branched-chain alkyl.

"Repellency" is a measure of a treated substrate's resistance to wetting by oil and/or water and/or adhesion of particulate soil. Repellency may be measured by the test methods described herein.

"Resistance," in the context of soiling or staining, is a measure of the treated substrate's ability to avoid staining and/or soiling when contacted by stain or soil respectively.

"Release" is a measure of the treated substrate's ability to have soil and/or stain removed by cleaning or laundering.

"Silane group" means a group comprising silicon to which at least one hydrolyzable group is bonded, e.g., —Si(OCH$_3$)$_3$, —Si(OOCCH$_3$)$_2$CH$_3$, —Si(Cl)$_3$, and the like.

DETAILED DESCRIPTION OF THE INVENTION

The chemical compositions of the present invention comprise one or more urethane oligomers having at least two repeating units selected from the group consisting of fluorine-containing urethane oligomers and long-chain hydrocarbon-containing urethane oligomers. This oligomer comprises the reaction product of (a) one or more polyfunctional isocyanate compounds; (b) one or more polyols; (c) one or more monoalcohols selected from the group consisting of fluorochemical monoalcohols, optionally substituted long-chain hydrocarbon monoalcohols, and mixtures thereof; (d) one or more silanes; and optionally (e) one or more water-solubilizing compounds comprising one or more water-solubilizing groups and at least one isocyanate-reactive hydrogen containing group.

The silanes are of the following formula (I):

X—R$^1$—Si—(Y)$_3$      formula (I)

wherein:

X is —NH$_2$; —SH; —OH; —N═C═O; or —NRH where R is a phenyl, straight or branched aliphatic, alicyclic, or aliphatic ester group;

R$^1$ is an alkylene, heteroalkylene, aralkylene, or heteroaralkylene group; and each Y is independently a hydroxyl; a hydrolyzable moiety selected from the group consisting of alkoxy, acyloxy, heteroalkyoxy, heteroacyloxy, halo, and oxime; or a non-hydrolyzable moiety selected from the group consisting of phenyl, alicyclic, straight-chain aliphatic, and branched-chain aliphatic, wherein at least one Y is a hydrolyzable moiety.

The oligomer comprises at least two repeating (polymerized) units. Each repeating unit comprises a urethane group that is derived or derivable from the reaction of at least one polyfunctional isocyanate compound and at least one polyol. The oligomer is terminated with (i) one or more perfluoroalkyl groups, one or more perfluoroheteroalkyl groups, or one or more long-chain hydrocarbyl groups; and (ii) one or more silyl groups. The oligomer can further comprise one or more water-solubilizing groups, these solubilizing groups independently being pendant from the repeating unit or terminal. The oligomer also can further comprise one or more fluorine-containing groups pendant from the repeating unit, these fluorine-containing groups independently being perfluoroalkyl or perfluoroheteroalkyl groups. Additionally, the oligomer can comprise one or more perfluoroheteroalkylene groups within the backbone of the repeating unit.

In one preferred embodiment, the composition of the present invention comprises a mixture of urethane molecules arising from the reaction of (a) one or more polyfunctional isocyanate compounds, (b) one or more polyols, (c) one or more fluorochemical monoalcohols, and (d) one or more silanes as described above.

In another preferred embodiment, the composition of the present invention comprises a mixture of urethane molecules arising from the reaction of (a) one or more polyfunctional isocyanate compounds, (b) one or more polyols, (c) one or more fluorochemical monoalcohols, (d) one or more silanes as described above, and (e) one or more water-solubilizing compounds comprising one or more water-solubilizing groups and at least one isocyanate-reactive hydrogen containing group. The water-solubilizing compounds of the present invention can be represented in general by "W-H," wherein W represents the residue of the water-solubilizing compound comprising one or more water-solubilizing groups and H represents the active hydrogen(s).

In a further preferred embodiment, the composition of the present invention comprises a mixture of urethane molecules arising from the reaction of (a) one or more polyfunctional isocyanate compounds, (b) one or more polyols, (c) one or more optionally substituted long-chain hydrocarbon monoalcohols, (d) one or more silanes as described above, and (e) one or more water-solubilizing compounds comprising one or more water-solubilizing groups and at least one isocyanate-reactive hydrogen containing group.

The composition can further contain fluorine-containing and or long-chain hydrocarbon-containing urethane compounds having fewer than two repeating or repeatable units. The mixture of urethane molecules preferably comprises urethane molecules having a varying number of repeating units, including zero, one, two, and more repeating units. This mixture of urethane molecules comprising a varying number of repeating units allows simple blending of the above components in preparing the fluorochemical composition.

Preferred classes of urethane oligomers that may be present are represented by the following formulas (III) through (VI):

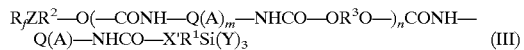

R$_f$ZR$^2$—O(—CONH—Q(A)$_m$—NHCO—OR$^3$O—)$_n$CONH—Q(A)—NHCO—X'R$^1$Si(Y)$_3$      (III)

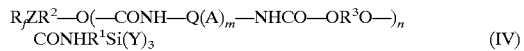

R$_f$ZR$^2$—O(—CONH—Q(A)$_m$—NHCO—OR$^3$O—)$_n$CONHR$^1$Si(Y)$_3$      (IV)

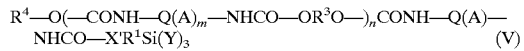

R$^4$—O(—CONH—Q(A)$_m$—NHCO—OR$^3$O—)$_n$CONH—Q(A)—NHCO—X'R$^1$Si(Y)$_3$      (V)

R$^4$—O(—CONH—Q(A)$_m$—NHCO—OR$^3$O—)$_n$CONHR$^1$Si(Y)$_3$(VI)

wherein:

R$_f$ZR$^2$— is a residue of at least one of the fluorochemical monoalcohols;

R$_f$ is a perfluoroalkyl group having 3 to about 8 carbon atoms, or a perfluoroheteroalkyl group having 3 to about 50 carbon atoms;

Z is a covalent bond, sulfonamido (—SO$_2$NR—), or carboxamido (—CONR—) where R is hydrogen or alkyl;

R$^1$ is an alkylene, heteroalkylene, aralkylene, or heteroaralkylene group;

R$^2$ is a divalent straight- or branched-chain alkylene, cycloalkylene, or heteroalkylene group of 1 to 14 carbon atoms, preferably 1 to 8 carbon atoms, more preferably 1 to 4 carbon atoms, and most preferably two carbon atoms, and preferably R$^2$ is alkylene or heteroalkylene of 1 to 14 carbon atoms;

Q is a multi-valent organic group which is a residue of the polyfunctional isocyanate compound;

R$^3$ is a divalent organic group which is a residue of the polyol and may be substituted with or contain (i) water-solubilizing groups selected from the group consisting of carboxylate, sulfate, sulfonate, phosphonate, ammonium, quaternary ammonium, and mixtures thereof and (ii) perfluorinated groups;

X' is —O—, —S—, or —N(R)—, wherein R is hydrogen or alkyl;

R$^4$ is an optionally substituted long-chain hydrocarbon derived from the long-chain hydrocarbon monoalcohol;

each Y is independently a hydroxy; a hydrolyzable moiety selected from the group consisting of alkoxy, acyloxy, heteroalkoxy, heteroacyloxy, halo, and oxime; or a non-hydrolyzable moiety selected from the group consisting of phenyl, alicyclic, straight-chain aliphatic, and branched-chain aliphatic, wherein at least one Y is a hydrolyzable moiety.

A is selected from the group consisting of R$_f$ZR$^2$—OCONH—, (Y)$_3$SiR$^1$XCONH—, (Y)$_3$SiR$^1$NHCOOR$^3$OCONH—, and W—CONH—, wherein W is a residue of the water-solubilizing compound comprising one or more water-solubilizing groups;

m is an integer from 0 to 2; and n, which is the number of repeating units, is an integer from 2 to 10.

Polyfunctional isocyanate compounds useful in the present invention comprise isocyanate radicals attached to the multi-valent organic group, Q, which can comprise a multi-valent aliphatic, alicyclic, or aromatic moiety; or a multi-valent aliphatic, alicyclic or aromatic moiety attached to a biuret, an isocyanurate, or a uretdione, or mixtures a, thereof. Preferred polyfunctional isocyanate compounds contain two or three —NCO radicals. Compounds containing two —NCO radicals are comprised of divalent aliphatic, alicyclic, araliphatic, or aromatic moieties to which the —NCO radicals are attached. Preferred compounds containing three —NCO radicals are comprised of isocyanatoaliphatic, isocyanatoalicyclic, or isocyanatoaromatic, monovalent moieties, which are attached to a biuret or an isocyanurate.

Representative examples of suitable polyfunctional isocyanate compounds include isocyanate functional derivatives of the polyfunctional isocyanate compounds as defined herein. Examples of derivatives include, but are not limited to, those selected from the group consisting of ureas, biurets, allophanates, dimers and trimers (such as uretdiones and isocyanurates) of isocyanate compounds, and mixtures thereof. Any suitable organic polyisocyanate, such as an aliphatic, alicyclic, araliphatic, or aromatic polyisocyanate, may be used either singly or in mixtures of two or more. The aliphatic polyfunctional isocyanate compounds generally provide better light stability than the aromatic compounds. Aromatic polyfunctional isocyanate compounds, on the other hand, are generally more economical and reactive toward polyols and other poly(active hydrogen) compounds than are aliphatic polyfunctional isocyanate compounds. Suitable aromatic polyfunctional isocyanate compounds include, but are not limited to, those selected from the group consisting of 2,4-toluene diisocyanate (TDI), 2,6-toluene diisocyanate, an adduct of TDI with trimethylolpropane (available as DESMODUR™ CB from Bayer Corporation, Pittsburgh, Pa.), the isocyanurate trimer of TDI (available as DESMODUR™ IL from Bayer Corporation, Pittsburgh, Pa.), diphenylmethane 4,4'-diisocyanate (MDI), diphenylmethane 2,4'-diisocyanate, 1,5-diisocyanato-naphthalene, 1,4-phenylene diisocyanate, 1,3-phenylene diisocyanate, 1-methyoxy-2,4-phenylene diisocyanate, 1-chlorophenyl-2, 4-diisocyanate, and mixtures thereof.

Examples of useful aiicyclic polyfunctional isocyanate compounds include, but are not limited to, those selected from the group consisting of dicyclohexylmethane diisocyanate (H$_{12}$MDI, commercially available as DESMODUR™ W, available from Bayer Corporation, Pittsburgh, Pa.), 4,4'-isopropyl-bis(cyclohexylisocyanate), isophorone diisocyanate (IPDI), cyclobutane-1,3-diisocyanate, cyclohexane 1,3-diisocyanate, cyclohexane 1,4-diisocyanate (CHDI), 1,4-cyclohexanebis(methylene isocyanate) (BDI), 1,3-bis (isocyanatomethyl)cyclohexane (H$_6$XDI), 3-isocyanatomethyl-3,5,5-trimethylcyclohexyl isocyanate, and mixtures thereof.

Examples of useful aliphatic polyfunctional isocyanate compounds include, but are not limited to, those selected from the group consisting of 1,4-tetramethylene diisocyanate, hexamethylene 1,4-diisocyanate, hexamethylene 1,6-diisocyanate (HDI), 1,12-dodecane diisocyanate, 2,2,4-trimethyl-hexamethylene diisocyanate (TMDI), 2,4,4-trimethyl-hexamethylene diisocyanate (™DI), 2-methyl-1, 5-pentamethylene diisocyanate, dimer diisocyanate, the urea of hexamethylene diisocyanate, the biuret of hexamethylene 1,6-diisocyanate (HDI) (available as DESMODUR™ N-100 and N-3200 from Bayer Corporation, Pittsburgh, Pa.), the isocyanurate of HDI (available as DESMODUR™ N-3300 and DESMODUR™ N-3600 from Bayer Corporation, Pittsburgh, Pa.), a blend of the isocyanurate of HDI and the uretdione of HDI (available as DESMODUR™ N-3400 available from Bayer Corporation, Pittsburgh, Pa.), and mixtures thereof.

Examples of useful aralphatic polyisocyanates include, but are not limited to, those selected from the group consisting of m-tetramethyl xylylene diisocyanate (m-TMXDI), p-tetramethyl xylylene diisocyanate (p-TMXDI), 1,4-xylylene diisocyanate (XDI), 1,3-xylylene diisocyanate, p-(1-isocyanatoethyl)-phenyl isocyanate, m-(3-isocyanatobutyl)-phenyl isocyanate, 4-(2-isocyanatocyclohexyl-methyl)-phenyl isocyanate, and mixtures thereof.

Preferred polyisocyanates, in general, include those selected from the group consisting of hexamethylene 1,6-diisocyanate (HDI), 1,12-dodecane diisocyanate isophorone diisocyanate, toluene diisocyanate, dicyclohexylmethane 4,4'diisocyanate, MDI, derivatives of all the aforementioned, including DESMODUR™ N-100, N-3200, N-3300, N-3400, N-3600, and mixtures thereof.

Suitable commercially available polyfunctional isocyanates are exemplified by DESMODUR™ N-3200, DESMODUR™ N-3300, DESMODUR™ N-3400, DESMODUR™ N-3600, DESMODUR™ H (HDI), DESMODUR™ W (bis [4-isocyanatocyclohexyl]methane), MONDUR™ M (4,4'-diisocyanatodiphenylmethane), MONDUR™ TDS (98% toluene 2,4-diisocyanate), MONDUR™ TD-80 (a mixture of 80% 2,4 and 20% 2,6-toluene diisocyanate isomers), and DESMODUR™ N-100, each available from Bayer Corporation, Pittsburgh, Pa.

Other useful triisocyanates are those obtained by reacting three moles of a diisocyanate with one mole of a triol. For example, toluene diisocyanate, 3-isocyanatomethyl-3,4,4-trimethylcyclohexyl isocyanate, or m-tetramethylxylene diisocyanate can be reacted with 1,1,1-tris(hydroxymethyl) propane to form triisocyanates. The product from the reaction with m-tetramethylxylene diisocyanate is commercially available as CYTHANE™ 3160 (American Cyanamid, Stamford, Conn.).

Polyols suitable for use in preparing the chemical compositions of the present invention include those organic polyols that have an average hydroxyl functionality of at least about 2 (preferably, about 2 to 5; more preferably, about 2 to 3; most preferably, about 2, as diols are most preferred). The hydroxyl groups can be primary or secondary, with primary hydroxyl groups being preferred for their greater reactivity. Mixtures of diols with polyols that have an average hydroxyl functionality of about 2.5 to 5 (preferably about 3 to 4; more preferably, about 3) can also be used. It is preferred that such mixtures contain no more than about 20 percent by weight of such polyols, more preferably no more than about 10 percent, and most preferably no more than about 5 percent. Preferred mixtures are mixtures of diols and triols.

Suitable polyols include those that comprise at least one aliphatic, heteroaliphatic, alicyclic, heteroalicyclic, aromatic, heteroaromatic, or polymeric moiety. Preferred polyols are aliphatic or polymeric polyols that contain hydroxyl groups as terminal groups or as groups that are pendant from the backbone chain of the polyol.

The molecular weight (that is, the number average molecular weight) of hydrocarbon polyols can generally vary from about 60 to about 2000, preferably, from about 60 to about 1000, more preferably, from about 60 to about 500, most preferably, from about 60 to about 300. The equivalent weight (that is, the number average equivalent weight) of hydrocarbon polyols generally can be in the range of about 30 to about 1000, preferably, from about 30 to about 500, more preferably, from about 30 to about 250. Polyols of higher equivalent weight can have a tendency to reduce the stain-release properties provided by the chemical compositions of the present invention unless the polyol contains an $R_f$ group or the polyol comprises a perfluoropolyether. If the polyol comprises a perfluoropolyether, it can have a molecular weight as high as approximately 7000 and can still provide adequate stain-release properties.

When the polyols of the present invention are diols, the diols can be substituted with or contain other groups. Thus, a preferred diol is selected from the group consisting of a branched- or straight-chain hydrocarbon diol, a diol containing at least one solubilizing group, a fluorinated diol comprising a monovalent or divalent perfluorinated group, a diol comprising a silane group, a polyalkylsiloxane diol, a polyarylsiloxane diol, and mixtures thereof. Solubilizing groups include carboxylate, sulfate, sulfonate, phosphate, phosphonate, ammonium, quaternary ammonium, and the like.

Perfluorinated monovalent groups ($R_f$) may be perfluoroalkyl and perfluoroheteroalkyl, and perfluorinated divalent groups may be perfluoroalkylene and perfluoroheteroalkylene. Perfluoroalkyl groups are preferred, with perfluoroalkyl groups having from 2 to 6 carbon atoms being more preferred and perfluoroalkyl groups having 4 carbon atoms being most preferred. Another embodiment comprises perfluoroheteroalkyl groups having 6 to 50 carbon atoms. Perfluorinated divalent groups are preferably perfluoroheteroalkylene groups. Perfluoroheteroalkylene groups are preferably perfluoropolyether groups having from about 3 to about 50 carbon atoms.

The silane groups of the diol may contain one, two, or three hydrolyzable groups on the silicon atom. Hydrolyzable groups are as defined below. Polyalkylsiloxane diols include, but are not limited to, hydroxyalkyl terminated polydimethyl siloxanes, polymethyloctadecylsiloxane, polydimethylmethyloctadecylsiloxane, polydimethyldodecyltetradecylsiloxane, polymethylhexadecylsiloxane, polymethyloctylsiloxane, polymethyl-3,3,3-trifluoropropylsiloxane, and the like. Polyarylsiloxane diols are essentially the same as the polyalkylsiloxanes with some or all of the methyl groups replaced with phenyl groups, such as hydroxyalkyl terminated polydiphenylsiloxane and hydroxyalkyl terminated dimethyl-diphenylsiloxane copolymer.

Representative examples of suitable non-polymeric polyols include alkylene glycols, polyhydroxyalkanes, and other polyhydroxy compounds. The alkylene glycols include, for example, 1,2-ethanediol; 1,2-propanediol; 3-chloro-1,2-propanediol; 1,3-propanediol; 1,3-butanediol; 1,4-butanediol; 2-methyl-1,3-propanediol; 2,2-dimethyl-1,3-propanediol (neopentylglycol); 2-ethyl-1,3-propanediol; 2,2-diethyl-1,3-propanediol; 1,5-pentanediol; 2-ethyl- 1,3-pentanediol; 2,2,4-trimethyl- 1,3-pentanediol; 3-methyl-1,5-pentanediol; 1,2-, 1,5-, and 1,6-hexanediol; 2-ethyl-1,6-hexanediol; bis(hydroxymethyl)cyclohexane; 1,8-octanediol; bicyclo-octanediol; 1,10-decanediol; tricyclodecanediol; norbomanediol; and 1,18-dihydroxyoctadecane.

The polyhydroxyalkanes include, for example, glycerine; trimethylolethane; trimethylolpropane; 2-ethyl-2-(hydroxymethyl)-1,3-propanediol; 1,2,6-hexanetriol; pentaerythritol; quinitol; mannitol; and sorbitol.

The other polyhydroxy compounds include, for example, such as di(ethylene glycol); tri(ethylene glycol); tetra(ethylene glycol); tetramethylene glycol; dipropylene glycol; diisopropylene glycol; tripropylene glycol; bis (hydroxymethyl)propionic acid; N,N-bis(2-hydroxyethyl)-3-aminopropyltriethoxysilane; bicine; N-bis(2-hydroxyethyl) perfluorobutylsulfonamide; 1,11-(3,6-dioxaundecane)diol; 1,14-(3,6,9,12-tetraoxatetradecane) diol; 1,8-(3,6-dioxa-2,5,8-trimethyloctane)diol; 1,14-(5,10-dioxatetradecane)diol; castor oil; 2-butyne-1,4-diol; N,N-bis(hydroxyethyl)benzamide; 4,4'-bis(hydroxymethyl) diphenylsulfone; 1,4-benzenedimethanol; 1,3-bis(2-hydroxyethyoxy)benzene; 1,2-dihydroxybenzene; resorcinol; 1,4-dihydroxybenzene; 3,5-, 2,6-, 2,5-, and 2,4-dihydroxybenzoic acid; 1,6-, 2,6-, 2,5-, and 2,7-dihydroxynaphthalene; 2,2'- and 4,4'-biphenol; 1,8-dihydroxybiphenyl; 2,4-dihydroxy-6-methyl-pyrimidine; 4,6-dihydroxypyrimidine; 3,6-dihydroxypyridazine; bisphenol A; 4,4'-ethylidenebisphenol; 4,4'-isopropylidenebis(2,6-dimethylphenol); bis(4-hydroxyphenyl)methane; 1,1-bis(4-hydroxyphenyl)-1-phenylethane (bisphenol C); 1,4-bis(2-hydroxyethyl)piperazine; bis(4-hydroxyphenyl) ether; 1,4-bis(1-hydroxy-1,1-dihydroperfluoroethoxyethoxy) perfluoro-n-butane ($HOCH_2CF_2OC_2F_4O(CF_2)_4OC_2F_4OCF_2CH_2OH$); 1,4-bis( 1-hydroxy-1,1-dihydroperfluoropropoxy) perfluoro-n-butane ($HOCH_2CF_2CF_2O(CF_2)_4OCF_2CF_2CH_2OH$); as well as other aliphatic, heteroaliphatic, saturated alicyclic, aromatic, saturated heteroalicyclic, and heteroaromatic polyols; and the like, and mixtures thereof.

Representative examples of useful polymeric polyols include polyoxyethylene, polyoxypropylene, and ethylene oxide-terminated polypropylene glycols and triols of molecular weights from about 200 to about 2000, corresponding to equivalent weights of about 100 to about 1000 for the diols or about 70 to about 700 for triols; polytetramethylene glycols of varying molecular weight; polydialkylsiloxane diols of varying molecular weight; hydroxy-terminated polyesters and hydroxy-terminated polylactones (e.g., polycaprolactone polyols); hydroxy-terminated polyalkadienes (e.g., hydroxyl-terminated polybutadienes); and the like. Mixtures of polymeric polyols can be used if desired.

Useful commercially available polymeric polyols include CARBOWAX™ poly(ethylene glycol) materials in the number average molecular weight ($M_n$) range of from about 200 to about 2000 (available from Union Carbide Corp., Danbury, Conn.); poly(propylene glycol) materials such as PPG-425 (available from Lyondell Chemical Company, Houston, Tex.); block copolymers of poly(ethylene glycol) and poly(propylene glycol) such as PLURONIC™ L31 (available from BASF Corporation, Mount Olive, N.J.); fluorinated oxetane polyols made by the ring-opening polymerization of fluorinated oxetane such as POLY-3-FOX™ (available from Omnova Solutions, Inc., Akron Ohio); polyetheralcohols prepared by ring opening addition polymerization of a fluorinated organic group substituted epoxide with a compound containing at least two hydroxyl groups as described in U.S. Pat. No. 4,508,916 (Newell et al); perfluoropolyether diols such as FOMBLIN™ ZDOL ($HOCH_2CF_2O(CF_2O)_{8-12}(CF_2CF_2O)_{8-12}CF_2CH_2OH$, available from Ausimont, Inc., Thorofare, N.J.); Bisphenol A ethoxylate, Bisphenol A propyloxylate, and Bisphenol A propoxylate/ethoxylate (available from Sigma-Aldrich, Milwaukee, Wis.); polytetramethylene ether glycols such as POLYMEG™ 650 and 1000 (available from Quaker Oats Company, Chicago, Ill.) and the TERATHANE™ polyols (available from E.I. duPont de Nemours, Wilmington, Del.); hydroxyl-terminated polybutadiene resins such as the POLY BD™ materials (available from Elf Atochem, Philadelphia, Pa.); the "PeP" series (available from Wyandotte Chemicals Corporation, Wyandotte, Mich.) of polyoxyalkylene tetrols having secondary hydroxyl groups, for example, "PeP" 450, 550, and 650; polycaprolactone polyols with $M_n$ in the range of about 200 to about 2000 such as TONE™ 0201, 0210, 0301, and 0310 (available from Union Carbide Corp., Danbury, Conn.); "PARAPLEX™ U-148"(available from Rohm and Haas Co., Philadelphia, Pa.), an aliphatic polyester diol; polyester polyols such as the MULTRON™ poly(ethyleneadipate)polyols (available from Mobay Chemical Corp., Irvine, Calif.); polycarbonate diols such as DURACARB™ 120, a hexanediol carbonate with $M_n$=900 (available from PPG Industries, Inc., Pittsburgh, Pa.); and the like; and mixtures thereof.

Preferred polyols include 2,2-bis(hydroxymethyl) propionic acid; N,N-bis(2-hydroxyethyl)-3-aminopropyltriethoxysilane; bicine; 3,5-dihydroxybenzoic acid; 2,4-dihydroxybenzoic acid; N-bis(2-hydroxyethyl) perfluorobutyl sul fonamide; 1,2-ethanediol; 1,2- and 1,3-propanediol; 1,3- and 1,4-butanediol; neopentylglycol; 1,5-pentanediol; 3-methyl-1,5-pentanediol; 1,2-, 1,5-, and 1,6-hexanediol; bis(hydroxymethyl)cyclohexane; 1,8-octanediol; 1,10-decanediol; di(ethylene glycol); tri (ethylene glycol); tetra(ethylene glycol); di(propylene glycol); di(isopropylene glycol); tri(propylene glycol); poly (ethylene glycol) diols (number average molecular weight of about 200 to about 1500); poly(di(ethylene glycol) phthalate) diol (having number average molecular weights of, for example, about 350 or about 575); poly(propylene glycols) diols (number average molecular weight of about 200 to about 500); block copolymers of poly(ethylene glycol) and poly(propylene glycol) such as PLURONIC™ L31 (available from BASF Corporation, Mount Olive, N.J.); polydimethylsiloxane diol; fluorinated oxetane polyols made by the ring-opening polymerization of fluorinated oxetane such as POLY-3-FOX™ (available from Omnova Solutions, Inc., Akron Ohio); polyetheralcohols prepared by ring opening addition polymerization of a fluorinated organic group substituted epoxide with a compound containing at least two hydroxyl groups as described in U.S. Pat. No. 4,508,916 (Newell et al); perfluoropolyether diols such as FOMBLIN™ ZDOL ($HOCH_2CF_2O(CF_2O)_{8-12}(CF_2CF_2O)_{8-12}CF_2CH_2OH$, available from Ausimont, Inc., Thorofare, N.J.); 1,4-bis(1-hydroxy-1,1-dihydroperfluoroethoxyethoxy)perfluoro-n-butane ($HOCH_2CF_2OC_2F_4O(CF_2)_4OC_2F_4OCF_2CH_2OH$); 1,4-bis (1-hydroxy-1,1-dihydroperfluoropropoxy)perfluoro-n-butane ($HOCH_2CF_2CF_2O(CF_2)_4OCF_2CF_2CH_2OH$); polycaprolactone diols (number average molecular weight of about 200 to about 600); resorcinol; hydroquinone; 1,6-, 2,5-, 2,6-, and 2,7-dihydroxynaphthalene; 4,4'-biphenol; bisphenol A; bis(4-hydroxyphenyl)methane; and the like; and mixtures thereof.

More preferred polyols include bis(hydroxymethyl) propionic acid; bicine; N-bis(2-hydroxyethyl) perfluorobutylsulfonamide; 1,2-ethanediol; 1,2- and 1,3-propanediol; 1,4-butanediol; neopentylglycol; 1,2- and 1,6-hexanediol; di(ethylene glycol); tri(ethylene glycol); 1,4-bis (1-hydroxy-1,1-dihydroperfluoropropoxy)perfluoro-n-butane ($HOCH_2CF_2CF_2O(CF_2)_4OCF_2CF_2CH_2OH$); fluorinated oxetane polyols made by the ring-opening polymerization of fluorinated oxetane such as POLY-3-FOX™ (available from Omnova Solutions, Inc., Akron Ohio); poly (di(ethylene glycol) phthalate) diol (having number average molecular weights of, for example, about 350 or about 575); poly(ethylene glycol) diols (having number average molecular weights of, for example, about 200, 300, 400); polydimethylsiloxane diol; polypropylene glycol (having a number average molecular weight of, for example, about 425); dimer diol; polycaprolactone diol (having a number average molecular weight of, for example, about 530); 3,5-dihydroxybenzene; bisphenol A; resorcinol; hydroquinone; and mixtures thereof.

Fluorochemical monoalcohols suitable for use in preparing the chemical compositions of the present invention include those that comprise at least one $R_f$ group. The $R_f$ groups can contain straight-chain, branched-chain, or cyclic fluorinated alkylene groups or any combination thereof. The $R_f$ groups can optionally contain one or more heteroatoms (i.e. oxygen, sulfur, and/or nitrogen) in the carbon-carbon chain so as to form a carbon-heteroatom-carbon chain (i.e. a heteroalkylene group). Fully-fluorinated groups are generally preferred, but hydrogen or chlorine atoms can also be present as substituents, provided that no more than one atom of either is present for every two carbon atoms. It is additionally preferred that any $R_f$ group contain at least about 40% fluorine by weight, more preferably at least about 50% fluorine by weight. The terminal portion of the group is generally fully-fluorinated, preferably containing at least three fluorine atoms, e.g., $CF_3O-$, $CF_3CF_2-$, $CF_3CF_2CF_2-$, $(CF_3)_2CF-$, $SF_5CF_2-$. Perfluorinated aliphatic groups (i.e., those of the formula $C_nF_{2n+1}-$) wherein n is 2 to 6 inclusive are the preferred $R_f$ groups, with n=3 to 5 being more preferred and with n=4 being the most preferred.

Useful fluorine-containing monoalcohols include compounds of the following formula II:

$$R_f-Z-R-OH \qquad \text{formula (II)}$$

wherein:

$R_f$ is a perfluoroalkyl group or a perfluoroheteroalkyl group as defined above;

Z is a connecting group selected from a covalent bond, a sulfonamido group, a carboxamido group, a carboxyl group, or a sulfinyl group; and $R^2$ is a divalent straight- or branched-chain alkylene, cycloalkylene, or heteroalkylene group of 1 to 14 carbon atoms, preferably 1 to 8 carbon atoms, more preferably 1 to 4 carbon atoms, and most preferably two carbon atoms. Representative examples of useful fluorine-containing monoalcohols include the following:

$CF_3(CF_2)_3SO_2N(CH_3)CH_2CH_2OH$,
$CF_3(CF_2)_3SO_2N(CH_3)CH(CH_3)CH_2OH$,
$CF_3(CF_2)_3SO_2N(CH_3)CH_2CH(CH_3)OH$,
$CF_3(CF_2)_3SO_2N(CH_2CH_3)CH_2CH_2OH$,
$CF_3(CF_2)_3SO_2N(CH_3)CH_2CH_2SCH_2CH_2OH$,
$C_6F_{13}SO_2N(CH_3)(CH_2)_4OH$,
$CF_3(CF_2)_7SO_2N(H)(CH_2)_3OH$,
$C_8F_{17}SO_2N(CH_3)CH_2CH_2OH$,
$CF_3(CF_2)_7SO_2N(CH_3)(CH_2)_4OH$,
$C_8F_{17}SO_2N(CH_3)(CH_2)_{11}OH$,
$CF_3(CF_2)_7SO_2N(CH_2CH_3)CH_2CH_2OH$,
$CF_3(CF_2)_7SO_2N(C_2H_5)(CH_2)_6OH$,
$CF_3(CF_2)_7SO_2N(C_2H_5)(CH_2)_{11}OH$,
$CF_3(CF_2)_6SO_2N(C_3H_7)CH_2OCH_2CH_2CH_2OH$,
$CF_3(CF_2)_7SO_2N(CH_2CH_2CH_3)CH_2CH_2OH$,
$CF_3(CF_2)_9SO_2N(CH_2CH_2CH_3)CH_2CH_2OH$,
$CF_3(CF_2)_7SO_2N(C_4H_9)CH_2CH_2OH$,
$CF_3(CF_2)_7SO_2N(C_4H_9)(CH_2)_4OH$,
2-(N-methyl-2-(4-perfluoro-(2,6-diethylmorpholinyl))perfluoroethylsulfonamido)ethanol,
$C_3F_7CONHCH_2CH_2OH$,
$C_7F_{15}CON(CH_3)CH_2CH_2OH$,
$C_7F_{15}CON(C_2H_5)CH_2CH_2OH$,
$C_8F_{17}CON(C_2H_5)CH_2CH_2OH$,
$C_8F_{17}CON(CH_3)(CH_2)_{11}OH$,
$C_4F_9CF(CF_3)CON(H)CH_2CH_2OH$
$C_6F_{13}CF(CF_3)CON(H)CH_2CH_2OH$
$C_7F_{15}CF(CF_3)CON(H)CH_2CH_2OH$
$C_2F_5O(C_2F_4O)_3CF_2CONHC_2H_4OH$,
$CF_3O(CF(CF_3)CF_2O)_{1-36}CF(CF_3)CH_2OH$,
$C_2F_5O(CF(CF_3)CF_2O)_{1-36}CF(CF_3)CH_2OH$,
$C_3F_7O(CF(CF_3)CF_2O)_{1-36}CF(CF_3)CH_2OH$,
$C_4F_9O(CF(CF_3)CF_2O)_{1-36}CF(CF_3)CH_2OH$,
$C_3F_7O(CF(CF_3)CF_2O)_{12}CF(CF_3)CH_2OH$,
$CF_3O(CF_2CF_2O)_{1-36}CF_2CH_2OH$,
$C_2F_5O(CF_2CF_2O)_{1-36}CF_2CH_2OH$,
$C_3F_7O(CF_2CF_2O)_{1-36}CF_2CH_2OH$,
$C_4F_9O(CF_2CF_2O)_{1-36}CF_2CH_2OH$,
n-$C_4F_9OC_2F_4OCF_2CH_2OCH_2CH_2OH$
$CF_3O(CF_2CF_2O)_{11}CF_2CH_2OH$,
$CF_3CF(CF_2Cl)(CF_2CF_2)_6CF_2CON(CH_3)CH_2CH_2OH$,
$CF_3(CF_2)_6SO_2CH_2CH_2OH$,
$CF_3(CF_2)_7SO_2CH_2CH_2OH$,
$C_5F_{11}COOCH_2CH_2OH$,
$CF_3(CF_2)_6COOCH_2CH_2OH$,
$C_6F_{13}CF(CF_3)COOCH_2CH_2CH(CH_3)OH$
$C_8F_{17}COOCH_2CH_2OH$,
$C_8F_{17}(CH_2)_{11}N(C_2H_5)CH_2CH_2OH$,
$C_3F_7CH_2OH$,
$CF_3(CF_2)_6CH_2OH$,
Perfluoro(cyclohexyl)methanol
$C_4F_9CH_2CH_2OH$,
$CF_3(CF_2)_5CH_2CH_2OH$
$CF_3(CF_2)_6CH_2CH_2CH_2OH$,
$CF_3(CF_2)_7CH_2CH_2OH$,
$CF_3(CF_2)_7CH_2CH_2SO_2N(CH_3)CH_2CH_2OH$,
$CF_3(CF_2)_5CH_2CH_2SO_2N(CH_3)CH_2CH_2OH$,
$CF_3(CF_2)_3CH_2CH_2SO_2N(CH_3)CH_2CH_2OH$,
$CF_3(CF_2)_7CH_2CH_2CH_2OH$,
$CF_3CF(CF_2H)(CF_2)_{10}(CH_2)_2OH$,
$CF_3CF(CF_2Cl)(CF_2)_{10}(CH_2)_2OH$,
$R_f(CH_2)_2S(CH_2)_2OH$,
$C_4F_9(CH_2)_2S(CH_2)_2OH$,
$R_f(CH_2)_4S(CH_2)_2OH$,
$R_f(CH_2)_2S(CH_2)_3OH$,
$R_f(CH_2)_2SCH(CH_3)CH_2OH$,
$R_f(CH_2)_4SCH(CH_3)CH_2OH$,
$R_fCH_2CH(CH_3)S(CH_2)_2OH$,
$R_f(CH_2)_2S(CH_2)_{11}OH$,
$R_f(CH_2)_2S(CH_2)_3O(CH_2)_2OH$,
$R_f(CH_2)_3O(CH_2)_2OH$,
$R_f(CH_2)_3SCH(CH_3)CH_2OH$, and the like, and mixtures thereof, wherein $R_f$ is a perfluoroalkyl group of 2 to 16 carbon atoms. If desired, rather than using such alcohols, similar thiols can be utilized.

Preferred fluorine-containing monoalcohols include 2-(N-methylperfluoro butanesul fonamido)ethanol; 2-(N-ethylperfluorobutanesulfonam ido)ethanol; 2-(N-methylperfluorobutanesulfonamido)propanol; N-methyl-N-(4-hydroxybutyl)perfluorohexanesulfonamride; 1,1,2,2-tetrahydroperfluorooctanol; 1,1-; dihydroperfluorooctanol; $C_6F_{13}CF(CF_3)CO_2C_2H_4CH(CH_3)OH$; n-$C_6F_{13}CF(CF_3)CON(H)CH_2CH_2OH$; $C_4F_9OC_2F_4OCF_2CH_2OCH_2CH_2OH$; $C_3F_7CON(H)CH_2CH_2OH$; 1,1,2,2,3,3-hexahydroperfluorodecanol; $C_3F_7O(CF(CF_3)CF_2O)_{1-36}CF(CF_3)CH_2OH$; $CF_3O(CF_2CF_2O)_{1-36}CF_2CH_2OH$; and the and mixtures thereof.

Long-chain hydrocarbon monoalcohols suitable for use in the chemical compositions of the present invention comprise at least one, essentially unbranched, hydrocarbon chain having from 10 to about 18 carbon atoms which may be saturated, unsaturated, or aromatic. These long-chain hydrocarbon monoalcohols can be optionally substituted, for example, with groups such as one or more chlorine, bromine, trifluoromethyl, or phenyl groups. Representative long-chain hydrocarbon monoalcohols include 1-octanol, 1-decanol, 1-dodecanol, 1-tetradecanol, 1-hexadecanol, 1-octadecanol, and the like, and mixtures thereof. Preferred long-chain hydrocarbon monoalcohols have 12 to 16 carbon atoms, with 12 to 14 carbon atoms being more preferred and 12 carbon atoms being most preferred for water solubility and performance.

Silane compounds suitable for use in the chemical compositions of the present invention are those of the following formula (I):

$$X-R^1-Si-(Y)_3 \qquad \text{formula (I)}$$

wherein X, $R^1$, and Y are as defined previously. Therefore, these silane compounds contain one, two, or three hydrolyzable groups (Y) on the silicon and one organic group including an isocyanate-reactive or an active hydrogen reactive radical (X—$R^1$). Any of the conventional hydrolyzable groups, such as those selected from the group consisting of alkoxy, acyloxy, heteroalkoxy, heteroacyloxy, halo, oxime, and the like, can be used as the hydrolyzable group (Y). The hydrolyzable group (Y) is preferably alkoxy or acyloxy and more preferably alkoxy.

When Y is halo, the hydrogen halide liberated from the halogen-containing silane can cause polymer degradation when cellulose substrates are used. When Y is an oxime group, lower oxime groups of the formula —N=$CR^5R^6$, wherein $R^5$ and $R^6$ are monovalent lower alkyl groups comprising about 1 to about 12 carbon atoms, which can be the same or different, preferably selected from the group consisting of methyl, ethyl, propyl, and butyl, are preferred.

Representative divalent bridging radicals ($R^1$) include, but are not limited to, those selected from the group consisting of —CH$_2$CH$_2$—, —CH$_2$CH$_2$CH$_2$—, —CH$_2$CH$_2$CH$_2$OCH$_2$CH$_2$—, —CH$_2$CH$_2$C$_6$H$_4$CH$_2$CH$_2$—, and —CH$_2$CH$_2$O(C$_2$H$_4$O)$_2$CH$_2$CH$_2$N(CH$_3$)CH)CH$_2$CH$_2$CH$_2$—.

Other preferred silane compounds are those which contain one or two hydrolyzable groups, such as those having the structures R$^2$OSi(R$^7$)$_2$R$^1$XH and (R$^8$O)$_2$Si(R$^7$)R$^1$XH, wherein R$^1$ is as previously defined, and R$^7$ and R$^8$ are selected from the group consisting of a phenyl group, an alicyclic group, or a straight or branched aliphatic group having from about 1 to about 12 carbon atoms. Preferably, R$^7$ and R$^8$ are a lower alkyl group comprising 1 to 4 carbon atoms.

Following the hydrolysis of some of these terminal silyl groups, inter-reaction with a substrate surface comprising —SiOH groups or other metal hydroxide groups to form siloxane or metal-oxane linkages, e.g.,

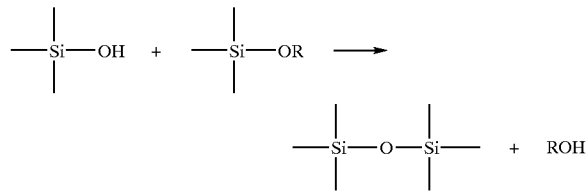

can occur. Bonds thus formed, particularly Si—O—Si bonds, are water resistant and can provide enhanced durability of the stain-release properties imparted by the chemical compositions of the present invention.

Such silane compounds are well known in the art and many are commercially available or are readily prepared. Representative isocyanate-reactive silane compounds include, but are not limited to, those selected from the group consisting of:

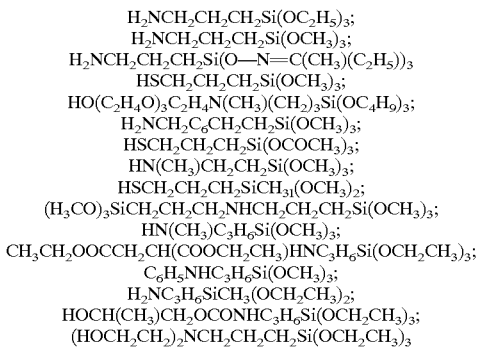

and mixtures thereof.

Representative examples of hydroxyl-reactive silane compounds include, but are not limited to, 3-isocyanatopropyltriethoxysilane, 3-isocyanatopropyltrimethoxysilane, and the like.

The chemical compositions of the present invention optionally may contain water-solubilizing compounds (W-H) comprising one or more water-solubilizing groups and at least one isocyanate-reactive hydrogen containing group. These water-solubilizing compounds include, for example, diols and monoalcohols comprising one or more water-solubilizing groups, added in addition to the one or more polyols and one or more monoalcohols as described above.

The solubilizing groups of the water-solubilizing compounds include, for example, carboxylate, sulfate, sulfonate, phosphate, phosphonate, ammonium, and quaternary ammonium groups. Such groups may be represented as —CO$_2$M, —OSO$_3$M, —O$_3$M, —OPO$_3$M, —PO(OM)$_2$, —NR$_2$HX, —NR$_3$X, —NRH$_2$X, and —NH$_3$X, respectively, wherein M is H or one equivalent of a monovalent or divalent soluble cation such as sodium, potassium, calcium, and NR$_3$H$^+$; X is a soluble anion such as those selected from the group consisting of halide, hydroxide, carboxylate, sulfonates, and the like; and R is selected from the group consisting of a phenyl group, a cycloaliphatic group, or a straight or branched aliphatic group having from about 1 to about 12 carbon atoms. Preferably, R is a lower alkyl group having from 1 to 4 carbon atoms. The group —NR$_3$X is a salt of a water-soluble acid, for example trimethyl ammonium chloride, pyridinium sulfate, etc. or an ammonium substituent. The group —NR$_2$HX is the salt of a water-soluble acid, such as dimethyl ammonium acetate or propionate. The group —NRH$_2$X is the salt of a water-soluble acid, such as methyl ammonium acetate or propionate. The group —NH$_3$X is the salt of a water-soluble acid, such as ammonium acetate or propionate. The salt form can be made by simple neutralization of the acid group with a base such as an amine, a quaternary ammonium hydroxide, an alkali metal carbonate or hydroxide, or the like; or alternatively by simple reaction of the amino group with a carboxylic acid, a sulfonic acid, a halo acid, or the like. Carboxylic acid groups in salt form are preferred because they have been found to impart water solubility to the chemical compositions of the present invention without causing undue loss of the durable stain-release properties imparted by the chemical composition.

The isocyanate-reactive hydrogen containing group is selected from the group consisting of —OH, —SH, NH$_2$, and NRH wherein R is selected from the group consisting of a phenyl group, a cycloaliphatic group, or a straight or branched aliphatic group having from about 1 to about 12 carbon atoms. Preferably, R is a lower alkyl group having from 1 to 4 carbon atoms. A representative suitable diol with a solubilizing group is 1,1-bis(hydroxymethyl)propionic acid and its salts such as its ammonium salt. A representative suitable monoalcohol with a solubilizing group is glycolic acid (HOCH$_2$COOH) and its salts. The amount of water-solubilizing group should be sufficient to solubilize the chemical composition. Typically, the isocyanate: solubilizing group ratio should be from about 3:1 to about 16:1, preferably from about 5:1 to about 11:1. Illustrative water-solubilizing compounds having suitable water-solubilizing groups include, but are not limited to, those independently selected from the group consisting of HOCH$_2$COOH; HSCH$_2$COOH; (HOCH$_2$CH$_2$)$_2$NCH$_2$COOH; HOC(CO$_2$H)(CH$_2$CO$_2$H)$_2$; (H$_2$N(CH$_2$)$_n$CH$_2$)$_2$NCH$_3$ wherein n is an integer of 1 to 3; (HOCH$_2$)$_2$C(CH$_3$)COOH; (HO(CH$_2$)$_n$CH$_2$)$_2$NCH$_3$ wherein n is an integer of 1 to 3; HOCH$_2$CH(OH)CO$_2$Na; N-(2-hydroxyethyl)iminodiacetic acid (HOCH$_2$CH$_2$N(CH$_2$COOH)$_2$); L-glutamic acid (H$_2$NCH(COOH)(CH$_2$CH$_2$COOH)); aspartic acid (H$_2$NCH(COOH)(CH$_2$COOH)); glycine (H$_2$NCH$_2$COOH); 1,3-diamino-2-propanol—N,N,N',N'-tetraacetic acid (HOCH(CH$_2$N(CH$_2$COOH)$_2$)$_2$); iminodiacetic acid (HN(CH$_2$COOH)$_2$); mercaptosuccinic acid (HSCH(COOH)(CH$_2$COOH)); H$_2$N(CH$_2$)$_4$CH(COOH)N(CH$_2$COOH)$_2$; HOCH(COOH)CH(COOH)CH$_2$COOH; (HOCH$_2$)$_2$CHCH$_2$COO)$^-$(NH(CH$_3$)$_3$)$^+$; CH$_3$(CH$_2$)$_2$CH(OH)CH(OH)(CH$_2$)$_3$CO$_2$K; H$_2$NCH$_2$CH$_2$OSO$_3$Na; H$_2$NC$_2$H$_4$NHC$_2$H$_4$SO$_3$H; H$_2$NC$_3$H$_6$NH(CH$_3$)C$_3$H$_6$SO$_3$H; (HOC$_2$H$_4$)$_2$NC$_3$H$_6$OSO$_3$Na; (HOCH$_2$CH$_2$)$_2$NC$_6$H$_4$OCH$_2$CH$_2$OSO$_2$OH; N-methyl-4-(2,3-dihydroxypropoxy)pyridinium chloride, $((H_2N)_2C_6H_3SO_3)^-(NH(C_2H_5)_3)^+$; dihydroxybenzoic acid; 3,4-dihydroxybenzylic acid; 3-(3,5-dihydroxyphenyl)propionic acid; salts of the above amines, carboxylic acids, and sulfonic acids; and mixtures thereof.

The chemical compositions of the present invention can be made according to the following step-wise synthesis. As one skilled in the art would understand, the order of the steps is non-limiting and can be modified so as to produce a desired chemical composition. In the synthesis, the polyfunctional isocyanate compound and the polyol are dissolved together under dry conditions, preferably in a solvent, and then heating the resulting solution at approximately 40 to 80° C., preferably approximately 60 to 70° C., with mixing in the presence of a catalyst for one-half to two hours, preferably one hour. Depending on reaction conditions (e.g., reaction temperature and/or polyfunctional isocyanate used), a catalyst level of up to about 0.5 percent by weight of the polyfunctional isocyanate/polyol mixture may be used, but typically about 0.00005 to about 0.5 percent by weight is required, 0.02 to 0.1 percent by weight being preferred. Suitable catalysts include, but are not limited to, tertiary amine and tin compounds. Examples of useful tin compounds include tin II and tin IV salts such as stannous octoate, dibutyltin dilaurate, dibutyltin diacetate, dibutyltin di-2-ethylhexanoate, and dibutyltinoxide. Examples of useful tertiary amine compounds include triethylamine, tributylamine, triethylenediamine, tripropylamine, bis (dimethylaminoethyl) ether, morpholine compounds such as ethyl morpholine, and 2,2'-dimorpholinodiethyl ether, 1,4-diazabicyclo[2.2.2]octane (DABCO, Sigma-Aldrich Chemical Co., Milwaukee, Wis.), and 1,8-diazabicyclo[5.4.0.]undec-7-ene (DBU, Sigma-Aldrich Chemical Co., Milwaukee, Wis.). Tin compounds are preferred.

A mixture of polyols can be used instead of a single polyol. For example, in a preferred embodiment a polyol mixture comprising a polyol with a water-solubilizing group and a polyol with an $R_f$ group is used. When the polyfunctional isocyanate compound is a triisocyanate, the polyol is preferably a diol to prevent undesired gelation, which can occur when polyols having three or more hydroxyl groups are reacted with a triisocyanate.

The resulting isocyanate functional urethane oligomers and compounds are then further reacted with one or more of the monoalcohols described above. The monoalcohol(s) is (are) added to the above reaction mixture, and react(s) with a substantial portion of the remaining NCO groups. The above temperatures, dry conditions, and mixing are continued one-half to two hours, preferably one hour. Terminal fluorine-containing and/or long-chain hydrocarbon groups are thereby bonded to the isocyanate functional urethane oligomers and compounds. These oligomers and compounds are further functionalized with silane groups described above by reacting any of the remaining NCO groups in the resulting mixture with one or more of the reactive hydrogen-containing silane compounds described above. Thus, the silane compound(s) is (are) added to the reaction mixture, using the same conditions as with the previous additions. Aminosilanes are preferred, because of the rapid and complete reaction that occurs between the remaining NCO groups and the silane compound's amino groups. Isocyanato functional silane compounds may be used and are preferred when the ratio of polyfunctional isocyanate compound to the polyol and monoalcohol is such that the resulting oligomer has a terminal hydroxyl group.

Water-solubilizing compounds can be added and reacted with NCO groups under the conditions described above in any of the steps described above. For example, as mentioned above, the water-solubilizing compound can be added as a mixture with the polyol. Alternatively, the water-solubilizing compound can be added (a) after reaction of the polyol with the polyfunctional isocyanate, (b) as a mixture with the monoalcohol(s), (c) after reaction of the polyol and monoalcohol with the polyfunctional isocyanate, (d) as a mixture with the silane, and (e) after the reaction of the polyol, monoalcohol, and silane with the polyfunctional isocyanate. When the water-solubilizing compound is a monoalcohol, it is preferably added as a mixture with the fluorine-containing monoalcohol or the long-chain hydrocarbon monoalcohol. When the water-solubilizing compound is a diol, it is preferably added as a mixture with the polyol.

When the chemical composition of the present invention contains a urethane oligomer having one or more carboxylic acid groups, solubility of the composition in water can be further increased by forming a salt of the carboxylic acid group(s). Basic salt-forming compounds, such as tertiary amines, quaternary ammonium hydroxides, and inorganic bases, including, but not limited to, those selected from the group consisting of sodium hydroxide, potassium hydroxide, cesium hydroxide, lithium hydroxide, calcium hydroxide, magnesium hydroxide, zinc hydroxide, and barium hydroxide, may be used in a sufficient amount (i.e., in an amount to maintain a pH of greater than about 6). These basic salt-forming compounds preferably can be added in the water phase, but optionally in the preparation of the urethane oligomers, to form salts with the incorporated, pendant and/or terminal carboxylic acid groups on the urethane oligomer. Examples of useful amine salt-forming compounds include, but are not limited to, those selected from the group consisting of ammonia, trimethylamine, triethylamine, tripropylamine, triisopropylamine, tributylamine, triethanolamine, diethanolamine, methyldiethanolamine, morpholine, N-methylmorpholine, dimethylethanolamine, and mixtures thereof. Preferred salt forming compounds.include those selected from the group consisting of ammonia, trimethylamine, dimethylethanolamine, methyldiethanolamine, triethylamine, tripropylamine, and triisopropylamine, since the chemical compositions prepared therefrom are not excessively hydrophilic upon coating and curing. Since certain salts formed by the reaction of salt forming compounds,- such as potassium hydroxide in combination with a carboxylic acid group, could result in undesired reaction with NCO groups, it is preferred to add the salt forming compound in a water phase after all of the diols, alcohol, and silane compounds have been reacted with the NCO groups of the polyfunctional isocyanate compound.

The molar ratios of the components of the chemical composition of the present invention are as follows:

one or more polyfunctional isocyanate compounds and one or more polyols are used in a molar ratio of from about 1:0.25 to about 1:0.45;

one or more polyfunctional isocyanate compounds and one or more monoalcohols (as discussed above) are used in a molar ratio of from about 1:0.30 to about 1:0.60;

one or more polyfunctional isocyanate compounds and one or more silanes (of formula I above) are used in a molar ratio of from about 1:0.001 to about 1:0.15; and one or more polyfunctional isocyanate compounds and one or more water-solubilizing compounds (as discussed above) are used in a molar ratio of from about 1:0 to about 1:1.6. The preferred molar ratios are as follows:

one or more polyfunctional isocyanate compounds and one or more polyols are used in a molar ratio of from about 1:0.35 to about 1:0.42;

one or more polyfunctional isocyanate compounds and one or more monoalcohols (as discussed above) are used in a molar ratio of from about 1:0.45 to about 1:0.55;

one or more polyfunctional isocyanate compounds and one or more silanes (of formula I above) are used in a molar ratio of from about 1:0.03 to about 1:0.08; and one or more polyfunctional isocyanate compounds and one or more water-solubilizing compounds (as discussed above) are used in a molar ratio of from about 1:0 to about 1:1.0. These molar ratios also apply to the inventive coating compositions, articles and methods.

The coating composition of the present invention comprises a solution comprising the chemical compositions of the present invention and at least one solvent. When applied as coatings, the chemical compositions of the present invention, comprising one or more urethane oligomers, impart stain-release characteristics and exhibit durability (i.e. they resist being worn-off) when exposed to wear and abrasion from use, cleaning, and the elements. In addition, the chemical compositions of the present invention are capable of improving one or more of the oil- and/or water-repellency, stain- and/or soil-repellency and soil release properties of substrates treated with the compositions.

The chemical compositions of the present invention can be dissolved in a variety of solvents to form coating compositions suitable for use in coating the chemical compositions of the present invention onto a substrate. Coating compositions preferably contain from about 0.1 to about 10 percent chemical composition, based on the weight of the coating composition. Preferably the chemical composition is used in the coating composition at about 1 to about 5 weight percent, most preferably from about 2 to about 3 weight percent. It has been found that the best stain-release properties are obtained when the coating composition is a visually clear solution. Suitable solvents include water, alcohols, esters, glycol ethers, amides, ketones, hydrocarbons, chlorohydrocarbons, chlorocarbons, and mixtures thereof. Depending upon the substrate to which the composition is being applied, water is the preferred solvent because it does not raise any environmental concerns and is accepted as safe and non-toxic.

Useful alcohol solvents include, but are not limited to, amyl alcohol, n-butanol, diisobutyl carbinol, ethanol, 2-ethylhexanol, hexylene glycol, isobutanol, isopropanol, amyl alcohol, 2-methyl butanol, n-pentanol, n-propanol, and mixtures thereof.

Useful ester solvents include, but are not limited to, amyl acetate, n-butyl acetate, t-butyl acetate, Butyl CARBITOL™ Acetate ($C_4H_9O(C_2H_4O)_2C(O)CH_3$), Butyl CELLOSOLVE™ Acetate ($C_4H_9OCH_2CH_2OC(O)CH_3$), CELLOSOLVE™ Acetate ($C_2H_5OCH_2CH_2OC(O)CH_3$), methyl acetate, ethyl acetate, isopropyl acetate, isobutyl acetate, Methyl PROPASOL™ Acetate ($CH_3OCH_2CH(CH_3)OC(O)CH_3$), n-propyl acetate, n-butyl propionate, UCAR™ Ester EEP ($C_2H_5OC_2H_4OC(O)CH_2CH_3$), UCAR™ Filmer IBT (($CH_3)_2CHCH(OH)C(CH_3)_2CH_2OC(O)CH(CH_3)_2$), n-pentyl propionate, and dibasic esters such as dimethyl succinate, dimethyl glutarate, dimethyl adipate, and mixtures thereof.

Useful glycol ether solvents include, but are not limited to, butoxytriglycol ($C_4H_9O(C_2H_4O)_3H$), Butyl CARBITOL™ ($C_4H_9O(C_2H_4O)_2H$), Butyl CELLOSOLVE™ ($C_4H_9OCH_2CH_2OH$), CARBITOL™ ($C_2H_5O(C_2H_4O)_2H$), CELLOSOLVE™ ($C_2H_5OCH_2CH_2OH$), poly(ethylene glycol) butyl ether (ECOSOFT™ Solvent PB, $C_4H_9O(C_2H_4O)_xH$), poly(ethylene glycol) ethyl ether (ECOSOFT™ Solvent PE $C_2H_5O(C_2H_4O)_xH$), poly(ethylene glycol) hexyl ether (ECOSOFT™ Solvent PH $C_6H_{13}O(C_2H_4O)_xH$), ethoxytriglycol ($C_2H_5O(C_2H_4O)_3H$), Hexyl CARBITOL™ ($C_6H_{13}O(C_2H_4O)_2H$), Hexyl CELLOSOLVE™ ($C_6H_{13}OCH_2CH_2OH$), methoxytriglycol ($CH_3O(C_2H_4O)_3H$), Methyl CARBITOU™ ($CH_3O(C_2H_4O)_2H$), Methyl CELLOSOLVE™ ($CH_3OCH_2CH_2OH$), Propyl CELLOSOLVE™ ($C_3H_7OCH_2CH_2OH$), and mixtures thereof.

Useful amide solvents include, but are not limited to, dimethyl acetamide, N-methylpyrrolidone, mixtures thereof, and the like. Useful ketone solvents include, but are not limited to, acetone, diacetone alcohol (($CH_3)_2C(OH)CH_2C(O)CH_3$), diisobutyl ketone, isobutyl heptyl ketone (ECOSOFT™ Solvent IK, $(CH_3)_2CHCH_2C(O)CH_2CH(CH_3)CH_2CH(CH_3)_2$), isophorone, methyl ethyl ketone, methyl n-amyl ketone, methyl isobutyl ketone, mixtures thereof, and the like.

Useful hydrocarbon solvents include, but are not limited to, toluene, xylene, mixtures thereof, and the like. Useful chlorohydrocarbon solvents include, but are not limited to, 4-chlorotrifluoromethylbenzene, 3,4-bis(dichloro)trifluoromethylbenzene, mixtures thereof, and-the like.

The preceding trademarked solvents are trademarked by Union Carbide, and are available from Union Carbide (Danbury, Conn.) or Sigma-Aldrich (Milwaukee, Wis.).

The coating compositions of the present invention can be applied as to a wide variety of substrates resulting in an article that displays durable stain-release properties. The article of the present invention comprises a substrate having one or more surfaces and on the one or more surfaces of this substrate is a cured coating derived from at least one solvent and a chemical composition of the present invention. After application and curing of the coating composition, the substrate displays durable stain-release properties.

The coating compositions of the present invention can be applied to a wide variety of substrates, including, but not limited to, hard substrates and fibrous substrates. Hard substrates include, but are not limited to, glass, ceramic, masonry, concrete, natural stone, man-made stone, metals, wood, plastics, and painted surfaces. Fibrous substrates include woven, knit, and nonwoven fabrics, textiles, carpets, leather, and paper. Substrates can have flat or curved surfaces and may be particulate and fibrous in nature, as well. Preferred substrates are capable of imbibing a liquid and are therefore porous. Such substrates are particularly subject to staining and soiling, but also benefit greatly from the chemical compositions of the present invention because the coating composition can penetrate into the porous substrate surface. Substrates comprising nucleophilic groups selected from the group consisting of —OH and —NHR, wherein R is H or lower alkyl are also preferred because they can bond to the silane groups of the chemical compositions of the present invention increasing durability. Substrates of this type include those having siliceous and metallic surfaces.

Representative examples of substrates that can be coated with the coating composition include lenses used in ophthalmic spectacles, sunglasses, optical instruments, illuminators, watch crystals, and the like; plastic window glazing; signs; decorative surfaces such as wallpaper and vinyl flooring; composite or laminated substrates such as FORMICA™ brand sheeting (Formica Corp., Warren, N.J.) or laminated flooring (e.g., PERGO™ brand flooring (Pergo Inc., Raleigh, N.C.)); ceramic tile and fixtures (sinks, showers, toilets); natural and man-made stones; decorative and paving stones; cement and stone sidewalks and driveways; particles that comprise grout or the finished surface of applied grout; wood furniture surface (desktops, tabletops); cabinet surfaces; wood flooring, decking, and fencing; leather; paper; fiber glass fabric and other fiber-containing fabrics; textiles; carpeting; and the like.

Since coatings prepared from the coating compositions can render metal surfaces resistant to soils, the optical properties of metal surfaces like those on decorative metal strips and mirrors can be preserved longer. The coating compositions can make wood surfaces more resistant to food and beverage stains while helping to maintain a lustrous appearance. In addition, the coating compositions can be applied as a protective coating on aircraft wings, boat hulls, fishing line, medical surfaces, and siding, and can be used in food release, mold release, adhesive release applications, and the like. Decorative stones include, for example, marble, granite, limestone, slate, and the like.

It is desirable to avoid the formation of mildew and algae on decorative stone for aesthetic and functional purposes. Application of the coating compositions of the present invention to stone eliminates the formation of mildew and algae for several months on near-horizontal surfaces.

Preferred substrates that can be coated with the coating composition of the present invention are hard, porous substrates, such as decorative and paving stones; cement and stone sidewalks and driveways; particles that comprise grout or the finished surface of applied grout, wood furniture surface (desktops, tabletops); cabinet surfaces; wood flooring, decking, and fencing; and the like.

To impart stain-release characteristics to a substrate, having of one or more surfaces, (a) the coating composition of the present invention is applied onto one or more surfaces of the substrate and (b) the coating composition is allowed to cure (i.e. dry), preferably at ambient temperature.

Any method of application that produces a thin coating of the coating composition on the substrate surface may be used. Examples of useful application methods include, but are not limited to, spraying, padding, dipping (immersing the substrate in the coating composition), spin-coating, flow coating, and painting. When coating flat substrates of appropriate size, knife-coating or bar-coating may be used to ensure uniform coatings of the substrate.

The coating compositions can be applied to a substrate in any desired thickness. Coatings as thin as a few microns can offer excellent low surface energy, stain-resistance, and stain-release. However, thicker coatings (e.g., up to about 20 microns or more) can also be used. Thicker coatings can be obtained by applying to the substrate a single thicker layer of a coating composition that contains a relatively high concentration of the chemical composition of the present invention. Thicker coatings can also be obtained by applying successive layers to the substrate of a coating composition that contains a relatively low concentration of the chemical composition of the present invention. The latter can be done by applying a layer of the coating composition to the substrate and then drying prior to application of a successive layer. Successive layers of the coating can then be applied to dried layers. This procedure can be repeated until the desired coating thickness is achieved.

After the substrate is coated with the coating composition, the coated substrate is dried, preferably at ambient temperature or at an elevated temperature, more preferably at ambient temperature, to provide a cured coating. The coating composition is "cured" when dried and the solvent is evaporated and a cured coating is provided. This cure preferably takes place at approximately 15 to 35° C. (i.e. ambient temperature) until dryness is achieved, up to approximately 24 hours. During this time and over a subsequent period of time, the chemical composition can also form chemical bonds with the substrate and between molecules of the chemical composition.

The resulting coated substrates coated with a cured coating, derived from at least one solvent and a chemical composition of the present invention, have been found to be non-staining and/or to release stains with simple washing methods. The cured coating of the chemical compositions of the present invention have also been found to be durable and hence to resist being worn-off due to wear and abrasion from use, cleaning, and the elements.

Objects and advantages of this invention are further illustrated by the following examples and evaluations, but the particular materials and amounts thereof recited in these examples, as well as other conditions and details, should not be construed to unduly limit this invention. In the examples, where weight percent or parts by weight are indicated, these are based on the weight of the entire composition unless specified otherwise.

EXAMPLES

Glossary

APTES—3-Aminopropyltriethoxysilane, available from Sigma-Aldrich, Milwaukee, Wis.

APTMS—3-Aminopropyltrimethoxysilane, available from Sigma-Aldrich, Milwaukee, Wis.

Bicine-$(HOCH_2CH_2)_2NCH_2COOH$, available from Sigma-Aldrich, Milwaukee, Wis.

CA-Citric acid, $HOC(CO_2H)(CH_2CO_2H)_2$, available from Sigma-Aldrich, Milwaukee, Wis.

n-$C_6F_{13}CF(CF_3)CO_2CH_2CH_2CH(CH_3)OH$—Prepared by reaction of n-$C_6F_{13}CF(CF_3)COF$ (U.S. Pat. No. 6,013,795, Example A6 (Manzara et al.)) with $HOCH_2CH_2CH(CH_3)OH$ essentially as described in Example D13 of Manzara.

n-$C_6F_{13}CH_2CH_2OH$—Available from Sigma-Aldrich, Milwaukee, Wis.

$C_7F_{15}CH_2OH$—Available from Sigma-Aldrich, Milwaukee, Wis.

$C_6F_{13}CF(CF_3)CONHCH_2CH_2OH$—Prepared from n-$C_6F_{13}CF(CF_3)CO_2CH_3$ (U.S. Patent No. 6,013,795 (Manzara et al.), Example C3 and 2-aminoethanol essentially as described in Joullie, M. M., JACS, 77, 6662 (1955).

n-$C_4F_9OC_2F_4OCF_2CH_2OCH_2CH_2OH$—Prepared from 1,1-dihydroperfluoro-2-(butoxyethoxy)ethanol (Example 3 of U.S. Pat. No. 5,437,812) (Janulis et al.)) according to Example 23 of Janulis.

n-$C_3F_7CONHCH_2CH_2OH$—Prepared as in Hauptschein, M. et al, JACS, 77, 4930 (1955).

DAWN™ Detergent—A dishwashing product available from Procter & Gamble, Cincinnati, Ohio.

DBTDL—Dibutyltin dilaurate, $[CH_3(CH_2)_3]_2Sn[CO_2(CH_2)_{10}CH_3]_2$, available from Sigma-Aldrich, Milwaukee, Wis.

1-Decanol—$C_{10}H_{21}OH$, available from Sigma-Aldrich, Milwaukee, Wis.

DHBA—3,5-Dihydroxybenzoic acid, available from Sigma-Aldrich, Milwaukee, Wis.

1-Dodecanol—$C_{12}H_{25}OH$, available from Sigma-Aldrich, Milwaukee, Wis.

DS-10-RHODACAL™ DS-10, dodecylbenzenesulfonic acid sodium salt, available from Rhone-Poulenc Surf. & Spec., Rhone-Poulenc, France.

FBSEE—$C_4F_9SO_2N(CH_2CH_2OH)_2$, having an equivalent weight of 193.6, can be made in two stages by reacting PBSF with ammonia and ethylenechlorohydrin, using a procedure essentially as described in Example 1 of U.S. Pat. No. 2,803,656 (Ahlbrecht et al.).

FC-248—Prepared using a procedure essentially as described in Example 19 of U.S. Pat. No. 3,574,791 (Sherman et al.), and substituting polyethylene glycol of $MW_{av}$=4000 for polyethylene glycol of $MW_{av}$=3000 and generating a 50/50 copolymer instead of a 60–40 copolymer.

FC-672—Acrylate Stain Blocker, available from Minnesota Mining and Manufacturing, St. Paul, Minn.

GA—Glycolic acid, $HOCH_2COOH$, available from Sigma-Aldrich, Milwaukee, Wis.

HDI—Hexamethylene-1,6-diisocyanate, DESMODUR™ H, available from Bayer Corporation, Pittsburgh, Pa.

2,2,3,3,4,4,4-Heptafluorobutanol —$CF_3C_2F_4CH_2OH$, available from Sigma-Aldrich, Milwaukee, Wis.

1-Hexadecanol—$C_{16}H_{33}OH$, available from Sigma-Aldrich, Milwaukee, Wis.

HMP—2,2-bis(hydroxymethyl)propionic acid, available from Sigma-Aldrich, Milwaukee, Wis.

HMPEPB—1,4-B is(hydroxymethoxyperfluoroethoxy) perfluorobutane, $HOCH_2CF_2CF_2OCF_2CF_2CF_2CF_2OCF_2CF_2CH_2OH$, was made as follows:

Acid fluoride-terminated di(perfluorotetramethylene oxide) ($FCO(CF_2)_2O(CF_2)_4O(CF_2)_2COF$) (1100 g, 22% purity by GLC) was added dropwise to well-stirred methanol (250 ml), and the resulting mixture was stirred for one hour at room temperature and then poured over 1 L of cracked ice. The oily layer that separated was extracted with 200 ml of diethyl ether, and the resulting ether extract was washed three times with water and dried with magnesium sulfate. After removal of the ether by rotary evaporation, the resulting material was subjected to distillation at 10 mm Hg until the temperature of distilling material reached 85° C. The remaining undistilled, crude dimethyl ester (667 g) was reduced to the dialcohol with sodium borohydride. Thus, sodium borohydride (54.5 g) was slurried in 400 ml of THF and brought to reflux, and maintained at reflux while the dimethyl ester (333.5 g) was added, followed by three hours of refluxing. The resulting mixture was cautiously poured over 2 L of cracked ice containing 125 ml concentrated sulfuric acid, forming an oily layer. This reduction procedure was repeated on the remaining dimethyl ester, and the resulting oily layers were combined, washed with aqueous sodium carbonate solution, dried over anhydrous calcium sulfate and distilled. The fraction which distilled at 77–120° C. (1–3.7 mm Hg) crystallized at room temperature. Recrystallization of the resulting crystals from benzene containing a small amount of methylene chloride yielded 167.4 g of the expected diol.

The acid fluoride —terminated di(perfluorotetramethylene oxide was prepared by photolysis of perfluorooxydipropionyl fluoride as described in Zollinger, J. L. et al, *J. Macromol. Sci.—Chem.*, A3(7), pp. 1443–1464 (1969). The perfluorooxydipropionyl fluoride was made by electrochemical fluorination of oxydipropionyl fluoride as described in U.K. Pat. No. 858,671.

MA—Malic acid, available from Sigma-Aldrich, Milwaukee, Wis.

MDI—Diphenylmethane 4,4'-diisocyanate, available as DESMODUR M™ from Bayer Corporation, Pittsburgh, Pa.

MeFBSE—$C_4F_9SO_2N(CH_3)CH_2CH_2OH$, having an equivalent weight of 357, can be made in two stages by reacting PBSF with methylamine and ethylenechlorohydrin, using a procedure essentially as described in Example 1 of U.S. Pat. No. 2,803,656 (Ahlbrecht, et al.).

MeFOSE—$C_8F_{17}SO_2N(CH_3)CH_2CH_2OH$, having an equivalent weight of 557, can be made in two stages by reacting POSF with methylamine and ethylenechlorohydrin, using a procedure essentially as described in Example 1 of U.S. Pat. No. 2,803,656 (Ahlbrecht et al.), or alternatively by reacting N-methylperfluorooctylsulfonamide with ethylene glycol carbonate, using the procedure essentially as described in Example 7 of U.S. Pat. No. 3,734,962 (Niederprum et at.).

MIBK—Methylisobutyl ketone, $(CH_3)_2CHCH_2C(O)CH_3$, available from Sigma-Aldrich, Milwaukee, Wis.

MPEG 350—CARBOWAX™ 350, Methoxypolyethylene glycol ($MW_{av}$=350), available from Union Carbide, Danbury, Conn.

MPEG 550—CARBOWAX™ 550, Methoxypolyethylene glycol ($MW_{av}$=550), available from Union Carbide, Danbury, Conn.

MPEG 750—CARBOWAX™ 750, Methoxypolyethylene glycol ($MW_{av}$=750), available from Union Carbide, Danbury, Conn.

MPEG 2000—CARBOWAX™ 2000, Methoxypolyethylene glycol ($MW_{av}$=2000), available from Union Carbide, Danbury, Conn.

MPTMS—3-Mercaptopropyltrimethoxysilane, available from Sigma-Aldrich, Milwaukee, Wis.

MSA—Mercaptosuccinic acid, available from Sigma-Aldrich, Milwaukee, Wis.

N100—DESMODUR™ N-100, a hexamethylene-1,6-diisocyanate based polyfunctional isocyanate compound containing biuret groups, available from Bayer Corporation, Pittsburgh, Pa.

N3300—DESMODUR™ N-3300, a hexamethylene-1,6-diisocyanate based polyfunctional isocyanate compound with an NCO equivalent weight of 195 and containing 21.3–21.8 weight % NCO, available from Bayer Corporation, Pittsburgh, Pa.

N3600—DESMODUR™ N-3600, a hexamethylene-1,6-diisocyanate based polyfunctional isocyanate compound with an NCO equivalent weight of 183, available from Bayer Corporation, Pittsburgh, Pa.

1—Octadecanol—$C_{18}H_{37}OH$, available from Sigma-Aldrich, Milwaukee, Wis.

1—Octanol—$C_8H_{17}OH$, available from Sigma-Aldrich, Milwaukee, Wis.

PBSF—$C_4F_9SO_2F$, perfluorobutanesulfonyl fluoride, available from Sigma-Aldrich, Milwaukee, Wis.

PEG 1000—CARBOWAX™ 1000, Polyethylene glycol ($MW_{av}$=1000), available from Union Carbide, Danbury, Conn.

PEG 1450—CARBOWAX™ 1450, Polyethylene glycol ($MW_{av}$=1450), available from Union Carbide, Danbury, Conn.

PEG 3350—CARBOWAX™ 3350, Polyethylene glycol ($MW_{av}$=3350), available from Union Carbide, Danbury, Conn.

Perfluorocyclohexylmethanol-cyc-$C_6F_{11}CH_2OH$, available from ABCR GmbH and Co., Karlsruhe, Germany.

Poly-3-Fox™ diol—$H(OCH_2C(CH_3)(CH_2OCH_2CF_3)CH_2)_xOH$, available from Omnova Solutions Inc., Akron, Ohio.

POSF—$C_8F_{17}SO_2F$, perfluorooctanesulfonyl fluoride, commercially available as FLUORAD™ FX-8 fluorochemical intermediate from Minnesota Mining and Manufacturing Company, St. Paul, Minn.

TEOS—Tetraethylorthosilicate, available from Sigma-Aldrich, Milwaukee, Wis.

1-Tetradecanol—$C_{14}H_{29}OH$, available from Sigma-Aldrich, Milwaukee, Wis.

Test Methods

Test Method I—Stain Test

Zanger Blue limestone tiles (available from Color Tile, Maplewood, Minn.) (30.5 cm by 30.5 cm by 1.0 cm thick) were divided into 6 sections (10.2 cm by 15.2 cm) and washed with water thoroughly and allowed to dry at room temperature overnight. A 3% aqueous solution of the chemical composition to be evaluated was coated onto the surface by wiping twice with a paper towel saturated with the chemical composition. Each of the resulting treated tile sections was then allowed to dry at ambient laboratory temperature for at least 12 hours before testing. Slate and marble tile, concrete brick, and clear pine wood were similarly treated and tested.

A spot test was used to visually rate the ability of the treated tile sections to prevent a test fluid drop from staining the tile after a given exposure period. The following test fluids were used:

(1) Grape juice fluid (GF)

(2) PENNZOIL™ ATF Automatic transmission fluid (TF) (available from Pennzoil-Quaker State Co., Houston, Tex.)

(3) Used 10W30 motor oil (Mont.)

(4) PAUL MASSON™ Burgundy wine (WIN)

(5) Water saturated with TASTER'S CHOICE™ coffee (COF)

(6) STP™ heavy duty brake fluid (BF)

(7) MAZOLA™ corn oil (CO) (available from Unilever Best Foods North America) A drop of each of the test fluids was placed on each of the treated tile sections. After 20–24 hours, the drops were removed by wiping with a clean, dry, paper towel, and the tile was washed and scrubbed with DAWN™ liquid dishwashing soap mixed at 6 weight percent with tap water and rinsed with tap water. The visual appearance of the spot where each drop of test fluid had been placed was rated on a scale of 0–5 as shown below. A rating of 0 represented the best stain-release performance of a chemical composition treatment of the tile surface.

0=no visible stain

1=trace of stain visible

2=outline of drop barely visible

3=outline of drop visible

4=dark outline of drop

5=dark stain which has spread

Test Method II—Scrubbing Test to Measure Durability

To determine the chemical composition treatment's durability, the following scrubbing test was used. A detergent solution was prepared consisting of 6% (w/w) DAWN™ liquid dishwashing soap in water. Each chemical composition treated limestone tile was contacted with the detergent solution. The resulting wet surface was scrubbed back and forth 10,000 times with a 12 cm by 3 cm stiff nylon bristle brush held lengthwise, using a Washability & Wear Tester from Paul N. Gardner Company, Inc., Pompano Beach, Fla. After rinsing with water, the tile was allowed to dry under ambient conditions for 24 hours before spot testing using Test Method 1.

Test Method III—Gel Permeation Chromatography (GPC) Molecular Weight Determination Sufficient solution was weighed to give 50 mg of solids which was then diluted with 10.0 ml of Tetrahydrofuran (THF). The solution was run through a 0.45 micron syringe filter and its molecular weight was determined using Size Exclusion Chromatography (SEC). The SEC system was operated under the following conditions:

Sample Injection: 200 microliters

Mobile Phase: Tetrahydrofuran-UV Grade (Available from Burdick & Jackson, Muskegon, Mich.).

Flow Rate: 1.0 ml/min.

Detector: Waters 410 Refractive Index; 40° C., Sensitivity=1 Columns: UltraStyragel -6 Columns; 30 cm×7.8 mm each ($10^7$, $10^6$, $10^5$, $10^4$, 500, 100 angstroms); available from Waters Corporation. Milford, Mass.; columns were held at 40° C.

Standards: Polystyrene, narrow dispersity; ranging 7.50e6–580 Mp; ($3^{rd}$ order polynomial fit).

The samples were run and effective molecular weight distribution plots were calculated using narrow molecular weight polystyrene standards for calibration. A lower molecular weight cut-off of 500 Dalton was used in processing the data. Number average (Mn), weight average (Mw), and polydispersity (Mw/Mn) values were obtained for each sample run.

Test Method IV—Application of Compositions to Polyester/Cotton Woven Fabrics (Treating Fabrics)

A 65% polyester, 35% cotton woven twill fabric (8 ounces/$yd^2$ (271 grams/square meter) basis wt; available from Avondale Mills, Graniteville, S.C.) was dipped into a bath of the diluted chemical composition and immediately sent through a nip. The concentration of the bath was adjusted to produce a fabric that when dry had a fluorochemical solids coating ranging from 0.2 to 0.45% solids on the fabric total weight. The bath also contained a glyoxal-type resin, PERMAFRESH™ ULF (Omnova Solutions, Inc., Chester, S.C.), at about 10% on the weight of the bath, a citric acid activated magnesium chloride catalyst, CATALYS™ 531 (Omnova Solutions, Inc.), at about 2.5% on the weight of the bath, and a nonionic surfactant, PATWET™ LF-55 (Yorkshire Pat-Chem Inc., Greenville, S.C.), at about 0.1% on the weight of the bath. The fabric was dried and cured for 10 minutes at 150° C. Various performance tests were run on the fabric.

Test Method V—Application of Compositions to Cotton/Polyester Knit Fabric (Treating Fabrics)

Knit fabrics (60/40 cotton/polyester pique knit (5 ounces/$yd^2$ (169 grams/square meter) basis wt; available from Cleveland Mills, Lawndale, N.C.)) were treated in the same way as the woven fabrics, with the exception that FREEREZ™ 845 (Noveon, Inc., Cleveland, Ohio.), a pre-catalyzed glyoxal-type resin, was used in place of the resin and catalyst combination above (Test Method IV), at about 12% on the weight of the bath.

Test Method VI—Performance Test—Oil-repellency

This test measured the resistance of the treated fabric (as per Test Method IV or V) to oily liquids. A drop of one standard surface tension fluid (of a series of 8, with decreasing surface tensions) was dropped on a treated fabric. If after thirty seconds there was no wetting, the next highest standard number fluid (next lowest surface tension) was tested on the treated fabric. When the lowest number fluid soaked into the fabric, the next lower number was the given rating. For example, if a fabric received a three rating, the number four fluid had wet the treated fabric. A more detailed description of the test is written in the 3M Protective Material Division's "Oil-repellency Test I" method (Document #98-0212-0719-0).

Test Method VII—Performance Test—Water-repellency

This test measured the water-repellency of treated fabrics (treated as per Test Method IV or V). A drop of one standard surface tension fluid (of a series of 11, with decreasing surface tensions, based on water and water/isopropyl alcohol mixtures where 100% water is a 0 rating and 100% IPA is a 10 rating) was placed on a treated fabric to form a bead. If after thirty seconds there is no wetting of the treated fabric, then the next highest standard number fluid (next lowest surface tension) was tested. When the lowest number fluid soaked into the treated fabric, the next lower number was the given the rating. For example, the fabric received a three rating, if the number four fluid wetted the treated fabric. A more detailed description of the test is written in the 3M Protective Material Division's "Water-repellency Test II" method (Document #98-0212-0721-6).

Test Method VIII—Performance Test—Artificial Antisoilini

This test measured the resistance of the treated carpet (treated as per Test Method IV or V) to soil. A 12 in by 18 in sample of carpet was divided into three to six sections. One section was left untreated as the control and the other was treated with a protective finish and let dry at room temperature where T was = or <100 degrees Fahrenheit (37.8 degrees Celsius) and relative humidity was <50%. The treated article was affixed in a drum filled with 40 ceramic pellets (half weighing 10 g and half weighing 20 g) and 20 g of 3M™ standard oily test soil (3M™ Protective Materials Division Product 41-4201-6292-1, available from Minnesota Mining and Manufacturing, St. Paul, Minn.). The drum was rolled for 10 minutes and then rolled the opposite direction for 10 minutes. The carpet was removed and vacuumed in two directions and the treated areas were compared with the untreated area. Direct comparisons were made within the same sample and were rated from 1 to 5 where 3 was untreated, 1 was more soiled and 5 was no significant soiling. A more detailed description of the test is written in the AATC "Artificial Antisoiling Test" method 123-1995.

Test Method IX—Performance Test—Acid Stain-resistance

This test measured the resistance of the treated fabric (treated as per Test Method IV or V) to red acid dye stain. Test Method AATCC TM 175–1998 was followed.

Test Method X—Performance Test—Oil-repellency—Durability

This test was performed on treated fabric (treated as per Test Method IV or V) that had subsequently been washed for 5, 10, or 20, consecutive launderings, followed by tumble drying, as described in the 3M™ Protective Materials Division "Laboratory Laundering Procedures" for home laundering simulation (Document #98-0212-0703-4). (In Tables relating to Examples in which this Test Method was used, the Test Method may be abbreviated as "O/R.")

Test Method XI—Performance Test—Stain-release

This test evaluated the release of forced-in oil-based stains from a treated fabric (treated as per Test Method IV or V) surface during simulated home laundering. Five drops of mineral oil, Stain K, (KAYDOL™, Witco Chemical Co., Bradford, Pa.) were dropped onto the treated fabric surface in a single puddle, and a separate puddle of 5 drops of MAZOLA™ corn oil, Stain E, was dropped on the fabric, and a third puddle, Stain C, of 5 drops of dirty motor oil (3M Co.) was dropped onto the fabric. (In Tables relating to Examples when these three Stains were used, they may be referred to as "K", "E," and "C," respectively). The puddles were covered with glassine paper, and weighted with a five-pound weight each for 60 seconds. The weights and glassine paper were removed from the fabric. The fabric sample was hung for 15–60 minutes, and then washed and dried. Samples were evaluated against a rating board, and assigned a number from 1 to 8. An 8 represented total removal of the stain, wherein a 1 represented a very dark stain. A more detailed description of the test is written in the 3M Protective Material Division's "Stain-release Test I" method (Document #98-0212-0725-7).

Test Method XII—Performance Test—Stain-release—Durability

This test was run on treated fabric (treated as per Test Method IV or V) that had subsequently been washed for, e.g., 5, 10, or 20, consecutive launderings, followed by tumble drying, as described in the 3M Protective Material Division's "Laboratory Laundering Procedures" for home laundering simulation (Document #98-0212-0703-4).

Test Method XIII—Performance Test—Fabric Absorbency

This test provided a rough index of fabric absorbency. A drop of water was placed on the treated fabric (treated as per Test Method IV or V) surface, and the amount of time it took for that drop to absorb into the fabric, leaving a matte, wet surface, was recorded. A more detailed description of the test is written in the 3M Protective Material Division's "Fabric Absorbency Test" method (Document #98-0212-0710-9). Absorbency time was also referred to as the wicking time. Wetting time was the time from application of the water drop until the first evidence of darkening or wetting appeared under the water drop, and was also recorded.

EXAMPLES RELATING TO HARD SUBSTRATES

Water—Soluble Fluorocarbon—Containing Chemical Compositions With N-Methylpyrrolidone:

Example 1

N3300/HMP/MeFBSE/GA/APTES (2/1/4/0.5/0.33)

To a 250 ml flask equipped with a heating mantel, magnetic stirring bar, nitrogen inlet, and temperature controller was added with stirring 1 3.5 grams (0.0204 mole, 0.0692 equivalent) of DESMODUR™ N-3300 (N3300), 1.35 grams (0.010 mole, 0.020 equivalent) 2,2-bis (hydroxymethyl)propionic acid (HMP), and 30.5 grams of N-methyl pyrrolidone. While still at room temperature the mixture became a homogeneous solution. Dibutyltin dilaurate (4 drops) was then added, and the mixture was heated to 70° C. and allowed to react for 1 hour. MeFBSE (14.5 grams, 0.0406 mole, 0.0406 equivalent) and 0.41 grams (0.00539 mole, 0.00539 equivalent) of glycolic acid (GA) were added to the reaction mixture, and reaction was continued for another hour. 3-Aminopropyltriethoxysilane (APTES) (0.74 grams, 0.00334 mole, 0.00334 equivalent) was then added to the reaction mixture and allowed to react for an additional 3 hours. A solution of 1.85 grams (0.0155 equivalent) methyldiethanolamine in 98.5 grams deionized water was then added to the reaction mixture still at 70° C., and the mixture was stirred at 60–70° C. until it became a clear solution (~20% by weight chemical composition solids). The hot, clear solution was poured into 161 grams deionized water to make a 10% by weight chemical composition solution. This solution was further diluted with deionized water to a 3% by weight chemical composition solution which was tested according to Test Method I. Results are shown in Table 1.

Example 2

N3300/FBSEE/MeFBSE/GA/APTES (2/1/2.8/1.6/0.33)

To a 250 ml flask equipped with a heating mantel, magnetic stirring bar, nitrogen inlet, and temperature controller was added with stirring 13.5 grams (0.0204 mole, 0.0692 equivalent) of DESMODUR™ N-3300 (N3300), 3.77 grams (0.010 mole, 0.020 equivalent) FBSEE and 29.5 grams of N-methyl pyrrolidone. While still at room temperature the mixture became a homogeneous solution. Dibutyltin dilaurate (4 drops) was then added, and the mixture was heated to 70° C. and allowed to react for 1 hour. MeFBSE (10.0 grams, 0.028 mole, 0.028 equivalent) and 1.21 grams (0.0159 mole, 0.0159 equivalent) of glycolic acid (GA) were added to the reaction mixture, and reaction was continued for another hour. 3-Aminopropyltriethoxysilane (APTES) (0.74 grams, 0.00334 mole, 0.00334 equivalent) was then added to the reaction mixture and allowed to react for an additional 3 hours. A solution of 1.91 grams (0.016 equivalent) methyldiethanolamine in 60.0 grams deionized water was then added to the reaction mixture still at 70° C., and the mixture was stirred at 60–70° C. until it became a clear solution (26.3% by weight chemical composition solids). The hot, clear solution was then diluted with deionized water to a 3% by weight chemical composition solution, which was tested according to Test Method 1. Results are shown in Table 1.

Example 3

N3300/DEG/MeFBSE/GA/APTES (2/0.85/2.8/1.6/0.33)

To a 250 ml flask equipped with a heating mantel, magnetic stirring bar, nitrogen inlet, and temperature controller was added with stirring 13.5 grams (0.0204 mole, 0.0692 equivalent) of DESMODUR™ N-3300 (N3300), 0.90 grams (0.00848 mole, 0.0167 equivalent) diethylene glycol (DEG), and 28.0 grams of N-methyl pyrrolidone. While still at room temperature the mixture became a homogeneous solution. Dibutyltin dilaurate (4 drops) was then added, and the mixture was heated to 70° C. and allowed to react for 1 hour. MeFBSE (10.0 grams, 0.028 mole, 0.028 equivalent) and 1.21 grams (0.0159 mole, 0.0159 equivalent) of glycolic acid (GA) were added to the reaction mixture, and reaction was continued for another hour. 3-Aminopropyltriethoxysilane (APTES) (0.74 grams, 0.00334 mole, 0.00334 equivalent) was then added to the reaction mixture and allowed to react for an additional 3 hours. A solution of 1.91 grams (0.016 equivalent) methyldiethanolamine in 60.0 grams deionized water was then added to the reaction mixture still at 70° C., and the mixture was stirred at 60–70° C. until it became a clear solution (23.0% by weight chemical composition solids). The hot, clear solution was then diluted with deionized water to a 3% by weight chemical composition solution, which was tested according to Test Method I. Results are shown in Table 1.

Example 4

N3300/BDO/MeFBSE/GA/APTES (2/0.89/2.8/1.6/0.33)

To a 250 ml flask equipped with a heating mantel, magnetic stirring bar, nitrogen inlet, and temperature controller was added with stirring 13.5 grams (0.0204 mole, 0.0692 equivalent) of DESMODUR™ N-3300 (N3300), 0.80 grams (0.00888 mole, 0.0177 equivalent) 1,4-butanediol (BDO), and 28.0 grams of N-methyl pyrrolidone. While still at room temperature the mixture became a homogeneous solution. Dibutyltin dilaurate (4 drops) was then added, and the mixture was heated to 70° C. and allowed to react for 1 hour. MeFBSE (10.0 grams, 0.028 mole, 0.028 equivalent) and 1.21 grams (0.0159 mole, 0.0159 equivalent) of glycolic acid (GA) were added to the reaction mixture, and reaction was continued for another hour. 3-Aminopropyltriethixysilane (APTES) (0.74 grams, 0.00334 mole, 0.00334 equivalent) was then added to the reaction mixture and allowed to react for an additional 3 hours. A solution of 1.91 grams (0.016 equivalent) methyldiethanolamine in 60.0 grams deionized water was then added to the reaction mixture still at 70° C., and the mixture was stirred at 60–70° C. until it became a clear solution (22.9% by weight chemical composition solids). The hot, clear solution was then diluted with deionized water to a 3% by weight chemical composition solution, which was tested according to Test Method 1. Results are shown in Table 1.

Example 5

N3300/TEG/MeFBSE/GA/APTES (2/1/3.1/1.6/0.33)

To a 250 ml flask equipped with a heating mantel, magnetic stirring bar, nitrogen inlet, and temperature controller was added with stirring 13.5 grams (0.0204 mole, 0.0692 equivalent) of DESMODUR™ N-3300 (N3300), 1.50 grams (0.01 mole, 0.02 equivalent) triethylene glycol (TEG), and 28.0 grams of N-methyl pyrrolidone. While still at room temperature the mixture became a homogeneous solution. Dibutyltin dilaurate (4 drops) was then added, and the mixture was heated to 70° C. and allowed to react for 1 hour. MeFBSE (14.5 grams, 0.0406 mole, 0.0406 equivalent) and 1.21 grams (0.0159 mole, 0.0159 equivalent) of glycolic acid (GA) were added to the reaction mixture, and reaction was continued for another hour. 3-Aminopropyltriethoxysilane (APTES) (0.74 grams, 0.00334 mole, 0.00334 equivalent) was then added to the reaction mixture and allowed to react for an additional 3 hours. A solution of 1.91 grams (0.016 equivalent) methyldiethanolamine in 60 grams deionized water was then added to the reaction mixture still at 70° C., and the mixture was stirred at 60–70° C. until it became a clear solution (~25% by weight chemical composition solids). This solution was then diluted with deionized water to a 3% by weight chemical composition solution, which was tested according to Test Methods I. Results are shown in Table 1.

Example 6

N3300/HMP/MeFBSE/GA/APTES (2/1/3.1/1.4/0.33)

To a 250 ml flask equipped with a heating mantel, magnetic stirring bar, nitrogen inlet, and temperature controller was added with stirring 13.5 grams (0.0204 mole, 0.0692 equivalent) of DESMODUR™ N-3300 (N3300), 1.35 grams (0.010 mole, 0.020 equivalent) 2,2-bis(hydroxymethyl)propionic acid (HMP), and 28.0 grams of N-methyl pyrrolidone. While still at room temperature the mixture became a homogeneous solution. Dibutyltin dilaurate (4 drops) was then added, and the mixture was heated to 70° C. and allowed to react for 1 hour. MeFBSE (11.0 grams, 0.0308 mole, 0.0308 equivalent) and 1.10 grams (0.01446 mole, 0.01446 equivalent) of glycolic acid (GA) were added to the reaction mixture, and reaction was continued for another hour. 3-Aminopropyltriethoxysilane (APTES) (0.74 grams, 0.00334 mole, 0.00334 equivalent) was then added to the reaction mixture and allowed to react for an additional 3 hours. A solution of 3.09 grams (0.0259 equivalent) methyidiethanolamine in 56 grams deionized water was then added to the reaction mixture still at 70° C., and the mixture was stirred at 60–70° C. until it became a clear solution (25.3% by weight chemical composition solids). This solution was then diluted with deionized water to a 3% by weight chemical composition solution, which was tested according to Test Method I. Results are shown in Table 1.

Comparative Examples C1–C3

Untreated limestone tile and limestone tile treated with FC-759 (available from 3M™ Performance Materials, St. Paul, Minn.) and Tile Lab Grout and Tile Sealer (available from Custom Building Products, Seal Beach, Calif.) were evaluated using Test Method I. The results are shown Table 1.

The results in Table 1 show that very good stain-release was provided by chemical compositions with a) a wide range of diols, b) pendant $R_f$ groups replacing some terminal $R_f$ groups (Example 1 compared with Example 2), and c) an increased ratio of water-solubilizing groups to $R_f$ groups (Example 1 compared with Example 6). Coatings made with commercial sealers (Comparative Examples C1—C3) did not perform as well as the chemical compositions.

Limestone Tile Weathering Testing

Two limestone tiles (30.5 cm×30.5 cm) were each divided into 3 equal sections (10.2 cm×30.5 cm). One section was untreated (Comparative Example C1), the second section was treated with the composition prepared in Example 2 and the third section was treated with the composition prepared in Example 6. The two compositions were applied as described in Test Method I. The two tiles were subjected to weathering according to Test Method ASTM G7. One tile was subjected to such weathering at 5 degrees south and the other tile was subjected to weathering for 18 months at 90 degrees south in Miami, Fla. Visual results of the tests are listed in Table 1A. In the table, "no" indicates no visible stain was present and "yes" indicates a visible stain was present at the termination of the test.

TABLE 1A

Visual Results of Weathering Tests of Limestone Tile for Mildew and Algae Staining.

|  | 5 degrees south | 90 degrees south |
| --- | --- | --- |
| Comparative Example C1 | Yes | No |
| Example 2 | No | No |
| Example 6 | No | No |

The results in Table 1A show that the sections of the tile treated with compositions from Examples 2 and 6, and subjected to 5 degrees south weathering, showed no visible mildew and algae staining, whereas the untreated section (Comparative Example C1) showed visible mildew and algae staining.

Example 7

N3300/HMP/CF$_3$C$_2$F$_4$CH$_2$OH/GA/APTES (2/1/4/0.54/0.33)

To a 250 ml flask equipped with a heating mantel, magnetic stirring bar, nitrogen inlet, and temperature con-

TABLE 1

Stain-Release Ratings of Chemical Compositions, Comprising Reaction Products from Various Diols, on Limestone Tile.

| | | Stain Ratings with Test Fluids | | | | | | |
| --- | --- | --- | --- | --- | --- | --- | --- | --- |
| Example | Chemical Composition Components | GF | TF | MO | WIN | COF | BF | CO | Total |
| 1 | N3300/HMP/MeFBSE/GA/APTES (2/1/4/0.5/0.33) | 1 | 0 | 0 | 1 | 0 | 1 | 0 | 3 |
| 2 | N3300/FBSEE/MeFBSE/GA/APTES (2/1/2.8/1.6/0.33) | 0 | 0 | 0 | 1 | 0 | 0 | 0 | 1 |
| 3 | N3300/DEG/MeFBSE/GA/APTES (2/0.85/2.8/1.6/0.33) | 2 | 0 | 0 | 2 | 0 | 3 | 0 | 7 |
| 4 | N3300/BDO/MeFBSE/GA/APTES (2/0.89/2.8/1.6/0.33) | 1 | 0 | 0 | 1 | 0 | 5 | 0 | 7 |
| 5 | N3300/TEG/MeFBSE/GA/APTES (2/1/3.1/1.6/0.33) | 1 | 0 | 0 | 0 | 0 | 5 | 0 | 6 |
| 6 | N3300/HMP/MeFBSE/GA/APTES (2/1/3.1/1.4/0.33) | 1 | 0 | 0 | 0 | 0 | 4 | 0 | 5 |
| C1 | None | 5 | 5 | 5 | 5 | 5 | 5 | 5 | 35 |
| C2 | FC-759 | 4 | 0 | 0 | 4 | 2 | 0 | 0 | 10 |
| C3 | Tile Lab Grout & Tile Sealer | 4 | 4 | 2 | 3 | 3 | 0 | 0 | 16 | troller was added with stirring 13.5 grams (0.0204 mole, 0.0692 equivalent) of DESMODUR™ N-3300 (N3300), 1.35 grams (0.010 mole, 0.020 equivalent) 2,2-bis (hydroxymethyl)propionic acid (HMP), and 24.0 grams of N-methyl pyrrolidone. While still at room temperature the mixture became a homogeneous solution. Dibutyltin dilaurate (4 drops) was then added, and the mixture was heated to 70° C. and allowed to react for 1 hour. 2,2,3,3,4,4,4-Heptafluorobutanol $(CF_3C_2F_4CH_2OH)$(8.0 grams, 0.040 mole, 0.040 equivalent) and 0.41 grams (0.00539 mole, 0.00539 equivalent) of glycolic acid (GA) were added to the reaction mixture, and reaction was continued for another hour. 3-Aminopropyltriethoxysilane (APTES) (0.74 grams, 0.00334 mole, 0.00334 equivalent) was then added to the reaction mixture and allowed to react for an additional 3 hours. A solution of 1.85 grams (0.0155 equivalent) methyidiethanolamine in 70 grams deionized water was then added to the reaction mixture still at 70° C., and the mixture was stirred at 60–70° C. until it became a clear solution (~20% by weight chemical composition solids). This solution was then diluted with deionized water to a 3% by weight chemical composition solution, which was tested according to Test Method I. Results are shown in Table 2.

Example 8

N3300/HMP/n-$C_6F_{13}CH_2CH_2OH$/GA/APTES (2/1/4.310.54/0.33)

To a 250 ml flask equipped with a heating mantel, magnetic stirring bar, nitrogen inlet, and temperature controller was added with stirring 13.5 grams (0.0204 mole, 0.0692 equivalent) of DESMODUR™ N-3300 (N3300), 1.35 grams (0.010 mole, 0.020 equivalent) 2,2-bis (hydroxymethyl)propionic acid (HMP), and 31.5 grams of N-methyl pyrrolidone. While still at room temperature the mixture became a homogeneous solution. Dibutyltin dilaurate (4 drops) was then added, and the mixture was heated to 70° C. and allowed to react for 1 hour. Fluorochemical alcohol, n-$C_6F_{13}CH_2CH_2OH$, (15.6 grams, 0.0429 mole, 0.0429 equivalent) and 0.41 grams (0.00539 mole, 0.00539 equivalent) of glycolic acid (GA) were added to the reaction mixture, and reaction was continued for another hour. 3-Aminopropyltriethoxysilane (APTES) (0.74 grams, 0.00334 mole, 0.00334 equivalent) was then added to the reaction mixture and allowed to react for an additional 3 hours. A solution of 1.85 grams (0.0155 equivalent) methyidiethanolamine in 99 grams deionized water was then added to the reaction mixture still at 70° C., and the mixture was stirred at 60–70° C. until it became a clear solution (~20% by weight chemical composition solids). This solution was then diluted with deionized water to a 3% by weight chemical composition solution, which was tested according to Test Method I. Results are shown in Table 2.

Example 9

N3300/HMP/$C_7F_{15}CH_2OH$/GA/APTES (2/1/4/0.54/0.33)

To a 250 ml flask equipped with a heating mantel, magnetic stirring bar, nitrogen inlet, and temperature controller was added with stirring 13.5 grams (0.0204 mole, 0.0692 equivalent) of DESMODUR™ N-3300 (N3300), 1.35 grams (0.010 mole, 0.020 equivalent) 2,2-bis (hydroxymethyl)propionic acid (HMP), and 32.0 grams of N-methyl pyrrolidone. While still at room temperature the mixture became a homogeneous solution. Dibutyltin dilaurate (4 drops) was then added, and the mixture was heated to 70° C. and allowed to react for 1 hour. Fluorochemical alcohol, $C_7F_{15}CH_2OH$, (16.0 grams, 0.040 mole, 0.040 equivalent) and 0.41 grams (0.00539 mole, 0.00539 equivalent) of glycolic acid (GA) were added to the reaction mixture, and reaction was continued for another hour. 3-Aminopropyltriethoxysilane (APTES) (0.74 grams, 0.00334 mole, 0.00334 equivalent) was then added to the reaction mixture and allowed to react for an additional 3 hours. A solution of 1.85 grams (0.01 55 equivalent) methyldiethanolamine in 103 grams deionized water was then added to the reaction mixture still at 70° C., and the mixture was stirred at 60–70° C. until it became a clear solution (~20% by weight chemical composition solids). This solution was then diluted with deionized water to a 3% by weight chemical composition solution, which was tested according to Test Method I. Results are shown in Table 2.

Example 10

N3300/HMP/n-$C_6F_{13}CF(CF_3)CONHCH_2CH_2OH$/GA/APTES (2/1/4/0.54/0.33)

To a 250 ml flask equipped with a heating mantel, magnetic stirring bar, nitrogen inlet, and temperature controller was added with stirring 13.5 grams (0.0204 mole, 0.0692 equivalent) of DESMODUR™ N-3300 (N3300), 1.35-grams (0.010 mole, 0.020 equivalent) 2,2-bis (hydroxymethyl)propionic acid (HMP), and 31.5 grams of N-methyl pyrrolidone. While still at room temperature the mixture became a homogeneous solution. Dibutyltin dilaurate (4 drops) was then added, and the mixture was heated to 70° C. and allowed to react for 1 hour. Fluorochemical alcohol, n-$C_6F_{13}CF(CF_3)CONHCH_2CH_2OH$, (20.3 grams, 0.040 mole, 0.40 equivalent) and 0.41 grams (0.00539 mole, 0.00539 equivalent) of glycolic acid (GA) were added to the reaction mixture, and reaction was continued for another hour. 3-Aminopropyltriethoxysilane (APTES) (0.74 grams, 0.00334 mole, 0.00334 equivalent) was then added to the reaction mixture and allowed to react for an additional 3 hours. A solution of 1.85 grams (0.0155 equivalent) methyldiethanolamine in 117 grams deionized water was then added to the reaction mixture still at 70° C., and the mixture was stirred at 60–70° C. until it became a clear solution (~20% by weight chemical composition solids). This solution was then diluted with deionized water to a 3% by weight chemical composition solution, which was tested according to Test Method I. Results are shown in Table 2.

Example 11

N3300/HMP/n-$C_4F_9OC_2F_4OCF_2CH_2OCH_2CH_2OH$/GA/APTES (2/114/0.54/0/33)

To a 250 ml flask equipped with a heating mantel, magnetic stirring bar, nitrogen inlet, and temperature controller was added with stirring 13.5 grams (0.0204 mole, 0.0692 equivalent) of DESMODUR™ N-3300 (N3300), 1.35 grams (0.010 mole, 0.020 equivalent) 2,2-bis (hydroxymethyl)propionic acid (HMP), and 31.5 grams of N-methyl pyrrolidone. While still at room temperature the mixture became a homogeneous solution. Dibutyltin dilaurate (4 drops) was then added, and the mixture was heated to 70° C. and allowed to react for 1 hour. Fluorochemical alcohol, n-$C_4F_9OC_2F_4OCF_2CH_2OCH_2CH_2OH$, (19.0 grams, 0.040 mole, 0.040 equivalent) and 0.41 grams (0.00539 mole, 0.00539 equivalent) of glycolic acid (GA) were added to the reaction mixture, and reaction was continued for another hour. 3-Aminopropyltriethoxysilane (APTES) (0.74 grams, 0.00334 mole, 0.00334 equivalent)

was then added to the reaction mixture and allowed to react for an additional 3 hours. A solution of 1.85 grams (0.0155 equivalent) methyldiethanolamine in 118 grams deionized water was then added to the reaction mixture still at 70° C., and the mixture was stirred at 60–70° C. until it became a clear solution (~20% by weight chemical composition solids). This solution was then diluted with deionized water to a 3% by weight chemical composition solution, which was tested according to Test Method I. Results are shown in Table 2.

Example 12

N3300/HMP/MeFOSE/GA/APTES (2/1/3.5/0.54/ 0.33)

To a 250 ml flask equipped with a heating mantel, magnetic stirring bar, nitrogen inlet, and temperature controller was added with stirring 13.5 grams (0.0204 mole, 0.0692 equivalent) of DESMODUR™ N-3300 (N3300), 1.35 grams (0.010 mole, 0.020 equivalent) 2,2-bis (hydroxymethyl)propionic acid (HMP), and 31.5 grams of N-methyl pyrrolidone. While still at room temperature the mixture became a homogeneous solution. Dibutyltin dilaurate (4 drops) was then added, and the mixture was heated to 70° C. and allowed to react for 1 hour. Fluorochemical alcohol, MeFOSE, ($C_8F_{17}SO_2N(Me)CH_2CH_2OH$), (19.5 grams, 0.035 mole, 0.035 equivalent) and 0.41 grams (0.00539 mole, 0.00539 equivalent) of glycolic acid (GA) were added to the reaction mixture, and reaction was continued for another hour. 3-Aminopropyltriethoxysilane (APTES) (0.74 grams, 0.00334 mole, 0.00334 equivalent) was then added to the reaction mixture and allowed to react for an additional 3 hours. A solution of 1.85 grams (0.0155 equivalent) methyldiethanolamine in 118 grams deionized water was then added to the reaction mixture still at 70° C., and the mixture was stirred at 60–70° C. until it became a clear solution (~20% by weight chemical composition solids). This solution was then diluted with deionized water to a 3% by weight chemical composition solution, which was tested according to Test Method 1. Results are shown in Table 2.

Example 13

N3300/HMP/ cyc—$C_6F$, $CH_2OH$/GA/APTES (2/1/ 6.2/0.54/0.33)

To a 250 ml flask equipped with a heating mantel, magnetic stirring bar, nitrogen inlet, and temperature controller was added with stirring 13.5 grams (0.0204 mole, 0.0692 equivalent) of DESMODUR™ N-3300 (N3300), 1.35 grams (0.010 mole, 0.020 equivalent) 2,2-bis (hydroxymethyl)propionic acid (HMP), and 31.5 grams of N-methyl pyrrolidone. While still at room temperature the mixture became a homogeneous solution. Dibutyltin dilaurate (4 drops) was then added, and the mixture was heated to 70° C. and allowed to react for 1 hour. Perfluorocyclohexylmethanol (cyc-$C_6F_{11}CH_2OH$) (19.5 grams, 0.0589 mole, 0.0598 equivalent) and 0.41 grams (0.00539 mole, 0.00539 equivalent) of glycolic acid (GA) were added to the reaction mixture, and reaction was continued for another hour. 3-Aminopropyltriethoxysilane (0.74 grams, 0.00334 mole, 0.00334 equivalent) was then added to the reaction mixture and allowed to react for an additional 3 hours. A solution of 1.85 grams (0.0155 equivalent) methyidiethanolamine in 90 grams deionized water was then added to the reaction mixture still at 70° C., and the mixture was stirred at 60–70° C. until it became a clear solution (~20% by weight chemical composition solids). This solution was then diluted with deionized water to a 3% by weight chemical composition solution, which was tested according to Test Method I. Results are shown in Table 2.

Example 14

N3300/HMP/n-$C_3F_7CONHCH_2CH_2OH$/GA/APTES (2/1/3.1/1.6/0.33)

To a 250 ml flask equipped with a heating mantel, magnetic stirring bar, nitrogen inlet, and temperature controller was added with stirring 13.5 grams (0.0204 mole, 0.0692 equivalent) of DESMODUR™ N-3300 (N3300), 1.35 grams (0.010 mole, 0.020 equivalent) 2,2-bis (hydroxymethyl)propionic acid (HMP), and 31.5 grams of N-methyl pyrrolidone. While still at room temperature the mixture became a homogeneous solution. Dibutyltin dilaurate (4 drops) was then added, and the mixture was heated to 70° C. and allowed to react for 1 hour. Fluorochemical alcohol, n-$C_3F_7CONHCH_2CH_2OH$, (10.3 grams, 0.040 mole, 0.040 equivalent) and 0.41 grams (0.00539 mole, 0.00539 equivalent) of glycolic acid (GA) were added to the reaction mixture, and reaction was continued for another hour. 3-Aminopropyltriethoxysilane (APTES) (0.74 grams, 0.00334 mole, 0.00334 equivalent) was then added to the reaction mixture and allowed to react for an additional 3 hours. A solution of 1.85 grams (0.0155 equivalent) methyldiethanolamine in 80 grams deionized water was then added to the reaction mixture still at 70° C., and the mixture was stirred at 60–70° C. until it became a clear solution (~20% by weight chemical composition solids). This solution was then diluted with deionized water to a 3% by weight chemical composition solution, which was tested according to Test Method I. Results are shown in Table 2.

Example 15

N3300/HMP/n-$C_6F_{13}CF(CF_3)CO_2C_2H_4CH(CH_3)$ OH/GA/APTES (2/1/3.1/1.4/0.33)

To a 250 ml flask equipped with a heating mantel, magnetic stirring bar, nitrogen inlet, and temperature controller was added with stirring 13.5 grams (0.0204 mole, 0.0692 equivalent) of DESMODUR™ N-3300 (N3300), 1.35 grams (0.010 mole, 0.020 equivalent) 2,2-bis (hydroxymethyl)propionic acid (HMP), and 31.5 grams of N-methyl pyrrolidone. While still at room temperature the mixture became a homogeneous solution. Dibutyltin dilaurate (4 drops) was then added, and the mixture was heated to 70° C. and allowed to react for 1 hour. Fluorochemical alcohol, n-$C_6F_{13}CF(CF_3)CO_2CH_2CH_2CH(CH_3)OH$, (21.5 grams, 0.040 mole, 0.040 equivalent) and 0.41 grams (0.00539 mole, 0.00539 equivalent) of glycolic acid (GA) were added to the reaction mixture, and reaction was continued for another hour. 3-Aminopropyltriethoxysilane (APTES) (0.74 grams, 0.00334 mole, 0.00334 equivalent) was then added to the reaction mixture and allowed to react for an additional 3 hours. A solution of 1.85 grams (0.01 55 equivalent) methyldiethanolamine in 120 grams deionized water was then added to the reaction mixture still at 70° C., and the mixture was stirred at 60–70° C. until it became a clear solution (~20% by weight chemical composition solids). This solution was then diluted with deionized water to a 3% by weight chemical composition solution, which was tested according to Test Method I. Results are shown in Table 2.

TABLE 2

Stain-Release Ratings of Chemical Compositions, Comprising Reaction Products from Various Fluorine-Containing Monoalcohols, on Limestone Tile.

| Example | Chemical Composition Components | GF | TF | MO | WIN | COF | BF | CO | Total |
|---|---|---|---|---|---|---|---|---|---|
| 1 | N3300/HMP/MeFBSE/GA/APTES (2/1/4/0.54/0.33) | 1 | 0 | 0 | 1 | 0 | 1 | 0 | 3 |
| 7 | N3300/HMP/$CF_3C_2F_4CH_2OH$/GA/APTES (2/1/4/0.54/0.33) | 4 | 5 | 5 | 4 | 2 | 4 | 4 | 28 |
| 8 | N3300/HMP/n-$C_6F_{13}CH_2CH_2OH$/GA/APTES (2/1/4.3/0.54/0.33) | 3 | 0 | 0 | 3 | 4 | 0 | 0 | 10 |
| 9 | N3300/HMP/$C_7F_{15}CH_2OH$/GA/APTES (2/1/4/0.54/0.33) | 2 | 1 | 0 | 4 | 3 | 3 | 0 | 13 |
| 10 | N3300/HMP/n-$C_6F_{13}CF(CF_3)CONHCH_2CH_2OH$/GA/APTES (2/1/4/0.54/0.33) | 3 | 3 | 1 | 4 | 3 | 5 | 0 | 19 |
| 11 | N3300/HMP/n-$C_4F_9OC_2F_4OCF_2CH_2OCH_2CH_2OH$/GA/APTES (2/1/4/0.54/0/33) | 2 | 0 | 0 | 2 | 1 | 4 | 0 | 9 |
| 12 | N3300/HMP/MeFOSE/GA/APTES (2/1/3.5/0.54/0.33) | 2 | 0 | 0 | 3 | 0 | 0 | 0 | 5 |
| 13 | N3300/HMP/cyc-$C_6F_{11}CH_2OH$/GA/APTES (2/1/6.2/0.54/0.33) | 4 | 5 | 5 | 4 | 3 | 4 | 3 | 28 |
| 14 | N3300/HMP/n-$C_3F_7CONHCH_2CH_2OH$/GA/APTES (2/1/3.1/1.6/0.33) | 3 | 2 | 1 | 4 | 4 | 3 | 1 | 18 |
| 15 | N3300/HMP/n-$C_6F_{13}CF(CF_3)CO_2C_2H_4CH(CH_3)OH$/GA/APTES (2/1/3.1/1.4/0.33) | 2 | 0 | 0 | 3 | 1 | 4 | 0 | 10 |

The results in Table 2 show that stain-release was imparted by chemical compositions made from a variety of fluorine-containing monoalcohols comprised of various $R_f$ groups, with excellent stain-release surprisingly imparted even with the short perfluorocarbon $C_4F_9$-containing $R_f$ groups.

Example 16

N3300/Bicine/FBSEE/MeFBSE/GA/APTMS (2/0.5/0.5/2.8/1.8/0.25)

In a 250 ml bottle equipped with a magnetic stirrer, heating mantel, temperature controller, and dry nitrogen purge, was added DESMODUR™ N-3300 (N3300) (13.19 g, 0.020 mole, 0.068 equivalent), FBSEE (1.885 g, 0.00487 mole, 0.00974 equivalent), bicine $(HOCH_2CH_2)_2NCH_2COOH$ (0.815 g, 0.0050 mole, 0.010 equivalent —OH, 0.0050 equivalent —COOH), 4 drops of dibutyltin dilaurate, and 30 g N-methylpyrrolidone. The resulting mixture was stirred and heated at 70° C. for one hour, followed by addition of MeFBSE (9.996 g, 0.028 mole, 0.028 equivalent), and glycolic acid (1.368 g, 0.018 mole, 0.018 equivalent). The resulting reaction mixture was heated for another hour at 70° C., followed by addition of APTMS (0.442 g, 0.0025 mole, 0.0025 equivalent) and heated with stirring at 70° C. for an additional two hours. A 5 g portion of the resulting unneutralized chemical composition was taken for GPC analysis, and the remaining composition was cooled to 60° C. and then neutralized by adding to the composition an amount of methyldiethanolamine equivalent to the number of equivalents of carboxylic acid groups present. After 10 minutes at 60° C. the mixture was cooled and a portion of the resulting neutralized chemical composition was diluted with water to form an aqueous solution containing 3% by weight of the chemical composition. The 3% aqueous solution was evaluated for performance using Test Method I, and the results are shown in Table 3. The GPC analysis, conducted according to Test Method III, showed that the unneutralized chemical composition was comprised of components having a weight average molecular weight (Mw) of 22,183, a number average molecular weight (Mn) of 4,553, and a polydispersity (Mw/Mn) of 4.872. thus indicating the presence of both high and low molecular weight components.

Example 17

N3300/Bicine/MeFBSE/GA/APTES (2/1/3.2/1.4/0.2)

An unneutralized chemical composition was prepared essentially as in Example 16 except that 13.54 g (0.0204 mole, 0.0694 equivalent) N3300, 1.63 g (0.010 mole, 0.020 equivalent —OH, 0.020 equivalent —COOH ) bicine, 1.06 g (0.0139 mole, 0.0139 equivalent) glycolic acid (GA), 11.42 g (0.032 mole, 0.032 equivalent) MeFBSE, and 0.44 g (0.0020 mole, 0.0020 equivalent) APTES were used instead of the corresponding reactants and amounts in Example 16. A small portion of the resulting unneutralized chemical composition was taken for GPC analysis, and the remaining composition was neutralized, made into a 3 weight % aqueous solution for evaluation and tested essentially as in Example 16. Stain-release test results are shown in Table 3. The GPC analysis, conducted according to Test Method III, showed that the unneutralized chemical composition was comprised of components having a Mw of 3,739, a Mn of 14,928, and a Mw/Mn of 3.992, thus indicating the presence of both high and low molecular weight components.

Example 18

N3300/FBSEE/MeFBSE/CA/APTES (2/1/3.1/1.5/0.2)

An unneutralized chemical composition was prepared essentially as in Example 16 except that 6.63 g (0.010 mole, 0.034 equivalent) N3300, 1.885 g (0.00487 mole, 0.00974 equivalent) FBSEE, 15 g N-methylpyrrolidone, 0.684 g (0.00356 mole, 0.00356 equivalent —OH, 0.0107 equivalent —COOH) citric acid (CA), 4.998 g (0.014 mole, 0.014 equivalent) MeFBSE, and 0.221 g (0.0010 mole, 0.0010 equivalent) APTES were used instead of the corresponding reactants and amounts in Example 16. A small portion of the resulting unneutralized chemical composition was taken for GPC analysis, and the remaining composition was neutralized, made into a 3 weight % aqueous solution for evaluation and tested essentially as in Example 16. Stain-release test results are shown in Table 3. The GPC analysis, conducted according to Test Method III, showed that the unneutralized chemical composition was comprised of components having a Mw of 4,043, a Mn of 12,385, and a Mw/Mn of 3.063, thus indicating the presence of both high and low molecular weight components.

Example 19

N3300/Bicine/MeFBSE/CA/APTES (2/1/3.1/1.5/0.2)

An unneutralized chemical composition was prepared essentially as in Example 16 except that 6.63 g (0.010 mole, 0.034 equivalent) N3300, 0.815 g (0.0050 mole, 0.010 equivalent —OH, 0.0050 equivalent —COOH) bicine, 15 g N-methylpyrrolidone, 1.44 g (0.0075 mole, 0.0075 equivalent —OH, 0.0225 equivalent —COOH) citric acid (CA), 5.53 g (0.0155 mole, 0.0155 equivalent) MeFBSE, and 0.221 g (0.0010 mole, 0.0010 equivalent) APTES were used instead of the corresponding reactants and amounts in Example 16. A small portion of the resulting unneutralized chemical composition was taken for GPC analysis, and the remaining composition was neutralized, made into a 3 weight % aqueous solution for evaluation and tested essentially as in Example 16. Stain-release test results are shown in Table 3. The GPC analysis, conducted according to Test Method III, showed that the unneutralized chemical composition was comprised of components having a Mw of 4,325, a Mn of 15,016, and a Mw/Mn of 3.472, thus indicating the presence of both high and low molecular weight components.

Example 20

N3300Bicine/MeFBSE/MSA/APTES (2/1/3.1/1.5/0.2)

An unneutralized chemical composition was prepared essentially as in Example 16 except that 6.63 g (0.010 mole, 0.034 equivalent) N3300, 0.815 g (0.0050 mole, 0.010 equivalent —OH, 0.0050 equivalent —COOH) bicine, 15 g N-methylpyrrolidone, 1.2 g (0.0080 mole, 0.0080 equivalent —SH, 0.016 equivalent —COOH) mercaptosuccinic acid (MSA), 5.355 g (0.015 mole, 0.015 equivalent) MeFBSE, and 0.221 g (0.0010 mole, 0.0010 equivalent) APTES were used instead of the corresponding reactants and amounts in Example 16. A small portion of the resulting unneutralized chemical composition was taken for GPC analysis, and the remaining composition was neutralized, made into a 3 weight % aqueous solution for evaluation and tested essentially as in Example 16. Stain-release test results are shown in Table 3. The GPC analysis, conducted according to Test Method III, showed that the unneutralized chemical composition was comprised of components having a Mw of 4,553, a Mn of 22,183, and a Mw/Mn of 4.872, thus indicating the presence of both high and low molecular weight components.

Example 21

N3300/Bicine/MeFBSE/MA/APTES (2/1/3.6/1/0.2)

A chemical composition was prepared essentially as in Example 16 except that 6.63 g (0.010 mole, 0.034 equivalent) N3300, 0.815 g (0.0050 mole, 0.010 equivalent —OH, 0.0050 equivalent —COOH) bicine, 15 g N-methylpyrrolidone, 0.67 g (0.0050 mole, 0.0050 equivalent —OH, 0.010 equivalent —COOH) malic acid (MA), 6.426 g (0.018 mole, 0.018 equivalent) MeFBSE, and 0.221 g (0.0010 mole, 0.0010 equivalent) APTES were used instead of the corresponding reactants and amounts in Example 16. The resulting chemical composition was neutralized, and made into a 3 weight % aqueous solution for evaluation and tested essentially as in Example 16. Stain-release test results are shown in Table 3.

Example 22

N3300/HMP/MeFBSE/MA/APTES (2/1/3.6/1/0.2)

A chemical composition was prepared essentially as in Example 16 except that 6.63 g (0.010 mole, 0.034 equivalent) N3300, 0.67 g (0.0050 mole, 0.010 equivalent —OH, 0.0050 equivalent —COOH) HMP, 15 g N-methylpyrrolidone, 0.67 g (0.0050 mole, 0.0050 equivalent —OH, 0.010 equivalent —COOH) malic acid (MA), 6.426 g (0.018 mole, 0.018 equivalent) MeFBSE, and 0.221 g (0.0010 mole, 0.0010 equivalent) APTES were used instead of the corresponding reactants and amounts in Example 16. The resulting chemical composition was neutralized, and made into a 3 weight % aqueous solution for evaluation and tested essentially as in Example 16. Stain-release test results are shown in Table 3.

TABLE 3

Stain-Release Ratings of Chemical Compositions, Comprising Reaction Products from Various Water-Solubilizing Compounds, on Limestone Tile.

| Example | Chemical Composition Components | Stain Ratings with Test Fluids | | | | | | | |
|---|---|---|---|---|---|---|---|---|---|
| | | GF | TF | MO | WIN | COF | BF | CO | Total |
| 16 | N3300/Bicine/FBSEE/MeFBSE/GA/APTMS (2/0.5/0.5/2.8/1.8/0.25) | 1 | 0 | 0 | 1 | 0 | 4 | 0 | 6 |
| 17 | N3300/Bicine/MeFBSE/GA/APTES (2/1/3.2/1.4/0.2) | 3 | 1 | 1 | 4 | 3 | 1 | 0 | 13 |
| 18 | N3300/FBSEE/MeFBSE/CA/APTES (2/1/3.1/1.5/0.2) | 4 | 0 | 0 | 4 | 0 | 0 | 0 | 8 |
| 19 | N3300/Bicine/MeFBSE/CA/APTES (2/1/3.1/1.5/0.2) | 1 | 0 | 0 | 0 | 0 | 4 | 0 | 5 |
| 20 | N3300/Bicine/MeFBSE/MSA/APTES (2/1/3.1/1.5/0.2) | 1 | 0 | 0 | 1 | 0 | 5 | 0 | 7 |
| 21 | N3300/Bicine/MeFBSE/MA/APTES (2/1/3.6/1/0.2) | 2 | 0 | 0 | 3 | 0 | 3 | 0 | 8 |
| 22 | N3300/HMP/MeFBSE/MA/APTES (2/1/3.6/1/0.2) | 1 | 0 | 0 | 1 | 0 | 1 | 0 | 3 |

The results in Table 3 show that chemical compositions made with various water-solubilizing compounds imparted very good stain-release properties.

Example 23

N3600/Bicine/MeFBSE/GA/APTES (2/1/3.2/1.4/0.2)

A chemical composition was prepared essentially as in Example 16 except that 6.222 g (0.010 mole, 0.0340 equivalent) N3600, 0.815 g (0.0050 mole, 0.010 equivalent —OH, 0.0050 equivalent —COOH ) bicine, 20 g N-methylpyrrolidone, 0.532 g (0.0070 mole, 0.0070 equivalent) glycolic acid (GA), 5.712 g (0.016 mole, 0.016 equivalent) MeFBSE, and 0.221 g (0.0010 mole, 0.0010 equivalent) APTES were used instead of the corresponding reactants and amounts in Example 16. The resulting chemical composition was neutralized, and made into a 3 weight % aqueous solution for evaluation and tested essentially as in Example 16. Stain-release test results are shown in Table 4.

Example 24

N3600/Bicine/MeFBSE/GA/APTES (2/1/3.1/1.5/0.2)

A chemical composition was prepared essentially as in Example 16 except that 6.222 g (0.010 mole, 0.0340 equivalent) N3600, 0.815 g (0.0050 mole, 0.010 equivalent —OH, 0.0050 equivalent —COOH ) bicine, 14 g N-methylpyrrolidone, 1.2 g (0.0062 mole, 0.0062 equivalent —OH, 0.0187 equivalent —COOH) citric acid (CA), 5.355 g (0.015 mole, 0.015 equivalent) MeFBSE, and 0.221 g (0.0010 mole, 0.0010equivalent) APTES were used instead of the corresponding reactants and amounts in Example 16. The resulting chemical composition was neutralized, and made into a 3 weight % aqueous solution for evaluation and tested essentially as in Example 16. Stain-release test results are shown in Table 4.

Example 25

N3600/Bicine/MeFBSE/MSA/APTES (2/1/3.2/1.4/0.2)

A chemical composition was prepared essentially as in Example 16 except that 6.222 g (0.010 mole, 0.0340 equivalent) N3600, 0.815 g (0.0050 mole, 0.010 equivalent —OH, 0.0050 equivalent —COOH ) bicine, 14 g N-methylpyrrolidone, 1.2 g (0.0080 mole, 0.0080 equivalent —SH, 0.016 equivalent —COOH) mercaptosuccinic acid (MSA), 5.355 g (0.015 mole, 0.015 equivalent) MeFBSE, and 0.221 g (0.0010 mole, 0.0010 equivalent) APTES were used instead of the corresponding reactants and amounts in Example 16. The resulting chemical composition was neutralized, and made into a 3 weight % aqueous solution for evaluation and tested essentially as in Example 16. Stain-release test results are shown in Table 4.

TABLE 4

Stain-Release Ratings of Chemical Compositions, Comprising Reaction Products from Various Water-Solubilizing Compounds and DESMODUR ™ N-3600, on Limestone Tile.

| Example | Chemical Composition Components | Stain Ratings with Test Fluids | | | | | | | |
|---|---|---|---|---|---|---|---|---|---|
| | | GF | TF | MO | WIN | COF | BF | CO | Total |
| 23 | N3600/Bicine/MeFBSE/GA/APTES (2/1/3.2/1.4/0.2) | 0 | 0 | 0 | 1 | 1 | 1 | 0 | 3 |
| 24 | N3600/Bicine/MeFBSE/CA/APTES (2/1/3.1/1.5/0.2) | 2 | 0 | 0 | 1 | 0 | 5 | 0 | 8 |
| 25 | N3600/Bicine/MeFBSE/MSA/APTES (2/1/3.2/1.4/0.2) | 1 | 0 | 0 | 3 | 0 | 4 | 0 | 8 |

The results in Table 4 show that chemical compositions made with various water-solubilizing compounds and DESMODUR™ 3600 imparted very good stain-release properties.

Water-Soluble Hydrocarbon—Containing Chemical Compositions:

Example 26

N3300/HMP/$C_{12}H_{25}$OH/GA/APTES (2/1/3.1/1.5/0.2)

A chemical composition was prepared essentially as in Example 16 except that 13.26 g (0.020 mole, 0.068 equivalent) N3300, 1.34 g (0.010 mole, 0.020 equivalent —OH, 0.010 equivalent —COOH) HMP, 66 g ethyl acetate, 5.766 g (0.031 mole, 0.031 equivalent) 1-dodecanol ($C_{12}H_{25}$OH), 1.14 g (0.015 mole, 0.015 equivalent) glycolic acid, and 0.442 g (0.0020 mole, 0.0020 equivalent) APTES were used instead of the corresponding reactants and amounts in Example 16. After the resulting chemical composition was neutralized essentially as in Example 16, a portion (46 g) of the neutralized chemical composition was mixed with 110 g water, and the ethyl acetate was stripped from the solution using a rotary evaporator. The resulting clear solution (98 g) contained about 14 weight % of the chemical composition and was diluted with water to form a 3 weight % solution of the chemical composition. The resulting solution was tested according to Test Method I, and the results are shown in Table 5.

Example 27

N3300/HMP/$C_{16}H_{33}$OH/GA/APTMS (2/1/2.6/2/0.2)

A chemical composition was prepared essentially as in Example 16 except that 13.26 g (0.020 mole, 0.068 equivalent) N3300, 1.34 g (0.010 mole, 0.020 equivalent —OH, 0.010 equivalent —COOH) HMP, 54 g ethyl acetate, 6.32 g (0.026 mole, 0.026 equivalent) 1-hexadecanol ($C_{16}H_{33}$OH), 1.52 g (0.020 mole, 0.020 equivalent) glycolic acid, and 0.358 g (0.0020 mole, 0.0020 equivalent) APTMS were used instead of the corresponding reactants and amounts in Example 16. After the resulting chemical composition was neutralized essentially as in Example 16, a portion (32 g) of the neutralized chemical composition was mixed with 55 g water containing 0.45 g DS-10, and the ethyl acetate was stripped from the solution using a rotary evaporator. The resulting mixture (53 g) contained about 18 weight % of the chemical composition and was diluted with water to form a 5 weight % aqueous emulsion solution of the chemical composition. The resulting aqueous emulsion solution was tested according to Test Method I, and the results are shown in Table 5.

The results in Table 5 show that chemical compositions made with hydrocarbon monoalcohols imparted stain-release properties, and surprisingly the composition made with $C_{12}H_{25}$OH (Example 26) produced significantly greater stain-release than the corresponding composition made with $C_{16}H_{33}$OH (Example 27).

Water-Soluble Hydrocarbon—Containing Chemical Compositions With N-Methylpyrrolidone:

Examples 28–36

To a 250 ml flask equipped with a heating mantel, magnetic stirring bar, nitrogen inlet, and temperature controller was added with stirring 13.5 grams (0.0204 mole, 0.0692 equivalent) of DESMODUR™ N-3300 (N3300), 1.35 grams (0.010 mole, 0.020 equivalent) 2,2-bis(hydroxymethyl)propionic acid (HMP), and N-methyl pyrrolidone (NMP). While still at room temperature the mixture was stirred until a homogeneous solution was obtained. Dry nitrogen was bubbled through the solution for 2 minutes. Dibutyltin dilaurate (4 drops) was then added, and the mixture was heated to 70° C. and allowed to react for 1–2 hours. The hydrocarbon monoalcohol and 0.41 grams (0.00539 mole, 0.00539 equivalent) of glycolic acid (GA) were added to the reaction mixture, and reaction was continued for another hour. 3-Aminopropyltriethoxysilane (APTES) (0.74 grams, 0.00334 mole, 0.00334 equivalent) was then added to the reaction mixture and allowed to react for an additional 3 hours. A solution of 1.85 grams (0.0155 equivalent) methyldiethanolamine in 77 grams deionized water was then added to the reaction mixture still at 70° C., and the mixture was stirred at 60–70° C. until it became a clear solution (~20% by weight chemical composition solids). The hot clear solution was diluted with deionized water to a 5% by weight chemical composition solution, which was tested according to Test Method I. Results are shown in Table 7.

TABLE 6

Amounts of NMP and Hydrocarbon Monoalcohol Used in Examples 28–36.

| Example | Chemical Composition Components | NMP (g) | Hydrocarbon Monoalcohol (g, mole, equivalent) |
|---|---|---|---|
| 28 | N3300/HMP/$C_5H_{17}$OH/ GA/APTES (2/1/4/0.54/0.33) | 21.2 | 1-octanol (10.8, 0.040, 0.040) |
| 29 | N3300/HMP/$C_{10}H_{21}$OH/ GA/APTES (2/1/4.1/0.54/0.33) | 22.3 | 1-decanol (6.33, 0.041, 0.041) |

TABLE 5

Stain-Release Ratings of Chemical Compositions, Comprising Reaction Products from Hydrocarbon Monoalcohols, on Limestone Tile.

| | | Stain Ratings with Test Fluids | | | | | | | |
|---|---|---|---|---|---|---|---|---|---|
| Example | Chemical Composition Components | GF | TF | MO | WIN | COF | BF | CO | Total |
| 26 | N3300/HMP/$C_{12}H_{25}$OH/GA/ APTES (2/1/3.1/1.5/0.2) | 3 | 0 | 1 | 2 | 0 | 2 | 0 | 8 |
| 27 | N3300/HMP/$C_{16}H_{33}$OH/GA/APTMS (2/1/2.6/2/0.2) | 5 | 2 | 1 | 4 | 1 | 4 | 3 | 20 |

TABLE 6-continued

Amounts of NMP and Hydrocarbon Monoalcohol Used in Examples 28–36.

| Example | Chemical Composition Components | NMP (g) | Hydrocarbon Monoalcohol (g, mole, equivalent) |
|---|---|---|---|
| 30 | N3300/HMP/$C_{12}H_{25}$OH/GA/APTES (2/1/4/0.54/0.33) | 23.5 | 1-dodecanol (7.5, 0.040, 0.40) |
| 31 | N3300/HMP/$C_{12}H_{25}$OH/GA/APTES (2/1/4/0.54/0.33) | 19.2 | 1-dodecanol (7.5, 0.040, 0.40) |
| 32* | N3300/HMP/$C_{12}H_{25}$OH/GA/APTES (2/1/3.8/0.78/0.33) | 23.2 | 1-dodecanol (7.0, 0.0376, 0.0376) |
| 33 | N3300/HMP/$C_{14}H_{29}$OH/GA/APTES (2/1/4/0.54/0.33) | 24.7 | 1-tetradecanol (8.58, 0.040, 0.040) |
| 34 | N3300/HMP/$C_{16}H_{33}$OH/GA/APTES (2/1/4/0.54/0.33) | 25.5 | 1-hexadecanol (9.70, 0.040, 0.040) |
| 35** | N3300/HMP/$C_{16}H_{33}$OH/GA/APTES (2/1/3.5/1.05/0.33) | 24.6 | 1-hexadecanol (8.5, 0.035, 0.035) |
| 36 | N3300/HMP/$C_{18}H_{37}$OH/GA/APTES (2/1/4/0.54/0.33) | 26.8 | 1-octadecanol (10.8, 0.040, 0.040) |

*The amount of glycolic acid used was 0.59 g (0.0078 mole, 0.0078 equivalent), and the amount of methyldiethanolamine used was 2.10 g.
**The amount of glycolic acid used was 0.80 g (0.0105 mole, 0.0105 equivalent), and the amount of methyldiethanolamine used was 2.46 g.

Example 37

N3300/DHBA/$C_{12}H_{25}$OH/GA/APTES (2/1/4/0.54/0.33)

A chemical composition was prepared and tested essentially as in Example 30 except that 1.55 g (0.010 mole, 0.010 equivalent) 3,5-dihydroxybenzoic acid (DHBA) was used instead of HMP and 24.0 g of N-methylpyrrolidone was used. Results are shown in Table 7.

The results in Table 7 show that chemical compositions made with a wide range of hydrocarbon monoalcohols imparted stain-release properties, that the use of $C_{10}$–$C_{18}$ monoalcohols produced better stain-release properties than the $C_8$, and that the use of the $C_{12}$ monoalcohol gave the best stain-release properties.

Fluorine-Containing Chemical Compositions in Organic Solvent:

Example 38

N3300/FBSEE/MeFBSE/APTMS (1.8/0.97/3/1)

In a 250 ml bottle equipped with a magnetic stirrer, heating mantel, temperature controller, and dry nitrogen purge, was added DESMODUR™ N-3300 (N3300) (11.64 g, 0.018 mole, 0.060 equivalent), FBSEE (3.77 g, 0.00974 mole, 0.0195 equivalent), 50 g ethyl acetate, and 3 drops of dibutyltin dilaurate. The resulting mixture was stirred and heated at 60° C. for one hour. The mixture was then cooled to room temperature, and MeFBSE (10.71 g, 0.030 mole, 0.030 equivalent) and APTMS (1.79 g, 0.010 mole, 0.010 equivalent) were added under nitrogen purge. The resulting reaction mixture was heated for 4 hours at 60° C. Fourier Transform Infrared (FTIR) analysis of the resulting chemical composition showed that no detectable level of the NCO group remained. Sufficient ethyl acetate was then added to the chemical composition to form a 3% by weight solution of the chemical composition in ethyl acetate. The 3% solution was evaluated for performance using Test Method I, and the results are shown in Table 8.

Example 39

N3300/FBSEE/MeFBSE/APTMS (1.8/0.97/3/1) with TEOS

Sufficient tetraethylorthosilicate (TEOS) was added to a portion of the 3% solution prepared in Example 38 to make the solution 5 percent by weight TEOS. The resulting solution was evaluated for performance using Test Methods I and II, and the results are shown in Table 8.

TABLE 7

Stain-Release Ratings of Chemical Compositions, Comprising Reaction Products from Hydrocarbon Monoalcohols, on Limestone Tile.

| | | Stain Ratings with Test Fluids | | | | | | | |
|---|---|---|---|---|---|---|---|---|---|
| Example | Chemical Composition Components | GF | TF | MO | WIN | COF | BF | CO | Total |
| 28 | N3300/HMP/$C_8H_{17}$OH/GA/APTES (2/1/4/0.54/0.33) | 4 | 4 | 5 | 4 | 4 | 5 | 3 | 29 |
| 29 | N3300/HMP/$C_{10}H_{21}$OH/GA/APTES (2/1/4.1/0.54/0.33) | 1 | 4 | 4 | 0 | 0 | 4 | 3 | 16 |
| 30 | N3300/HMP/$C_{12}H_{25}$OH/GA/APTES (2/1/4/0.54/0.33) | 0 | 1 | 1 | 2 | 0 | 1 | 0 | 5 |
| 31 | N3300/HMP/$C_{12}H_{25}$OH/GA/APTES (2/1/4/0.54/0.33) | 0 | 3 | 1 | 0 | 0 | 1 | 1 | 6 |
| 32 | N3300/HMP/$C_{12}H_{25}$OH/GA/APTES (2/1/3.8/0.78/0.33) | 1 | 2 | 0 | 3 | 1 | 1 | 1 | 9 |
| 33 | N3300/HMP/$C_{14}H_{29}$OH/GA/APTES (2/1/4/0.54/0.33) | 1 | 1 | 1 | 3 | 2 | 1 | 1 | 10 |
| 34 | N3300/HMP/$C_{16}H_{33}$OH/GA/APTES (2/1/4/0.54/0.33) | 3 | 5 | 1 | 4 | 2 | 3 | 4 | 22 |
| 35 | N3300/HMP/$C_{16}H_{33}$OH/GA/APTES (2/1/3.5/1.05/0.33) | 0 | 4 | 1 | 0 | 0 | 1 | 3 | 9 |
| 36 | N3300/HMP/$C_{18}H_{37}$OH/GA/APTES (2/1/4/0.54/0.33) | 1 | 2 | 2 | 2 | 1 | 2 | 1 | 11 |
| 37 | N3300/DHBA/$C_{12}H_{25}$OH/GA/APTES (2/1/4/0.54/0.33) | 1 | 2 | 1 | 2 | 2 | 2 | 1 | 11 |

Example 40

N3300/FBSEE/MeFBSE/MPTMS (2/1/3/1)

A chemical composition was prepared and evaluated essentially as in Example 38 except that 3.899 g (0.00588 mole, 0.020 equivalent) N3300, 1.261 g (0.00326 mole, 0.0065 equivalent) FBSEE, 22 g ethyl acetate, 3.565 g (0.010 mole, 0.010 equivalent) MeFBSE, and 0.66 g (0.0033 mole, 0.0033 equivalent) MPTMS were used instead of the amounts in Example 38. The results are shown in Table 8.

Example 41

N3300/FBSEE/MeFBSE/APTMS (3/2/4/1)

A chemical composition was prepared and evaluated essentially as in Example 38 except that 8.73 g (0.0132 mole, 0.0448 equivalent) N3300, 3.77 g (0.00974 mole, 6.0195 equivalent) FBSEE, 82.2 g ethyl acetate, 7.14 g (0.020 mole, 0.020 equivalent) MeFBSE, and 0.895 g (0.0050 mole, 0.0050 equivalent) APTMS were used instead of the amounts in Example 38. The results are shown in Table 8.

Example 42

N100/FBSEE/MeFBSE/APTMS (3/2/4/1)

A chemical composition was prepared and evaluated essentially as in Example 38 except that 8.595 g (0.015 mole, 0.045 equivalent) DESMODUR™ N-100 (N100), 3.77 g (0.00974 mole, 0.0195 equivalent) FBSEE, 81.6 g ethyl acetate, 7.14 g (0.020 mole, 0.020 equivalent) MeFBSE, and 0.895 g (0.0050 mole, 0.0050 equivalent) APTMS were used instead of the reactants and amounts in Example 38. The results are shown in Table 8.

Example 43

HDI/FBSEE/MeFBSE/APTMS (3/2/1.6/0.4)

A chemical composition was prepared and evaluated essentially as in Example 38 except that 2.52 g (0.015 mole, 0.030 equivalent) hexamethylene-1,6-diisocyanate (HDI), 3.77 g (0.00974 mole, 0.0195 equivalent) FBSEE, 22.5 g ethyl acetate, 2.859 g (0.0080 mole, 0.0080 equivalent) MeFBSE, and 0.479 g (0.0027 mole, 0.0027 equivalent) APTMS were used instead of the amounts in Example 38. The results are shown in Table 8.

Example 44

HDI/FBSEE/MeFBSE/APTMS (3/4/1/1)

A chemical composition was prepared and evaluated essentially as in Example 38 except that 3.366 g (0.020 mole, 0.040 equivalent) hexamethylene-1,6-diisocyanate (HDI), 5.41 g (0.014 mole, 0.028 equivalent) FBSEE, 26.9 g ethyl acetate, 1.84 g (0.0052 mole, 0.0052 equivalent) MeFBSE, and 0.925 g (0.0052 mole, 0.0052 equivalent) APTMS were used instead of the amounts in Example 38. The results are shown in Table 8.

Comparative Example C4

Limestone tile was treated with AquaMix Sealer Choice (available from AquaMix, Santa Fe Springs, Calif.) and tested using Test Method I. The results are shown in Table 8.

TABLE 8

Stain-Release Ratings of Chemical Compositions in Organic Solvent on Limestone Tile.

| Example | Chemical Composition Components | GF | TF | MO | WIN | COF | BF | Total |
|---|---|---|---|---|---|---|---|---|
| 38 | N3300/FBSEE/MeFBSE/APTMS (1.8/0.97/3/1) | 0 | 0 | 0 | 3 | 0 | 0 | 3 |
| 39 | N3300/FBSEE/MeFBSE/APTMS (1.8/0.97/3/1) with TEOS | | | | | | | |
| | Test Method I | 0 | 0 | 0 | 0 | 0 | 0 | 0 |
| | Test Method II | 0 | 0 | 0 | 0 | 0 | 0 | 0 |
| 40 | N3300/FBSEE/MeFBSE/MPTMS (2/1/3/1) | 0 | 0 | 0 | 1 | 0 | 5 | 6 |
| 41 | N3300/FBSEE/MeFBSE/APTMS (3/2/4/1) | 0 | 0 | 0 | 0 | 0 | 0 | 0 |
| 42 | N100/FBSEE/MeFBSE/APTMS (3/2/4/1) | 0 | 0 | 0 | 0 | 0 | 1 | 1 |
| 43 | HDI/FBSEE/MeFBSE/APTMS (3/2/1.6/0.4) | 0 | 0 | 0 | 4 | 0 | 0 | 4 |
| 44 | HDI/FBSEE/MeFBSE/APTMS (3/4/1/1) | 3 | 0 | 0 | 4 | 0 | 5 | 12 |
| C4 | AquaMix Sealer Choice | 4 | 0 | 1 | 4 | 2 | 0 | 11 |

The results in Table 8 show that chemical compositions made with various polyfunctional isocyanates and without water-solubilizing groups and coated in organic solvent imparted good to excellent stain-release properties, approximately equal to or much better than a commercially available solvent-borne sealer (Comparative Example C4). In addition, the chemical composition of Example 39 demonstrated excellent durability.

Example 45

N3300/HMPEPB/MeFBSE/APTES (2/1/4.3/0.5)

A chemical composition was prepared and evaluated essentially as in Example 38 except that 6.63 g (0.010 mole, 0.034 equivalent) N3300, 2.47 g (0.0047 mole, 0.0094 equivalent) 1,4-bis(hydroxymethoxyperfluoroethoxy) perfluorobutane (HMPEPB), 40 g ethyl acetate, 7.67 g (0.021 mole, 0.021 equivalent) MeFBSE, and 0.55 g (0.0025 mole, 0.0025 equivalent) APTES were used instead of the reactants and amounts in Example 38. The results are shown in Table 9.

The results in Table 10 show that hydrocarbon-containing chemical compositions coated from organic solvent solutions imparted stain-release properties, and surprisingly the $C_{12}$ composition-(Example 47) was less effective than the corresponding $C_{12}$ aqueous composition (Example 26),

TABLE 9

Stain-Release Ratings of Fluorocarbon-Containing Chemical Compositions in Organic Solvent on Limestone Tile.

| | | Stain Ratings with Test Fluids | | | | | | | |
|---|---|---|---|---|---|---|---|---|---|
| Example | Chemical Composition Components | GF | TF | MO | WIN | COF | BF | CO | Total |
| 45 | N3300/HMPEPB/MeFBSE/APTES (2/1/4.3/0.5) | 0 | 0 | 0 | 1 | 0 | 2 | 0 | 3 |

The results in Table 9 show that the chemical composition made with an in-chain fluorine-containing polyether diol (1,4-bis(hydroxymethoxyperfluoroethoxy)perfluorobutane, $HOCH_2CF_2CF_2OCF_2CF_2CF_2CF_2OCF_2CF_2CH_2OH)$ imparted excellent stain-release properties.

while the $C_{16}$ composition (Example 46) was more effective than the corresponding $C_{16}$ aqueous composition (Example 27).

Example 48

The 3% by weight chemical composition solution of Example 2 was evaluated using Test Methods I and II except that only one coating of the solution was applied to the limestone tile. The results are shown in Table 11.

Hydrocarbon—Containing Chemical Compositions in Organic Solvent Example 46

N3300/HMP/$C_{16}H_{33}$OH/GA/APTMS (2/1/2.6/2/0.2)

A chemical composition was made and tested essentially as Example 27 except that no neutralization was done. The resulting chemical composition (10 g) was diluted with more ethyl acetate to form a 3 percent by weight solution of the chemical composition in ethyl acetate. The results are shown in Table 10.

Example 49

The 5% by weight chemical composition solution of Example 30 was evaluated using Test Methods I and II except that only one coating of the solution was applied to the limestone tile. The results are shown in Table 11.

Comparative Example C5

N3300/HMP/C12H$_{25}$OH/GA (2/114/0.9)

Example 47

N3300/HMP/$C_{12}H_{25}$OH/GA/APTES (2/1/3.1/1.5/ 0.2)

A chemical composition was made and tested essentially as Example 26 except that no neutralization was done. The resulting chemical composition (10 g) was diluted with more ethyl acetate to form a 3 percent by weight solution of the chemical composition in ethyl acetate. The results are shown in Table 10.

A chemical composition was prepared essentially as in Example 30 except that 0.67 g (0.0088 mole, 0.0088 equivalent) GA and 23.0 g NMP were used, and no APTES was added. A 5% by weight aqueous chemical composition solution was prepared as in Example 30 and evaluated according to Test Methods 1 and 11 except that only one coating of the solution was applied to the limestone tile. The results are shown in Table 11.

TABLE 10

Stain-Release Ratings of Chemical Compositions in Organic Solvent, Comprising Reaction Products from Hydrocarbon Monoalcohols, on Limestone Tile.

| | | Stain Ratings with Test Fluids | | | | | | | |
|---|---|---|---|---|---|---|---|---|---|
| Example | Chemical Composition Components | GF | TF | MO | WIN | COF | BF | VO | Total |
| 46 | N3300/HMP/$C_{16}H_{33}$OH/GA/APTMS (2/1/2.6/2/0.2) | 3 | 1 | 1 | 3 | 2 | 1 | 2 | 13 |
| 47 | N3300/HMP/$C_{12}H_{25}$OH/GA/APTES (2/1/3.1/1.5/0.2) | 2 | 4 | 3 | 3 | 0 | 3 | 0 | 15 |

TABLE 11

Initial Stain-Release and Durability of Stain-release of Chemical Compositions on Limestone Tile.

| Example | Chemical Composition Components and Test Method | Stain Ratings with Test Fluids | | | | | | | |
|---|---|---|---|---|---|---|---|---|---|
| | | GF | TF | MO | WIN | COF | BF | VO | Total |
| 48 | N3300/FBSEE/MeFBSE/GA/ APTES (2/1/2.8/1.6/0.33) Test Method I | 3 | 0 | 0 | 3 | 1 | 0 | 0 | 7 |
| | N3300/FBSEE/MeFBSE/GA/ APTES (2/1/2.8/1.6/0.33) Test Method II (Durability) | 3 | 0 | 1 | 3 | 2 | 0 | 0 | 9 |
| 49 | N3300/HMP/$C_{12}H_{25}OH$/GA/ APTES (2/1/4/0.54/0.33) (Ex. 30) Test Method I | 3 | 3 | 2 | 3 | 3 | 3 | 2 | 19 |
| | N3300/HMP/$C_{12}H_{25}OH$/GA/ APTES (2/1/4/0.54/0.33) (Ex. 30) Test Method II (Durability) | 3 | 4 | 3 | 3 | 4 | 3 | 3 | 23 |
| C5 | N3300/HMP/$C_{12}H_{25}OH$/GA (2/1/4/0.9) Test Method I | 1 | 4 | 4 | 0 | 0 | 3 | 4 | 16 |
| | N3300/HMP/$C_{12}H_{25}OH$/GA (2/1/4/0.9) Test Method II (Durability) | 4 | 5 | 5 | 5 | 4 | 5 | 5 | 33 |

The results in Table 11 show that the chemical compositions of the present invention comprising hydrolyzable silane groups imparted stain-release properties which were essentially retained after repeated scrubbing, and which exhibited superior durability compared with the stain-release properties provided by chemical compositions without the silane groups.

Examples 50–62 and Comparative Examples C6–C19

The 3% by weight chemical solutions of Examples 1, 2, and 41, as well as commercially available sealers FC-759 (available from 3M™ Performance Materials, St. Paul, Minn.) and Tile Lab Grout and Tile Sealer (available from Custom Building Products, Seal Beach, Calif.), were evaluated according to Test Method I on slate tile (Autumn Slate and Multi Class Slate, both available from Minnesota Tile, Woodbury, Minn.), marble tile (white Marble Piel Serpentine (available from Minnesota Tile, Woodbury, Minn.), concrete brick (available from Home Depot, Woodbury, Minn.), and clear pine wood (available from Home Depot, Woodbury Minn.). The results are tabulated in Tables 12–16.

TABLE 12

Stain-Release Properties of Chemical Compositions and Commercial Sealers on Autumn Slate.

| Example | Chemical Composition Components | Stain Ratings with Test Fluids | | | | | | | |
|---|---|---|---|---|---|---|---|---|---|
| | | GF | TF | MO | WIN | COF | BF | CO | Total |
| 50 | N3300/HMP/MeFBSE/GA/ APTES (2/1/4/0.5/0.33) (Ex. 1) | 0 | 0 | 0 | 0 | 0 | 2 | 0 | 2 |
| 51 | N3300/FBSEE/MeFBSE/GA/ APTES (2/1/2.8/1.6/0.33) (Ex. 2) | 0 | 0 | 0 | 0 | 0 | 0 | 0 | 0 |
| 52 | N3300/FBSEE/MeFBSE/ APTMS (3/2/4/1) (Ex. 41) | 0 | 0 | 0 | 0 | 0 | 0 | 0 | 0 |
| C6 | FC-759 | 1 | 0 | 0 | 1 | 0 | 0 | 0 | 2 |
| C7 | Tile Lab Grout and Tile Sealer | 3 | 0 | 0 | 1 | 1 | 3 | 0 | 8 |
| C8 | None | 5 | 5 | 5 | 2 | 2 | 5 | 3 | 27 |

TABLE 13

Stain-Release Properties of Chemical Compositions and Commercial Sealers on Multi Class Slate.

| Example | Chemical Composition Components | Stain Ratings with Test Fluids | | | | | | | |
|---|---|---|---|---|---|---|---|---|---|
| | | GF | TF | MO | WIN | COF | BF | CO | Total |
| 53 | N3300/HMP/MeFBSE/GA/ APTES (2/1/4/0.5/0.33) (Ex. 1) | 0 | 0 | 0 | 0 | 0 | 1 | 0 | 1 |
| 54 | N3300/FBSEE/McFBSE/GA/ APTES (2/1/2.8/1.6/0.33) (Ex. 2) | 0 | 0 | 0 | 0 | 0 | 0 | 0 | 0 |

TABLE 13-continued

Stain-Release Properties of Chemical Compositions and Commercial Sealers on Multi Class Slate.

| Example | Chemical Composition Components | GF | TF | MO | WIN | COF | BF | CO | Total |
|---|---|---|---|---|---|---|---|---|---|
| 55 | N3300/FBSEE/MeFBSE/APTMS (3/2/4/1) (Ex. 41) | 0 | 0 | 0 | 0 | 0 | 0 | 0 | 0 |
| C9 | FC-759 | 0 | 0 | 0 | 0 | 0 | 0 | 0 | 0 |
| C10 | Tile Lab Grout and Tile Sealer | 1 | 0 | 1 | 0 | 1 | 3 | 0 | 6 |
| C11 | None | 4 | 5 | 5 | 2 | 1 | 5 | 5 | 27 |

TABLE 14

Stain-Release Properties of Chemical Compositions and Commercial Sealers on Marble Piel Serpentine.

| Example | Chemical Composition Components | GF | TF | MO | WIN | COF | BF | CO | Total |
|---|---|---|---|---|---|---|---|---|---|
| 56 | N3300/HMP/MeFBSE/GA/APTES (2/1/4/0.5/0.33) (Ex 1) | 0 | 0 | 0 | 0 | 1 | 0 | 0 | 1 |
| 57 | N3300/FBSEE/MeFBSE/GA/APTES (2/1/2.8/1.6/0.33) (Ex. 2) | 0 | 0 | 0 | 0 | 0 | 0 | 0 | 0 |
| 58 | N3300/FBSEE/MeFBSE/APTMS (3/2/4/1) (Ex. 41) | 0 | 0 | 0 | 0 | 0 | 0 | 0 | 0 |
| C12 | FC-759 | 2 | 0 | 0 | 1 | 2 | 1 | 0 | 6 |
| C13 | Tile Lab Grout and Tile Sealer | 3 | 0 | 0 | 2 | 2 | 3 | 0 | 10 |
| C14 | None | 2 | 5 | 5 | 4 | 5 | 5 | 5 | 31 |

TABLE 15

Stain-Release Properties of Chemical Compositions and Commercial Sealers on Concrete Brick.

| Example | Chemical Composition Components | GF | TF | MO | WIN | COF | BF | CO | Total |
|---|---|---|---|---|---|---|---|---|---|
| 59 | N3300/HMP/MeFBSE/GA/APTES (2/1/4/0.5/0.33) (Ex. 1) | 3 | 1 | 2 | 1 | 1 | 0 | 0 | 8 |
| 60 | N3300/FBSEE/MeFBSE/GA/APTES (2/1/2.8/1.6/0.33) (Ex. 2) | 4 | 1 | 2 | 2 | 1 | 0 | 1 | 11 |
| C15 | FC-759 | 4 | 1 | 4 | 4 | 4 | 2 | 3 | 22 |
| C16 | Tile Lab Grout and Tile Sealer | 3 | 3 | 5 | 3 | 4 | 1 | 1 | 20 |
| C17 | None | 5 | 5 | 5 | 5 | 5 | 5 | 5 | 35 |

TABLE 16

Stain-Release Properties of Chemical Compositions and a Commercial Sealer on Clear Pine Wood.

| Example | Chemical Composition Components | GF | TF | MO | WIN | COF | BF | CO | Total |
|---|---|---|---|---|---|---|---|---|---|
| 61 | N3300/HMP/MeFBSE/GA/APTES (2/1/4/0.5/0.33) (Ex. 1) | 0 | 0 | 1 | 1 | 0 | 4 | 0 | 6 |
| 62 | N3300/FBSEE/MeFBSE/GA/APTES (2/1/2.8/1.6/0.33) (Ex. 2) | 0 | 0 | 1 | 1 | 0 | 3 | 0 | 5 |
| C18 | FC-759 | 1 | 0 | 2 | 2 | 1 | 3 | 0 | 9 |
| C19 | None | 5 | 5 | 5 | 5 | 5 | 5 | 5 | 35 |

Example 63—A chemical composition was prepared essentially as in Example 30 except no GA was added to the formulation. A 4% by weight aqueous solution of this composition was prepared as in Example 30 and evaluated according to Test Method I. The resulting test values are shown in Table 17.

Example 64—A chemical composition was prepared essentially as in Example 30 except that 5 1.0 g (0.087 mole) of N-3300, 6.50 g (0.0485 mole) HMP, 28.3 g (0.152 mole) 1-dodecanol, 0.40 g (0.005 mole) GA, 1.74 g (0.079 mole) APTES, 32 g NMP and 53 g ethyl acetate were substituted for the corresponding amounts in Example 30. A 4% by weight aqueous solution of this composition was prepared as in Example 30 and evaluated according to Test Method I. The resulting test values are shown in table 17.

TABLE 17

Stain-Release Ratings of Chemical Compositions in Organic Solvent,
Comprising Reaction Products from Hydrocarbon Monoalcohols, on Limestone Tile.

| | | Stain Ratings with Test Fluids | | | | | | | |
|---|---|---|---|---|---|---|---|---|---|
| Example | Chemical Composition Components | GF | TF | MO | WIN | COF | BF | VO | Total |
| 63 | N3300/HMP/$C_{12}H_{25}$OH/APTES (1.9/1/3.3/0.4) | 1 | 1 | 1 | 1 | 0 | 1 | 0 | 5 |
| 64 | N3300/HMP/$C_{12}H_{25}$OH/GA/ APTES (2/1.2/3.5/0.1/0.17) | 0 | 1 | 1 | 1 | 0 | 1 | 0 | 5 |

The results in Tables 12–17 show that the chemical compositions of the present invention are effective, and even more effective than the commercial sealers tested, in imparting stain-release properties to many hard substrates.

Examples Relating to Fibrous Substrates

Preparation 1:

Fluorochemical urethane MeFBSE/N3300/PEG 1450/APTES

A 1 liter flask was charged with of MeFBSE (58.89 g), DBTDL (3 drops; ~20 mg) and MIBK(237.0 g). The temperature of the stirred mixture was raised to 60° C. under a purge of dry nitrogen. N3300 (40.0 g) was then slowly added, maintaining the temperature between 60–65° C. Upon completion of the addition, the reaction mixture was stirred for 1 hour at 60° C. APTES (4.56 g) was then added dropwise, keeping the temperature of the reaction mixture below 65° C. The reaction mixture was stirred for 30 minutes. Solid PEG 1450 (14.95 g) was added to the stirred mixture, and the reaction was followed to completion via FTIR, as determined by disappearance of the —NCO band at approximately 2289 wavenumbers.

Emulsification: To this vigorously stirred organic mixture was slowly added deionized water (944 g; at 60° C.). This pre-emulsion mixture was then sonicated for 2 minutes. A rotary evaporator connected to an aspirator was used to strip the MIBK from the mixture. The resulting emulsion was 20–30% solids.

Preparations 2–11 and Comparative Preparation C1:

The method described in Preparation 1 (above) was followed to produce Preparations 2–11 and Comparative Preparation C1, using equivalent weight ratios and substitutions of materials as listed in Table 18.

TABLE 18

Amounts of components used in Preparations 1–11
and Comparative Preparation C1.

| Preparation No. | Eq. Wt. isocyanate (type) | Eq. Wt. of Me-FBSE | Eq. Wt. of aminosilane (type) | Eq. Wt. of glycol (type) |
|---|---|---|---|---|
| 1 | 1.00 (N3300) | 0.80 | 0.10 (APTES) | 0.10 (PEG 1450) |
| 1a | 1.00 (N3300) | 0.80 | 0.10 (APTMS) | 0.10 (PEG 1450) |
| 2 | 1.00 (N3300) | 0.80 | 0.05 (APTES) | 0.15 (PEG 1450) |
| 3 | 1.00 (N3300) | 0.70 | 0.15 (APTES) | 0.15 (PEG 1450) |
| 4 | 1.00 (N100) | 0.80 | 0.05 (APTES) | 0.15 (PEG 1450) |
| 5 | 1.00 (N100) | 0.80 | 0.10 (APTES) | 0.10 (PEG 1450) |
| 6 | 1.00 (N3300) | 0.80 | 0.075 (APTMS) | 0.125 (PEG 1450) |
| 2a | 1.00 (N3300) | 0.80 | 0.05 (APTMS) | 0.15 (PEG 1450) |
| C1 | 1.00 (N3300) | 0.80 | — | 0.20 (PEG 1450) |
| 7 | 1.00 (N3300) | 0.80 | 0.05 (APTES) | 0.15 (MPEG 350) |
| 8 | 1.00 (N3300) | 0.80 | 0.05 (APTMS) | 0.15 (MPEG 550) |
| 9 | 1.00 (N3300) | 0.80 | 0.05 (APTMS) | 0.15 (PEG 1000) |
| 10 | 1.00 (N3300) | 0.80 | 0.05 (APTMS) | 0.15 (MPEG 2000) |
| 11 | 1.00 (N3300) | 0.80 | 0.05 (APTMS) | 0.15 (PEG 3350) |

Examples 65–75, and Comparative Examples C20–C21

Preparations 1–11 and Comparative Preparation C1 were diluted to a 3% solids with deionized water and applied to carpet (Blue Transition III virgin carpet from Shaw Industries, Dalton, Ga.) as an aerosolized spray to net a 0.6 g/ft$^2$ solids add-on. Results of static water-repellency (Test Method VII), static oil-repellency (Test Method VI), anti-soiling (Test Method VIII) and acid stain-resistance testing (Test Method X) are listed in Table 19.

TABLE 19

Results of Preparations 1–11 and
Comparative Preparation C1 applied to carpet.

| Example | Preparation No. | Static Water-repellency | Static Oil-repellency | Anti-soiling | Acid Stain-resistance |
|---|---|---|---|---|---|
| C20 | C1 | 4 | 4 | 3.5 | 3.5 |
| C21 | untreated | None | None | 3 | 1 |
| 65 | 1 | 4 | 5 | 4.5 | 3.5 |
| 66 | 2 | 4 | 4 | 4 | 3.5 |
| 67 | 3 | 3 | 3 | 3.5 | 3.5 |
| 68 | 4 | 2 | 2 | 4 | 3 |
| 69 | 5 | 2 | 2 | 4 | 3 |
| 70 | 6 | 4 | 4 | 4.5 | 3.5 |
| 71 | 7 | 3 | 3 | 4.5 | 3.5 |
| 72 | 8 | 2 | 3 | 4.5 | 3.5 |
| 73 | 9 | 3 | 3 | 4.5 | 3.5 |
| 74 | 10 | 1 | 2 | 3.5 | 3.5 |
| 75 | 11 | deionized water | 2 | 3 | 3.5 |

The results in Table 19 show that the application of the compositions to carpet at room temperature allowed for a significant repellency improvement over untreated carpet. The static water- and oil-repellency results demonstrated that excellent spill repellency was imparted to the carpet. The antisoiling properties were comparable to other longer fluorocarbon chain urethanes. The presence of silane improved the antisoiling results compared to the sample without any silane. The application of the compositions also demonstrated the resistance of the carpet to acid-based stains.

Examples 76–81, and Comparative Examples C22–C23

Preparations 1–6 and Comparative Preparation C1 were diluted to 4% solids emulsions with deionized water and applied to cotton/polyester 35/65 blend fabric (#7206 from Test Fabrics Inc. Middlesex, N.J.) to yield a 0.8 g/ft$^2$ (8.6 grams/square meter) add-on. Results of static water-repellency (Test Method VII), static oil-repellency (Test Method VI) and antisoiling (Test Method VIII) testing are listed in Table 20.

TABLE 20

Results of Preparations 1–6 and Comparative Preparation C1 applied to cotton/polyester 35165 blend fabric.

| Example | Preparation No. | Static Water-repellency | Static Oil-repellency | Antisoiling |
|---|---|---|---|---|
| C22 | C1 | 3 | 4 | 3.5 |
| C23 | untreated | 0 | 0 | 1 |
| 76 | 1 | 3 | 4 | 4.5 |
| 77 | 2 | 3 | 4 | 4 |
| 78 | 3 | 1 | 4 | 3.5 |
| 79 | 4 | 1 | 2 | 4 |
| 80 | 5 | 1 | 2 | 4 |
| 81 | 6 | 3 | 5 | 4.5 |

The results in Table 20 show the efficacy of the compositions to impart oil- and water-repellency, as well as resistance to soiling, to the carpet versus the carpet being untreated. The ability of the compositions to cure at room temperature allows for ease of application of the compositions.

Examples 82–83, and Comparative Examples C24 and C25

Preparations 2, 2a and Comparative Preparation C1 were diluted with deionized water, 0.1% on the weight of the treating bath PATWET™ LF-55 wetting agent (Yorkshire Pat-Chem Inc., Greenville, S.C.), 10% on the weight of the bath PERMAFRESH™ ULF glyoxal-type permanent-press resin (Noveon, Inc., Charlotte, N.C.), and 2.5% on the weight of the bath magnesium chloride-based catalyst, Catalyst 531 (Omnova Solutions, Chester, S.C.) and applied to 50/50 polyester/cotton plain weave fabric (6 oz/$^2$ (203 grams/square meter) Reeves Bros., Spartanburg, S.C.) to yield about 0.2% fluorochemical solids on the weight of the fabric. Results of static oil-repellency (Test Method VI), water-repellency (Test Method VII), fabric absorbency (Test Method XIII) and Stain K release, Stain E release and Stain C release (Test Method XI) testing are listed in Tables 21 (initial) and 22 (after 5, 10 and 20 launderings).

TABLE 21

Results of Comparative Preparation C1, and Preparations 2 and 2a applied to 50/50 polyester/cotton plain weave fabric; initial.

| Example | Preparation | Solids on fiber | Oil-repellency | Wet | Absorbency | Stain K | Stain E | Stain C |
|---|---|---|---|---|---|---|---|---|
| C24 | — | — | 0 | 0.5 | >30 | 5 | 5 | 3 |
| C25 | C1 | 0.19 | 6 | 15 | >30 | 7 | 6.5 | 6 |
| 82 | 2 | 0.20 | 6 | 23 | >30 | 6.5 | 6 | 5.5 |
| 83 | 2a | 0.22 | 6 | 24.3 | >30 | 6.5 | 7 | 6.5 |

TABLE 22

Results of Comparative Preparation C1, and Preparations 2 and 2a applied to 50/50 polyester cotton plain weave fabric; extended launderings (5, 10 and 20).

| | 5 Launderings | | | | | | 10 Launderings | | | | | | 20 Launderings | | | | | |
|---|---|---|---|---|---|---|---|---|---|---|---|---|---|---|---|---|---|---|
| Ex. | O/R | Wet | Absorbency | K | E | C | O/R | Wet | Absorbency | K | E | C | O/R | Wet | Absorbency | K | E | C |
| C24 | 0 | 0.5 | 6.3 | 5 | 5 | 3 | 0 | 0.5 | 6.7 | 5 | 5 | 3 | 0 | 0.5 | 5.1 | 5 | 5 | 3 |
| C25 | 0 | 0.5 | >30 | 6.5 | 7 | 5 | 0 | 0.5 | >30 | 6 | 6.5 | 5 | 0 | 0.5 | 23 | 6 | 6 | 5 |
| 82 | 3 | 13 | >30 | 6.5 | 6.5 | 5 | 1.5 | 2.3 | >30 | 6 | 7 | 6 | 0.5 | 1.3 | >30 | 6.5 | 6 | 4 |
| 83 | 3 | 18 | >30 | 6.5 | 6.5 | 6.5 | 1.5 | 1.3 | >30 | 6.5 | 7 | 5 | 1 | 0.5 | >30 | 6.5 | 6 | 4 |

The results in Tables 21 and 22 show that without the silane (as in Comparative Example C25), no oil-repellency is present at 5 launderings, whereas with silane (as in Examples 82 and 83), there is oil-repellency durability to 20 launderings. Examples 82 and 83 show longer absorbency times than Comparative Example C25. Longer absorbency times are a measure of the resistance of the fabric to wet-out by aqueous materials, e.g., water. In Examples 82 and 83, stain-release values were at least one point, or significantly better, than Comparative Example C24.

Example 84 and Comparative Examples C26 and C27

Untreated fabric (Comparative Example C26), Comparative Preparation FC-248 and Preparation 1a were diluted to 4% solids emulsions with deionized water, 0.1% on the weight of the treating bath PATWET™ LF-55 wetting agent (Yorkshire Pat-Chem Inc., Greenville, S.C.), and 12% on the weight of the bath pre-catalyzed, glyoxal-type, permanent-press resin, FREEREZ™ 845 (Noveon Inc., Charlotte, N.C.), and applied to 60/40 cotton/polyester 5 oz/yd$^2$ (169 grams/square meter) navy pique knit fabric (Cleveland Mills, Lawndale, N.C.) to yield about 0.5% fluorochemical solids on fiber. Results for static oil-repellency (Test Method VI), water-repellency (Test Method VII), fabric absorbency (Test Method XIII) and Stain K, Stain E and Stain C release testing are listed in Tables 23 (initial and after 2 and 4 launderings) and 24 (after 6, 8 and 10 launderings).

Tables 23 and 24 show that Comparative Example C26 (untreated 60/40 cotton/polyester 5 oz/yd$^2$ (169 grams/square meter) navy pique knit fabric) and Comparative Example C27 (with FC-248) exhibit lower oil-repellency, at any given laundering cycle, than Example 84 which contains silane.

Example 85 and Comparative Examples C28 and C29

Untreated fabric (Comparative Example C28), Comparative Preparation FC-248 and Preparation 6 were diluted with deionized water, 0.1% on the weight of the treating bath PATWET™ LF-55 wetting agent (Yorkshire Pat-Chem Inc., Greenville, S.C.), 10% on the weight of the bath PERMAFRESH™ ULF glyoxal-type permanent-press resin (Noveon, Inc., Charlotte, N.C.), and 2.5% on the weight of the bath magnesium chloride-based catalyst, Catalyst 531 (Omnova Solutions, Chester, S.C.), and applied to 50/50 polyester/cotton plain weave fabric (6 oz/yd$^2$ (203 grams/square meter), Reeves Bros., Spartanburg, S.C.) to yield about 0.32% fluorochemical solids on the weight of the fabric. Results for static oil-repellency (Test Method VI), water-repellency (Test Method VII), fabric absorbency (Test Method XIII) and Stain K release, Stain E release and Stain C release (Test Method XI) testing are listed in Tables 25 (initial and after 5 launderings) and 26 (after 10 and 15 launderings).

TABLE 23

Results of untreated fabric and (Comparative Example C26) and Preparations FC-248 and 1a applied to 60/40 cotton/polyester 5 oz/yd$^2$ (169 grams/square meter) navy pique knit fabric; initial, and extended launderings (2 and 4).

| | | Solids on fiber | Initial | | | | | | 2 Launderings | | | | | | 4 Launderings | | | | | |
|---|---|---|---|---|---|---|---|---|---|---|---|---|---|---|---|---|---|---|---|---|
| Ex. | Prp. | | O/R | Wet | Absorbency | K | E | C | O/R | Wet | Absorbency | K | E | C | O/R | Wet | Absorbency | K | E | C |
| C26 | — | — | 0 | <1 | <1 | 5 | 6.5 | 3 | 0 | <1 | <1 | 5 | 6.5 | 3 | 0 | <1 | <1 | 5 | 6.5 | 3 |
| C27 | FC-248 | 0.515 | 3 | 2.8 | >30 | 7.5 | 7 | 7 | 0 | 2 | 20.1 | 7 | 7 | 6.5 | 0 | <1 | 19.8 | 6.5 | 7 | 7 |
| 84 | 1a | 0.467 | 4.5 | 5.6 | >30 | 6.5 | 7 | 3.5 | 2 | 6.3 | >30 | 6.5 | 6.5 | 6 | 2 | 4 | 30 | 7 | 7 | 6 |

TABLE 24

Results of untreated fabric (Comparative Example C26) and Preparations FC-248 and 1a applied to 60/40 cotton/polyester 5 oz/yd$^2$ (169 grams/square meter) navy pique knit fabric; extended launderings (6, 8 and 10).

| | | 6 Launderings | | | | | | 8 Launderings | | | | | | 10 Launderings | | | | | |
|---|---|---|---|---|---|---|---|---|---|---|---|---|---|---|---|---|---|---|---|
| Example | Prep. | O/R | Wet | Absorbency | K | E | C | O/R | Wet | Absorbency | K | E | C | O/R | Wet | Absorbency | K | E | C |
| C26 | — | 0 | <1 | <1 | 5 | 6.5 | 3 | 0 | <1 | 5 | 6.5 | 3 | | 0 | <1 | 5 | 6.5 | 3 | |
| C27 | FC248 | 0 | <1 | 4 | 6.5 | 7 | 6.5 | 0 | 5.3 | 7 | 7.5 | 7 | | 0 | 4.6 | 6.5 | 7 | 7 | |
| 84 | 1a | 1 | 2.7 | >30 | 7 | 7 | 6 | 2 | >30 | 6.5 | 6.5 | 4.5 | | 1.5 | >30 | 6 | 6.5 | 4 | |

TABLE 25

Results of untreated fabric (Comparative Example C28) and Preparations FC-248 and 6 applied to 50/50 polyester/cotton plain weave fabric; initial and 5 launderings.

| | | | Initial | | | | | 5 Launderings | | | | | |
|---|---|---|---|---|---|---|---|---|---|---|---|---|---|
| Example | Prep. | Solids on Fabric | O/R | Wet | Absorbency | K | E | C | O/R | Wet | Absorbency | K | E | C |
| C28 | — | — | 0 | 0.5 | >30 | 5 | 5 | 2 | 0 | 0.5 | 5 | 5 | 5 | 2 |
| C29 | FC-248 | 0.336 | 5 | >30 | >30 | 7 | 6.5 | 7 | 2 | 5.8 | >30 | 6.5 | 6.5 | 6 |
| 85 | 6 | 0.303 | 6 | >30 | >30 | 6 | 6 | 7 | 5 | >30 | >30 | 7 | 7 | 6.5 |

TABLE 26

Results of untreated fabric (Comparative Example C28) and Preparations FC-248 and 6 applied to 50/50 polyester/cotton plain weave fabric; 10 and 15 launderings.

| | | 10 Launderings | | | | | | 15 Launderings | | | | | |
|---|---|---|---|---|---|---|---|---|---|---|---|---|---|
| Ex | Prep | O/R | Wet | Absorbency | K | E | C | O/R | Wet | Absorbency | K | E | C |
| C28 | — | 0 | 0.5 | 4.4 | 5 | 5 | 2 | 0 | 0.5 | 5.0 | 5 | 5 | 2 |
| C29 | FC-248 | 1 | 1.9 | >30 | 6 | 6.5 | 5.5 | 1 | 0.5 | >30 | 6 | 6.5 | 5 |
| 85 | 6 | 4 | 27.9 | >30 | 6.5 | 6 | 5 | 4 | 14.5 | >30 | 6 | 6 | 5 |

Tables 25 and 26 show that Comparative Example C28 (untreated 50/50 polyester/cotton plain weave fabric) and Comparative Example C29 (with FC-248) exhibit lower oil-repellency, at any given laundering cycle, than Example 85, which contains silane.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims as set forth herein as follows.

What is claimed is:

1. A chemical composition comprising:
   one or more urethane oligomers of at least two repeating units selected from the group consisting of fluorine-containing urethane oligomers and long-chain hydrocarbon-containing urethane oligomers, wherein said oligomers comprise the reaction product of:
   (a) one or more polyfunctional isocyanate compounds;
   (b) one or more polyols;
   (c) one or more monoalcohols selected from the group consisting of fluorocarbon monoalcohols, optionally substituted long-chain hydrocarbon monoalcohols, and mixtures thereof;
   (d) one or more silanes of the following formula (I):

   $$X—R^1—Si—(Y)_3 \quad \text{formula (I)}$$

wherein
   X is —NH$_2$; —SH; —OH; —N=C=O; or —NRH where R is selected from the group consisting of phenyl, straight and branched aliphatic, alicyclic, and aliphatic ester groups; R$^1$ is an alkylene, heteroalkylene, aralkylene, or heteroaralkylene group; and
   each Y is independently a hydroxyl; a hydrolyzable moiety selected from the group consisting of alkoxy, acyloxy, heteroalkyoxy, heteroacyloxy, halo, and oxime; or a non-hydrolyzable moiety selected from the group consisting of phenyl, alicyclic, straight-chain aliphatic, and branched-chain aliphatic, wherein at least one Y is a hydrolyzable moiety; and optionally (e) one or more water-solubilizing compounds comprising one or more water-solubilizing groups and at least one isocyanate-reactive hydrogen containing group.

2. The chemical composition of claim 1 wherein the one or more urethane oligomers comprise the reaction product of (e) one or more water-solubilizing compounds comprising one or more water-solubilizing groups and at least one isocyanate-reactive hydrogen containing group.

3. The chemical composition of claim 2 wherein the polyfunctional isocyanate compound is a diisocyanate or triisocyanate.

4. The chemical composition of claim 2 wherein the polyfunctional isocyanate compound is a diisocyanate and the polyol is a mixture of diol and triol.

5. The chemical composition of claim 2 wherein the polyfunctional isocyanate compound is a triisocyanate and the polyol is a diol.

6. The chemical composition of claim 5 wherein the diol is selected from the group consisting of a branched- or straight-chain hydrocarbon diol, a diol containing at least one solubilizing group, a fluorinated diol comprising a monovalent or divalent perfluorinated group, a diol comprising a silane group, a polyalkylsiloxane diol, a polyarylsiloxane diol, and mixtures thereof.

7. The chemical composition of claim 2 wherein the fluorochemical monoalcohol is a compound of the following formula II:

$$R_f—Z—R^2—OH \quad \text{formula (II)}$$

wherein:
   R$_f$ is a perfluoroalkyl group or a perfluoroheteroalkyl group;

Z is a connecting group selected from a covalent bond, a sulfonamido group, a carboxamido group, a carboxyl group, or a sulfinyl group; and $R^2$ is a divalent straight- or branched-chain alkylene, cycloalkylene, or heteroalkylene group of 1 to 14 carbon atoms.

8. The chemical composition of claim 7 wherein $R_f$ is a perfluoroalkyl group of 2 to 6 carbons.

9. The chemical composition of claim 8 wherein $R_f$ is a perfluoroalkyl group of 4 carbons.

10. The chemical composition of claim 2 wherein the monoalcohol is an unsubstituted long-chain hydrocarbon monoalcohol.

11. The chemical composition of claim 10 wherein the monoalcohol is an unsubstituted long-chain hydrocarbon monoalcohol having 10 to 18 carbons.

12. The chemical composition of claim 11 wherein the monoalcohol is an unsubstituted long-chain hydrocarbon monoalcohol having 12 carbons.

13. The chemical composition of claim 2 wherein the water-solubilizing compound is a diol or a monoalcohol.

14. The chemical composition of claim 2 wherein the water-solubilizing groups of the water solubilizing compounds are selected from the group consisting of carboxylate, sulfate, sulfonate, phosphate, phosphonate, ammonium, and quaternary ammonium groups.

15. The chemical composition of claim 2 wherein the isocyanate-reactive hydrogen containing group is selected from the group consisting of —OH, —SH, —NH$_2$, and —NRH wherein R is selected from the group consisting of a phenyl group, a cycloaliphatic group, and a straight or branched aliphatic group of 1 to 12 carbons.

16. The chemical composition of claim 1 wherein the composition comprises:
one or more polyfunctional isocyanate compounds and one or more polyols having a molar ratio of from about 1:0.25 to about 1:0.45;
one or more polyfunctional isocyanate compounds and one or more monoalcohols having a molar ratio of from about 1:0.30 to about 1:0.60;
one or more polyfunctional isocyanate compounds and one or more silanes, of formula (I), having a molar ratio of from about 1:0.001 to about 1:0.15; and
one or more polyfunctional isocyanate compounds and one or more water-solubilizing compounds having a molar ratio of from about 1:0 to about 1:1.6.

17. A coating composition comprising a solution comprising the chemical composition of claim 1 and a solvent.

18. The coating composition of claim 17 wherein the solvent is selected from the group consisting of water, an organic solvent, and mixtures thereof.

19. The coating composition of claim 17 wherein the chemical composition comprises:
one or more polyfunctional isocyanate compounds and one or more polyols having a molar ratio of from about 1:0.25 to about 1:0.45;
one or more polyfunctional isocyanate compounds and one or more monoalcohols having a molar ratio of from about 1:0.30 to about 1:0.60;
one or more polyfunctional isocyanate compounds and one or more silanes, of formula (I), having a molar ratio of from about 1:0.001 to about 1:0.15; and
one or more polyfunctional isocyanate compounds and one or more water-solubilizing compounds having a molar ratio of from about 1:0 to about 1:1.6.

20. A coating composition comprising a solution comprising the chemical composition of claim 2 and water.

21. An article comprising:
(a) a substrate having one or more surfaces; and
(b) a cured coating derived from at least one solvent and a chemical composition comprising:
one or more urethane oligomers of at least two repeating units selected from the group consisting of fluorine-containing urethane oligomers and long-chain hydrocarbon-containing urethane oligomers, wherein said oligomers comprise the reaction product of:
(a) one or more polyfunctional isocyanate compounds;
(b) one or more polyols;
(c) one or more monoalcohols selected from the group consisting of fluorocarbon monoalcohols, optionally substituted long-chain hydrocarbon monoalcohols, and mixtures thereof; and
(d) one or more silanes of the following formula (I):

wherein
X is —NH$_2$; —SH; —OH; —N=C=O; or —NRH where R is selected from the group consisting of phenyl, straight and branched aliphatic, alicyclic, and aliphatic ester groups;
$R^1$ is an alkylene, heteroalkylene, aralkylene, or heteroaralkylene group; and
each Y is independently a hydroxyl; a hydrolyzable moiety selected from the group consisting of alkoxy, acyloxy, heteroalkyoxy, heteroacyloxy, halo, and oxime; or a non-hydrolyzable moiety selected from the group consisting of phenyl, alicyclic, straight-chain aliphatic, and branched-chain aliphatic, wherein at least one Y is a hydrolyzable moiety; and
optionally (e) one or more water-solubilizing compounds comprising one or more water-solubilizing groups and at least one
isocyanate-reactive hydrogen containing group,
wherein the one or more surfaces of the substrate is coated with the cured coating.

22. The article of claim 21 wherein the chemical composition comprising one or more urethane oligomers comprises the reaction product of (e) one or more water-solubilizing compounds comprising one or more water-solubilizing groups and at least one isocyanate-reactive hydrogen containing group.

23. The article of claim 22 wherein the substrate is selected from the group consisting of hard substrates and fibrous substrates.

24. The article of claim 23 wherein the hard substrate is selected from the group consisting of glass, ceramic, masonry, concrete, natural stone, man-made stone, and wood.

25. The article of claim 24 wherein the hard substrate is porous.

26. The article of claim 25 wherein the monoalcohol is a fluorochemical monoalcohols.

27. The article of claim 21 wherein the chemical composition comprises:
one or more polyfunctional isocyanate compounds and one or more polyols having a molar ratio of from about 1:0.25 to about 1:0.45;
one or more polyfunctional isocyanate compounds and one or more monoalcohols having a molar ratio of from about 1:0.30 to about 1:0.60;

one or more polyfunctional isocyanate compounds and one or more silanes, of formula (I), having a molar ratio of from about 1:0.001 to about 1:0.15; and one or more polyfunctional isocyanate compounds and one or more water-solubilizing compounds having a molar ratio of from about 1:0 to about 1:1.6.

28. A fluorochemical composition comprising an oligomer comprising at least two repeating units and two or more terminal groups, each repeating unit comprising a urethane group, and said oligomer being terminated with (i) one or more perfluoroalkyl groups or one or more perfluoroheteroalkyl groups, and (ii) one or more silyl groups.

29. The fluorochemical composition of claim 28 wherein the oligomer further comprises one or more water-solubilizing groups, the solubilizing groups independently being pendant from the repeating unit or terminal.

30. The fluorochemical composition of claim 29 wherein the solubilizing groups are carboxylate groups.

31. The fluorochemical composition of claim 29 wherein the oligomer further comprises one or more fluorine-containing groups pendant from the repeating unit, wherein the fluorine-containing groups independently are perfluoroalkyl groups or perfluoroheteroalkyl groups.

32. The fluorochemical composition of claim 29 wherein the oligomer is terminated with one or more perfluoroalkyl groups of 2 to 6 carbons.

33. The fluorochemical composition of claim 32 wherein the oligomer is terminated with one or more perfluoroalkyl groups of 4 carbons.

34. The fluorochemical composition of claim 33 wherein the oligomer further comprises one or more perfluordheteroalkylene groups within the backbone of the repeating unit.

35. A method for imparting stain-release characteristics to a substrate, having one or more surfaces, comprising the steps of:
(a) applying a coating composition onto the one of more surfaces of the substrate, wherein the coating composition comprises:
(i) at least one solvent; and
(ii) one or more urethane oligomers of at least two repeating units selected from the group consisting of fluorine-containing urethane oligomers and long-chain hydrocarbon-containing urethane oligomers, wherein said oligomers comprise the reaction product of:
(aa) one or more polyfunctional isocyanate compounds;
(bb) one or more polyols;
(cc) one or more monoalcohols selected from the group consisting of fluorocarbon monoalcohols, optionally substituted long-chain hydrocarbon monoalcohols, and mixtures thereof; and
(dd) one or more silanes of the following formula (I):

wherein:
X is —NH$_2$; —SH; —OH; —N=C=O; or —NRH where R is selected from the group consisting of phenyl, straight and branched aliphatic, alicyclic, and aliphatic ester groups;
R$^1$ is an alkylene, heteroalkylene, aralkylene, or heteroaralkylene group; and
each Y is independently a hydroxyl; a hydrolyzable moiety selected from the group consisting of alkoxy, acyloxy, heteroalkyoxy, heteroacyloxy, halo, and oxime; or a non-hydrolyzable moiety selected from the group consisting of phenyl, alicyclic, straight-chain aliphatic, and branched-chain aliphatic, wherein at least one Y is a hydrolyzable moiety; and optionally (ee) one or more water-solubilizing compounds comprising one or more water-solubilizing groups and at least one isocyanate-reactive hydrogen containing group.

(b) allowing the coating composition to cure.

36. The method of claim 35 wherein the coating composition comprises one or more urethane oligomers comprising the reaction product of (ee) one or more water-solubilizing compounds comprising one or more water-solubilizing groups and at least one isocyanate-reactive hydrogen containing group.

37. The method of claim 35 wherein said coating composition comprises:
one or more polyfunctional isocyanate compounds and one or more polyols having a molar ratio of from about 1:0.25 to about 1:0.45;
one or more polyfunctional isocyanate compounds and one or more monoalcohols having a molar ratio of from about 1:0.30 to about 1:0.60;
one or more polyfunctional isocyanate compounds and one or more silanes, of formula (I), having a molar ratio of from about 1:0.001 to about 1:0.15; and
one or more polyfunctional isocyanate compounds and one or more water-solubilizing compounds having a molar ratio of from about 1:0 to about 1:1.6.

38. The method of claim 35 wherein the substrate is selected from the group consisting of hard substrates and fibrous substrates.

* * * * *

UNITED STATES PATENT AND TRADEMARK OFFICE
CERTIFICATE OF CORRECTION

PATENT NO. : 6,646,088 B2
DATED : November 11, 2003
INVENTOR(S) : Fan, Wayne W.

It is certified that error appears in the above-identified patent and that said Letters Patent is hereby corrected as shown below:

Title page,
Item [56], References Cited, FOREIGN PATENT DOCUMENTS, the following references should be added:
-- JP    07216047    8/1995
WO    02/14443 A2    2/2002 --
Item [57], ABSTRACT,
Line 6, after "or" delete ",".

Column 1,
Line 58, delete "Stem" and insert -- Stern --, therefor.

Column 4,
Line 66, after "can" delete ",".

Column 8,
Line 60 delete "Si(Y)($_3$VI) and insert -- Si(Y)$_3$(VI) --, therefor.

Column 9,
Line 45, after "mixtures" delete "a,".

Column 10,
Line 16, delete "aiicyclic" and insert -- alicyclic --, therefor.

Column 12,
Line 31, delete "norbomanediol" and insert -- norbornanediol --, therefor.

Column 13,
Line 26, delete "et al" and insert -- et al. --, therefor.
Line 55, delete "perfluorobutyl sul fonamide" and insert -- perfluorobutylsulfonamide --, therefor.

Column 14,
Line 66, delete "$R_f$–Z–R–OH" and insert -- $R_f$–Z–$R^2$–OH --, therefor.

Column 16,
Line 17, delete "butanesul fonamido" and insert -- butanesulfonamido --, therefor.
Line 18, delete "ethylperfluorobutanesulfonam ido" and insert
-- ethylperfluorobutanesulfonamido --, therefor.
Line 20, "perfluorohexanesulfonamride" and insert -- perfluorohexanesulfonamide --, therefor.
Line 21, after "1,1-" delete ";".

UNITED STATES PATENT AND TRADEMARK OFFICE
CERTIFICATE OF CORRECTION

PATENT NO. : 6,646,088 B2
DATED : November 11, 2003
INVENTOR(S) : Fan, Wayne W.

It is certified that error appears in the above-identified patent and that said Letters Patent is hereby corrected as shown below:

Column 18,
Line 3, delete "$O_3M$," and insert -- $SO_3M$, --, therefor.

Column 23,
Line 24, delete "." before "having".

Column 28,
Line 7, delete "Method 1" and insert -- Method I --, therefor.
Line 25, after "Corporation" delete "." and insert -- , --, therefor.

Column 29,
Line 35, delete "Antisolini" and insert -- Antisoiling --, therefor.

Column 32,
Line 33, delete "Aminopropyltriethixysilane" and insert
-- Aminopropyltriethoxysilane --, therefor.
Lines 65-66, delete "methyidiethanolamine" and insert -- methyldiethanolanolamine --, therefor.

Column 33,
Line 28, delete "methyidiethanolamine" and insert -- methyldiethanolanolamine --, therefor.

Column 35,
Lines 46-47, delete "methyidiethanolamine" and insert -- methyldiethanolanolamine --, therefor.

Column 36,
Line 51, delete "(2/114/0.54/0/33)" and insert -- (2/1/4/0.54/0/33) --, therefor.

Column 37,
Line 44, delete "$C_6F$," and insert -- $C_6F_{11}$ --, therefor.
Lines 64-65, delete "methyidiethanolamine" and insert -- methyldiethanolanolamine --, therefor.

Column 40,
Line 53, after "4.872" delete "." and insert -- , --, therefor.

UNITED STATES PATENT AND TRADEMARK OFFICE
CERTIFICATE OF CORRECTION

PATENT NO. : 6,646,088 B2
DATED : November 11, 2003
INVENTOR(S) : Fan, Wayne W.

It is certified that error appears in the above-identified patent and that said Letters Patent is hereby corrected as shown below:

Column 43,
Line 46, delete "GA" and insert -- CA --, therefor.

Column 46,
Line 47, Table 6, column 2, row 2, line 1, delete "$C_5H_{17}OH$" and insert -- $C_8H_{17}OH$ --, therefor.

Column 49,
Line 18, delete "6.0195" and insert -- 0.0195 --, therefor.

Column 52,
Line 4, after "composition" delete "-".
Line 41, delete "(2/114/0.9)" and insert -- (2/1/4/0.9) --, therefor.
Line 48, delete "Test Methods 1 and 11" and insert -- Test Methods I and II --, therefor.

Column 58,
Line 38, after "solids" insert -- emulsion --.
Line 39, after "carpet" insert -- available --.
Line 44, delete "X" and insert -- IX --, therefor.

Column 59,
Line 28, delete "35165" and insert -- 35/65 --, therefor.

Column 60,
Line 29, delete "oz/$^2$" and insert -- oz/yd$^2$ --, therefor.
Line 1, Table 22, delete "polyester cotton" and insert -- polyester/cotton --, therefor.

Column 61,
Table 24, line 2, column 2, row 2, (Example C27), "delete "FC248" and insert
-- FC-248 --, therefor.

Column 62,
Line 1, Table 24 heading, delete "la" and insert -- 1a --, therefor.

UNITED STATES PATENT AND TRADEMARK OFFICE
CERTIFICATE OF CORRECTION

PATENT NO. : 6,646,088 B2
DATED : November 11, 2003
INVENTOR(S) : Fan, Wayne W.

It is certified that error appears in the above-identified patent and that said Letters Patent is hereby corrected as shown below:

Column 66,
Line 20, claim 21, delete "X–R$^1$Si–(Y)$_3$" insert --X–R$^1$–Si–(Y)$_3$ --, therefor.

Column 67,
Lines 31-32, claim 34, delete "perfluordheteroalkylene" and insert
-- perfluoroheteroalkylene --, therefor.

Signed and Sealed this

Nineteenth Day of October, 2004

JON W. DUDAS
*Director of the United States Patent and Trademark Office*